US007212245B2

(12) United States Patent
Kondo et al.

(10) Patent No.: US 7,212,245 B2
(45) Date of Patent: *May 1, 2007

(54) INFORMATION SIGNAL PROCESSING DEVICE, INFORMATION SIGNAL PROCESSING METHOD, IMAGE SIGNAL PROCESSING DEVICE AND IMAGE DISPLAY DEVICE USING IT, COEFFICIENT TYPE DATA CREATING DEVICE USED THEREIN AND CREATING METHOD, AND INFORMATION PROVIDING MEDIUM

(75) Inventors: Tetsujiro Kondo, Tokyo (JP); Yasushi Tatehira, Kanagawa (JP); Kei Hiraizumi, Kanagawa (JP); Nobuyuki Asakura, Tokyo (JP); Takuo Morimura, Kanagawa (JP); Wataru Niitsuma, Tokyo (JP); Takahide Ayata, Kanagawa (JP)

(73) Assignee: Sony Corporation, Tokyo (JP)

( * ) Notice: Subject to any disclaimer, the term of this patent is extended or adjusted under 35 U.S.C. 154(b) by 617 days.

This patent is subject to a terminal disclaimer.

(21) Appl. No.: 10/181,122

(22) PCT Filed: Nov. 14, 2001

(86) PCT No.: PCT/JP01/09942

§ 371 (c)(1),
(2), (4) Date: Nov. 4, 2002

(87) PCT Pub. No.: WO02/41630

PCT Pub. Date: May 23, 2002

(65) Prior Publication Data
US 2003/0133039 A1 Jul. 17, 2003

(30) Foreign Application Priority Data
Nov. 15, 2000 (JP) ............................. 2000-348730
Apr. 9, 2001 (JP) ............................. 2001-110696

(51) Int. Cl.
H04N 11/20 (2006.01)
(52) U.S. Cl. ...................... 348/441; 348/458; 348/448
(58) Field of Classification Search ................ 348/441, 348/458, 448–449, 452, 554–555, 558; 382/299, 382/300; 345/698, 699
See application file for complete search history.

(56) References Cited

U.S. PATENT DOCUMENTS

| 5,517,588 | A | * | 5/1996 | Kondo ........................ 382/300 |
| 6,144,412 | A | * | 11/2000 | Hirano et al. ................ 348/441 |
| 6,429,899 | B1 | * | 8/2002 | Nio et al. ..................... 348/443 |
| 6,674,478 | B2 | * | 1/2004 | Miyazaki et al. ............ 348/441 |
| 6,836,293 | B2 | * | 12/2004 | Itoh et al. .................... 348/452 |

FOREIGN PATENT DOCUMENTS

| EP | 0 975 156 | 1/2000 |
| JP | 9-74543 | 3/1997 |
| JP | 10-313445 | 11/1998 |
| JP | 2000-41223 | 2/2000 |
| JP | 2000-69435 | 3/2000 |
| JP | 2000-115717 | 4/2000 |

* cited by examiner

Primary Examiner—Trang U. Tran
(74) Attorney, Agent, or Firm—Frommer Lawrence & Haug LLP; William S. Frommer; Thomas F. Presson

(57) ABSTRACT

An information signal processor that is well suitable for use in conversion of an SD signal into an HD signal. The pixel data set corresponding to an objective position in the HD signal is extracted selectively from the SD signal. Class CL to which pixel data set of the objective position belongs is then obtained using the pixel data set. A coefficient production circuit produces coefficient data sets Wi for each class based on coefficient seed data sets and values of picture quality adjusting parameters h and v. A tap selection circuit selectively extracts the data sets xi from the SD signal and then, a calculation circuit produces the pixel data sets of the objective position in the HD signal using the data sets xi and the coefficient data sets Wi. It is thus possible to save on the storage capacity of the memory.

11 Claims, 30 Drawing Sheets

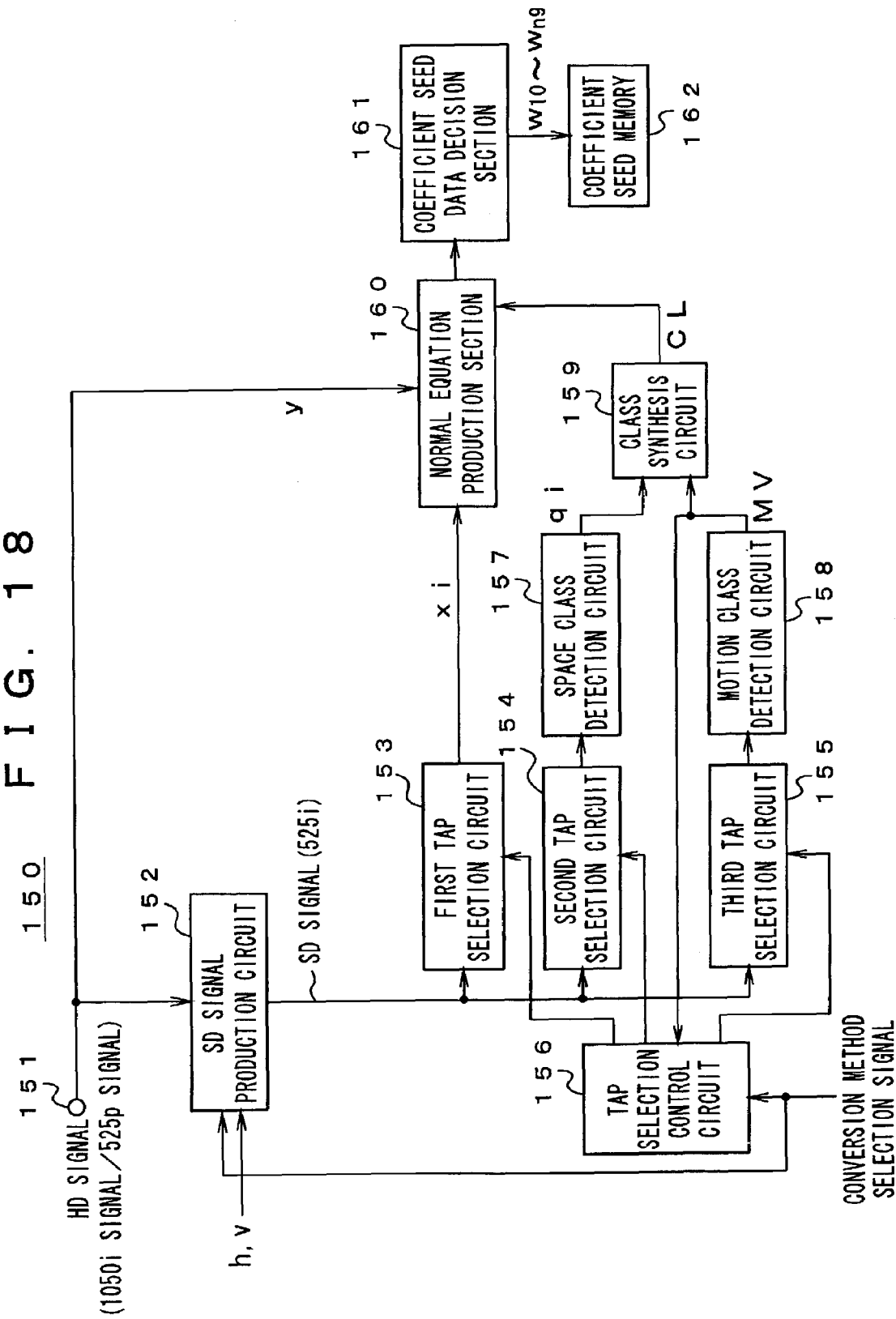

F I G. 1 9
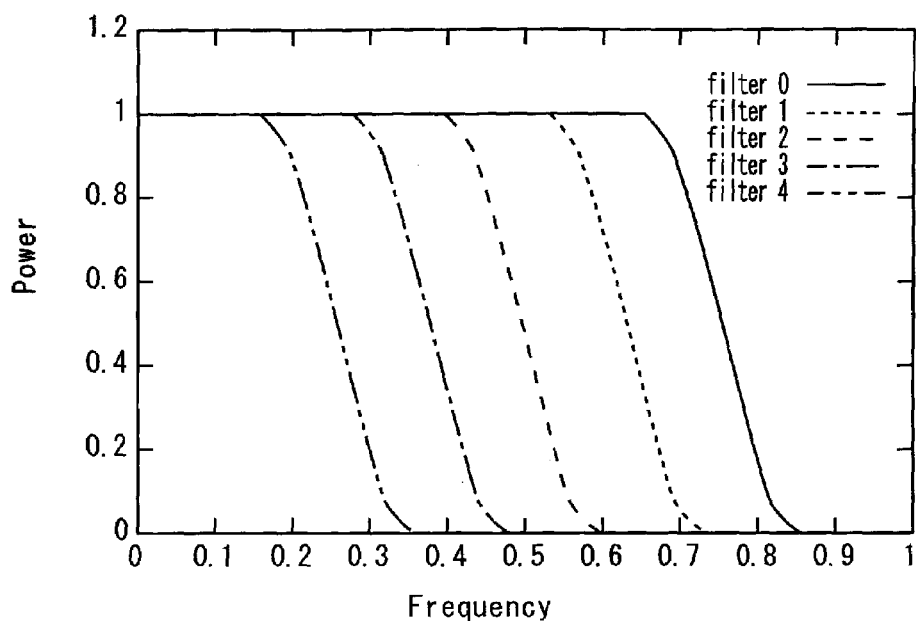
F I G. 2 0
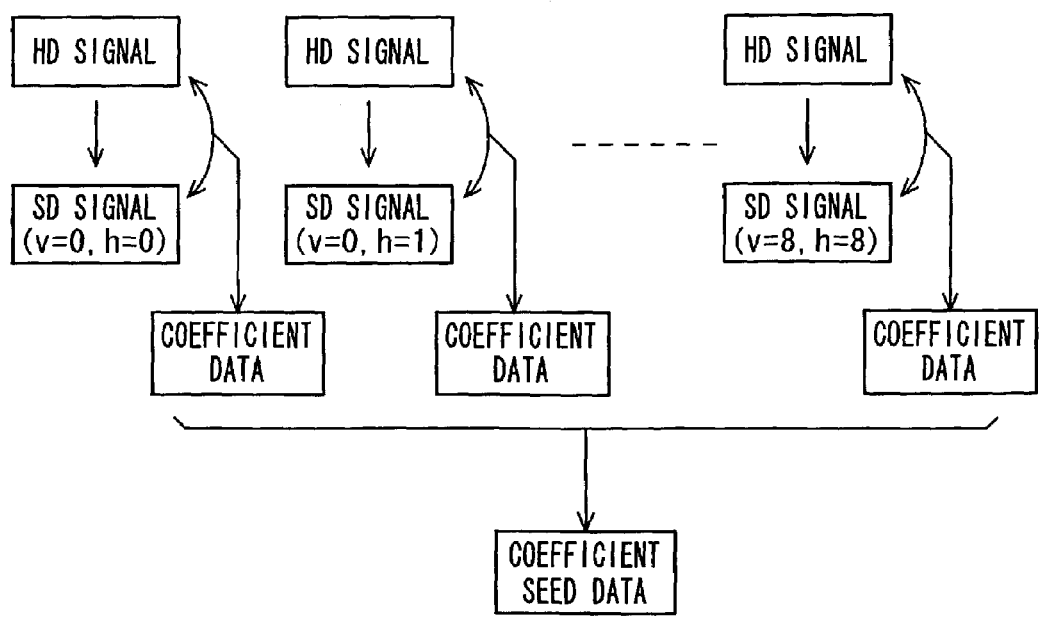

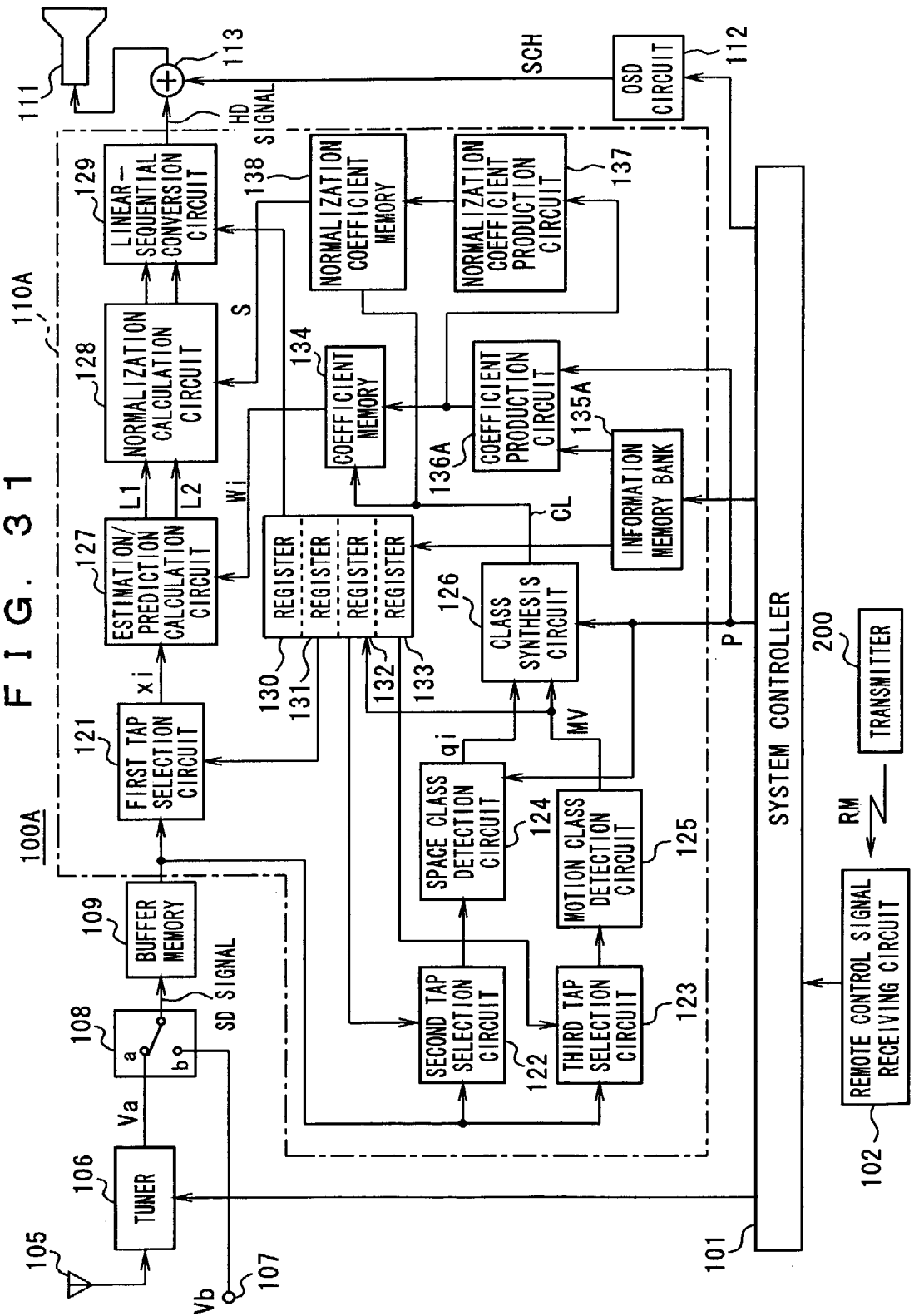

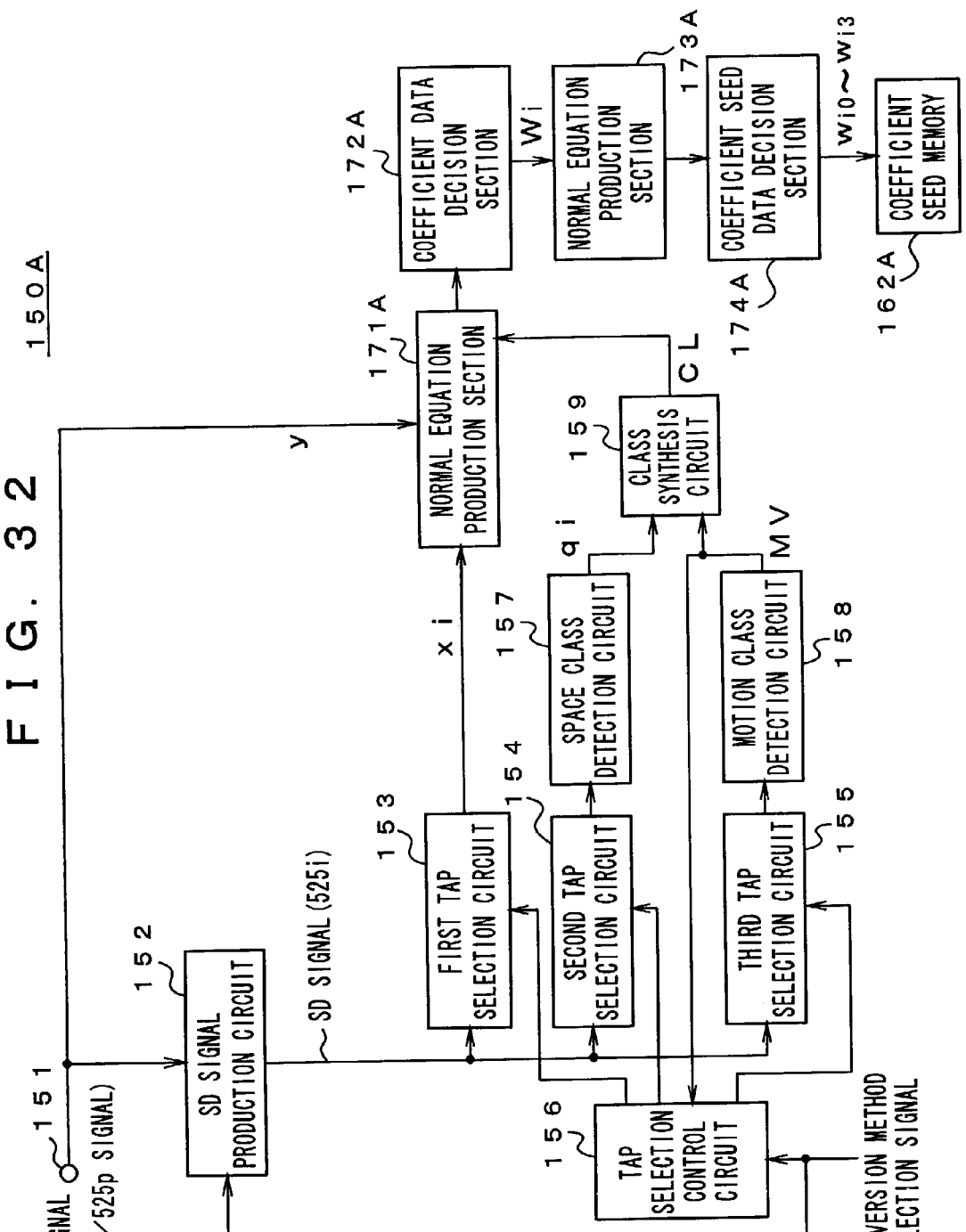

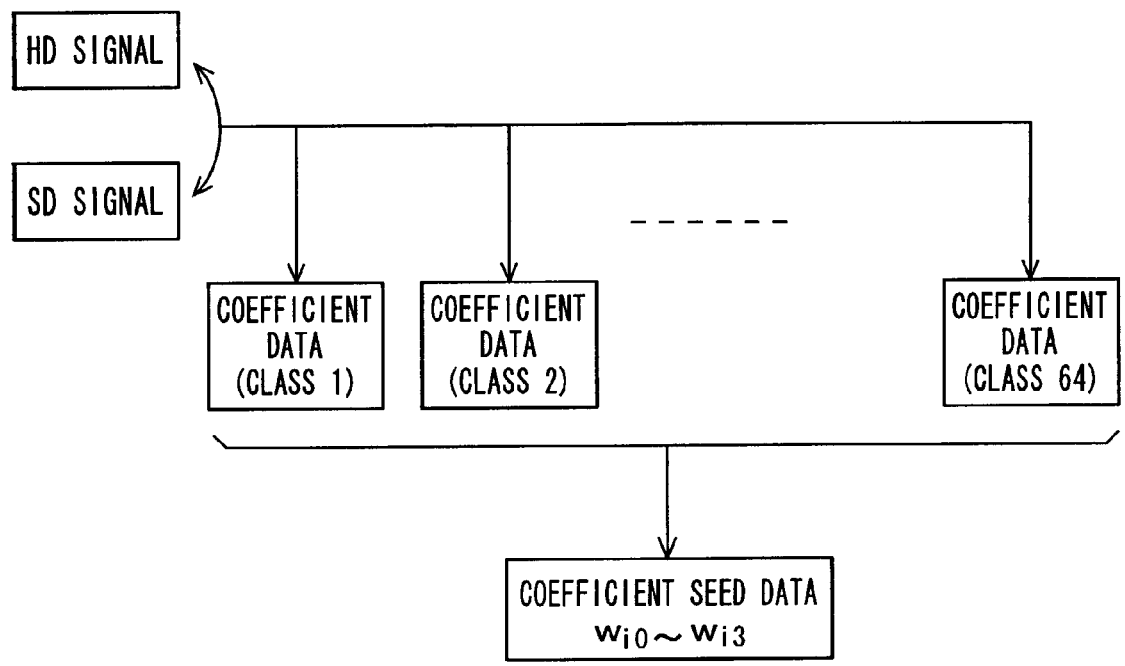
F I G. 3 3

INFORMATION SIGNAL PROCESSING DEVICE, INFORMATION SIGNAL PROCESSING METHOD, IMAGE SIGNAL PROCESSING DEVICE AND IMAGE DISPLAY DEVICE USING IT, COEFFICIENT TYPE DATA CREATING DEVICE USED THEREIN AND CREATING METHOD, AND INFORMATION PROVIDING MEDIUM

TECHNICAL FIELD

The invention relates to an information signal processor, a method for processing an information signal, an image signal processor and an image display apparatus using the same, a coefficient seed date production device used in the same and a method for producing coefficient seed data set, and an information-providing medium that are well suitable for use in conversion of, for example, an NTSC-system video signal into a High-Definition (hereinafter called Hi-vision) video signal. More specifically, the invention relates to an information signal processor and the like wherein coefficient data sets to be used in an estimation equation used in conversion of a first information signal into a second information signal are produced according to a production equation using both coefficient seed data sets, which are coefficient data sets in the production equation containing a predetermined parameter, and an input parameter value, thereby producing the coefficient data sets to be used in the estimation equation each data set corresponding to an arbitrary parameter value, without requiring a memory capable of storing a large number of coefficient data sets, and saving on the storage capacity of the memory.

BACKGROUND ART

A recent increase in audio-visual oriented applications has led to a desire for the development of a TV receiver that can obtain higher resolution images. In order to satisfy the desire in turn, a Hi-vision TV receiver has been developed. The Hi-vision TV receiver uses 1125 scanning lines, which are at least twice the number of the scanning lines used in an NTSC-system receiver of 525. Also, the Hi-vision receiver has an aspect ratio of 9:16 as compared to the NTSC-system receiver's aspect ratio of 3:4. As such, the Hi-vision receiver can display an image with a higher resolution and realism than the NTSC-system one.

Although the Hi-vision system has these excellent features, the Hi-vision receiver cannot display a Hi-vision image when an NTSC-system video signal is supplied as it is. The reason is that, as mentioned above, the NTSC system and the Hi-vision system have different standards.

To display the Hi-vision image corresponding to the NTSC-system video signal, the applicant of this application previously disclosed a converter for converting the NTSC-system video signal into the Hi-vision video signal (see Japanese Patent Application No. Hei 6-205934). This converter extracts, from an NTSC-system video signal, pixel data sets of a block (region) of the NTSC-system video signal, which correspond to an objective position in a Hi-vision video signal, thereby deciding a class including the pixel data set of the objective position based on level distribution patterns of the pixel data sets in this block and then producing the pixel data set of the objective position corresponding to this class.

In the above-mentioned converter, a memory beforehand stores the coefficient data sets to be used in the estimation equation of each class so that as more classes are to be grouped, the number of the required coefficient data sets to be used in the estimation equation also increases, thus requiring a mass-capacity of the memory.

Also, in the above-mentioned converter, an image according to the Hi-vision video signal has a fixed resolution and so cannot have a desired resolution corresponding to the image contents, unlike the conventional adjustment of contrast, sharpness, etc. To obtain a desired picture quality, therefore, a memory may beforehand store the coefficient data sets to be used in the estimation equation of every picture quality. This, however, leads to an increase in the amount of the required coefficient data sets to be used in the estimation equation, thus requiring a mass-capacity memory.

DISCLOSURE OF THE INVENTION

It is an object of the invention to provide an information signal processor and the like that can convert a first information signal into a second information signal using an estimation equation without requiring a memory for storing a large number of coefficient data sets, thus saving on the storage capacity of the memory. It is another object of the invention to provide, for example, an information processor and the like that are capable of adjusting a picture quality of an image smoothly and without steps.

An information signal processor in accordance with the invention for converting a first information signal containing plural informational data sets into a second information signal containing plural informational data sets, comprises storage means for storing coefficient seed data set obtained beforehand, the coefficient seed data set being coefficient data set in a production equation for producing coefficient data set that is used in an estimation equation, the production equation containing a predetermined parameter, parameter input means for inputting a value of a parameter, coefficient data generation means for generating such coefficient data set used in the estimation equation corresponding to the value of input parameter, the coefficient data set used in the estimation equation being produced according to the production equation using both the coefficient seed data set stored in the storage means and the value of parameter input by the parameter input means, data selection means for selecting plural informational data sets located on a periphery of an objective position in the second information signal based on the first information signal, and calculation means for calculating and obtaining informational data set of the objective position according to the estimation equation using both the coefficient data set generated by the coefficient data generation means and the plural informational data sets selected by the data selection means.

A method for processing an information signal in accordance with the invention by converting a first information signal containing plural informational data sets into a second information signal containing plural informational data sets, comprises a first step of producing coefficient data sets that is used in an estimation equation corresponding to a value of an input parameter according to a production equation for producing the coefficient data set used in the estimation equation using both coefficient seed data set obtained beforehand and a value of the input parameter, the coefficient seed data set being coefficient data set in the production equation, and the production equation containing a predetermined parameter, a second step of selecting plural informational data sets located on a periphery of an objective position in the second information signal based on the first information signal, and a third step of calculating and obtaining informational data set of the objective position according to the estimation equation using both the coefficient data set produced at the first step and the plural informational data sets selected at the second step.

By the invention, the coefficient seed data set thus obtained beforehand, which is coefficient data set in the production equation for producing the coefficient data set used in the estimation equation, is stored in the storage means and the production equation contain a predetermined parameter. For example, a parameter decides a quality (resolution, noise suppression degree, etc.) of an output based on the second information signal or corresponds to a class including the informational data set of the objective position in the second information signal.

As such, the coefficient seed data set stored in the storage means and the value of the input parameter are used to produce the coefficient data set used in the estimation equation according to the production equation wherein the coefficient data set used in the estimation equation corresponds to the value of the input parameter. Then, this coefficient data set and second plural informational data sets are used to generate the informational data set of the objective position according to the estimation equation.

It is thus possible to generate the coefficient data set to be used in the estimation equation, the coefficient data set corresponding to an arbitrary parameter value, without requiring a memory for storing a large number of coefficient data sets, thereby saving on the storage capacity of the memory.

Also, another information signal processor in accordance with the invention for converting a first information signal containing plural informational data sets into a second information signal containing plural informational data sets, comprises first data selection means for selecting first plural informational data sets located on a periphery of an objective position in the second information signal based on the first information signal, class detection means for detecting a class including an informational data set of the objective position based on the first plural informational data sets selected by the first data selection means, parameter adjustment means for adjusting a value of a parameter for deciding a quality of an output obtained by the second information signal, first storage means for storing coefficient seed data set obtained beforehand for each class detected by the class detection means, the coefficient seed data set being coefficient data set in a production equation for producing coefficient data set used in an estimation equation, the production equation containing the parameter, coefficient data generation means for generating the coefficient data set used in the estimation equation corresponding to the class detected by the class detection means and the value of parameter adjusted by the parameter adjustment means, the coefficient data set used in the estimation equation being produced according to the production equation using both the coefficient seed data set stored in the first storage means and the adjusted value of the parameter, second data selection means for selecting second plural informational data sets located on a periphery of the objective position in the second information signal based on the first information signal, and calculation means for calculating and obtaining informational data set of the objective position according to the estimation equation using both the coefficient data set generated by the coefficient data generation means and the second plural informational data sets selected by the second data selection means.

For example, the coefficient data generation means includes coefficient data production means for producing the coefficient data set used in the estimation equation for each class detected by the class detection means according to the production equation using the coefficient seed data set stored in the first storage means and the adjusted value of the parameter, second storage means for storing the coefficient data set used in the estimation equation produced by this coefficient data production means for each class, and coefficient data read-out means for reading out of the second storage means the coefficient data set used in the estimation equation corresponding to the class detected by the class detection means and then transmitting this coefficient data set.

Also, another method for processing an information signal in accordance with the invention by converting a first information signal containing plural informational data sets into a second information signal containing plural informational data sets, comprises a first step of selecting first plural informational data sets located on a periphery of an objective position in the second information signal based on the first information signal, a second step of detecting a class including an informational data set of the objective position based on the first plural informational data sets selected at the first step, a third step of adjusting a value of a parameter for deciding a quality of an output obtained by the second information signal, a fourth step of producing coefficient data set used in an estimation equation according to a production equation for producing the coefficient data set used in the estimation equation using both coefficient seed data set obtained beforehand for each class detected at the second step and a value of the parameter adjusted at the third step, the coefficient data set used in the estimation equation corresponding to the class detected at the second step and the adjusted value of the parameter, the coefficient seed data set being coefficient data set in the production equation, and the production equation containing the parameter, a fifth step of selecting second plural informational data sets located on a periphery of the objective position in the second information signal based on the first information signal, and a sixth step of calculating and obtaining the informational data set of the objective position according to the estimation equation using both the coefficient data set produced at the fourth step and the second plural informational data sets selected at the fifth step.

Also, an information-providing medium in accordance with the invention provides a computer program for executing each of the steps of the above-mentioned method for processing information signal.

An image signal processor in accordance with the invention for converting a first image signal containing plural pixel data sets into a second image signal containing plural pixel data sets, comprises first data selection means for selecting first plural pixel data sets located on a periphery of an objective position in the second image signal based on the first image signal, class detection means for detecting a class including pixel data set of the objective position based on the first plural pixel data sets selected by the first data selection means, parameter adjustment means for adjusting a value of a parameter for deciding a picture quality of an image obtained by the second image signal, storage means for storing coefficient seed data set obtained beforehand for each class detected by the class detection means, the coefficient seed data set being coefficient data set in a production equation for producing coefficient data set used in an estimation equation, and the production equation containing the parameter, coefficient data generation means for generating the coefficient data set used in the estimation equation corresponding to the class detected by the class detection means and the value of parameter adjusted by the parameter adjustment means, the coefficient data set used in the estimation equation being produced according to the production equation using both the coefficient seed data set stored in the storage means and the value of the parameter, second data selection means for selecting second plural pixel data sets located on a periphery of the objective position in the second image signal based on the first image signal, and calculation means for calculating and obtaining pixel data set of the objective position according to the estimation equation using both the coefficient data set generated by the coefficient data generation means and the second plural pixel data sets selected by the second data selection means.

Also, an image display apparatus in accordance with the invention comprises image signal input means for inputting a first image signal containing plural pixel data sets, image signal processing means for converting the first image signal input by the image signal input means into a second image signal containing plural pixel data sets and then transmitting the second image signal, image display means for displaying an image obtained by the second image signal received from the image signal processing means on an image display element, and parameter adjustment means for adjusting a value of a parameter for deciding a picture quality of the image displayed on the image display device. This image signal processing means includes first data selection means for selecting first plural pixel data sets located on a periphery of an objective position in the second image signal based on the first image signal, class detection means for detecting a class including pixel data set of the objective position based on the first plural pixel data sets selected by the first data selection means, first storage means for storing coefficient seed data set obtained beforehand for each class detected by the class detection means, the coefficient seed data set being coefficient data set in a production equation for producing coefficient data set used in an estimation equation, and the production equation containing the parameter, coefficient data generation means for generating the coefficient data set used in the estimation equation corresponding to the class detected by the class detection means and a value of the parameter adjusted by the parameter adjustment means, the coefficient data set used in the estimation equation being produced by the production equation using both the coefficient seed data set stored in the first storage means and the adjusted value of the parameter, second data selection means for selecting second plural pixel data sets located on a periphery of the objective position in the second image signal based on the first image signal, and calculation means for calculating and obtaining pixel data set of the objective position according to the estimation equation using both the coefficient data set generated by the coefficient data generation means and the second plural pixel data sets selected by the second data selection means.

According to the invention, first plural informational data sets located on a periphery of the objective position in the second information signal are selected based on the first information signal. Based on the first plural informational data sets, a class including the informational data set of the objective position is then detected. For example, level distribution patterns of the first plural informational data sets are detected. Based on the level distribution patterns, the class including the informational data set of the objective position is in turn detected. Also, second plural informational data sets located on a periphery of the objective position in the second information signal are selected based on the first information signal. The first and second data selection means may be constituted commonly in use and thus, the first and second plural informational data sets may also be the same as each other. The information signal here is an image signal or an audio signal, for example.

The parameter adjustment means adjusts a value of the parameter to decide a quality of an output obtained by the second information signal. For example, if the information signal is an image one, a value of the parameter is adjusted to decide the picture quality of an image obtained by the second information signal (image signal). On the other hand, if the information signal is an audio one, the parameter value is adjusted to decide the quality of a sound obtained by the second information signal (audio signal). For example, the parameter adjustment means may comprise display means for displaying an adjust position of the parameter and user operation means for permitting a user to adjust a value of the parameter with referencing contents displayed by this display means. As such, the user can operate the user operation means such as a pointing device to easily adjust the value of parameter to a desired position.

In this configuration, informational data set of the objective position is produced corresponding to the detected class and the adjusted value of the parameter. That is, the storage means stores the coefficient seed data set, which is coefficient data set in the production equation for producing coefficient data set used in the estimation equation and is obtained beforehand for each class. Using the coefficient seed data set and the adjusted value of the parameter, the coefficient data set used in the estimation equation is produced corresponding to the detected class and the adjusted value of the parameter. The informational data set of the objective position is produced according to the estimation equation using this coefficient data set and the second plural informational data sets.

Thus, according to the invention, the coefficient data set used in the estimation equation used in conversion of the first information signal into the second information signal is produced using the coefficient seed data set. Therefore, it is possible to easily obtain the coefficient data set that corresponds to the detected class and the adjusted value of the parameter, thereby adjusting the quality of an output such as picture quality of an image, obtained by the second information signal smoothly without steps.

By obtaining a total sum of the coefficient data set to be used in the estimation equation produced using the coefficient seed data set, and dividing the informational data set of the objective position produced using the estimation equation as mentioned above by this total sum to then normalize it, it is possible to remove fluctuations in level of the informational data set of the objective position due to a rounding error that occurs when the coefficient data set used in the estimation equation is obtained according to the production equation using the coefficient seed data set.

Alternatively, an information signal processor in accordance with the invention for converting a first information signal containing plural informational data sets into a second information signal containing plural informational data sets, comprises first data selection means for selecting first plural informational data sets located on a periphery of an objective position in the second information signal based on the first information signal, class detection means for detecting a class including informational data set of the objective position based on the first plural informational data sets selected by the first data selection means, first storage means for storing coefficient seed data set, the coefficient seed data set being coefficient data set in a production equation for producing coefficient data set used in an estimation equation, and the production equation containing a parameter corresponding to the class detected by the class detection means, coefficient data generation means for generating the coefficient data set used in the estimation equation corresponding to a value of the class detected by the class detection means, the coefficient data set used in the estimation equation being produced according to the production equation using both the coefficient seed data set stored in the first storage means and the value of the class detected by the class detection means, second data selection means for selecting second plural informational data sets located on a periphery of the objective position in the second information signal based on the first information signal, and calculation means for calculating and obtaining informational data set of the objective position according to the estimation equation using both the coefficient data set generated by the coefficient data generation means and the second plural informational data sets selected by the second data selection means.

For example, the information signal processor in accordance with the invention may include parameter input means for inputting a value of the parameter into the class detection means, the parameter deciding a fineness degree of class grouping. Also, for example, the coefficient data generation means may include coefficient data production means for producing the coefficient data set used in the estimation equation for each class detected by the class detection means according to the production equation using the coefficient seed data set stored in the first storage means and a value of the input parameter, second storage means for storing the coefficient data set used in the estimation equation for each class produced by the coefficient data production means, and coefficient data read-out means for reading out of the second storage means the coefficient data set used in the estimation equation corresponding to the class detected by the class detection means and then transmitting the coefficient data set.

Also, a method for processing information signal in accordance with the invention by converting a first information signal containing plural informational data sets into a second information signal containing plural informational data sets, comprises a first step of selecting first plural informational data sets located on a periphery of an objective position in the second information signal based on the first information signal, a second step of detecting a class including informational data set of the objective position based on the first plural informational data sets selected at the first step, a third step of producing coefficient data set used in an estimation equation according to a production equation for producing the coefficient data set used in the estimation equation using coefficient seed data set, the coefficient data set used in the estimation equation corresponding to a value of the class detected at the second step, the coefficient seed data set being coefficient data set in the production equation, and the production equation containing a parameter corresponding to the class detected at the second step, a fourth step of selecting second plural informational data sets located on a periphery of the objective position in the second information signal based on the first information signal, and a fifth step of calculating and obtaining the informational data set of the objective position according to the estimation equation using both the coefficient data set produced at the third step and the second plural informational data sets selected at the fourth step.

Also, an information-providing medium in accordance with the invention provides a computer program for executing each of the steps of the above-mentioned method for processing information signal.

Also, an image signal processor in accordance with the invention for converting a first image signal containing plural pixel data sets into a second image signal containing plural pixel data sets, comprises first data selection means for selecting first plural pixel data sets located on a periphery of an objective position in the second image signal based on the first image signal, class detection means for detecting a class including pixel data set of the objective position based on the first plural pixel data sets selected by the first data selection means, storage means for storing coefficient seed data set, the coefficient seed data set being coefficient data set in a production equation for producing coefficient data set used in an estimation equation, and the production equation containing a parameter corresponding to the class detected by the class detection means, coefficient data generation means for generating such coefficient data set used in the estimation equation corresponding to a value of the class detected by the class detection means, the coefficient data set used in the estimation equation being produced according to the production equation using both the coefficient seed data set stored in the storage means and the value of the class detected by the class detection means, second data selection means for selecting second plural pixel data sets located on a periphery of the objective position in the second image signal based on the first image signal, and calculation means for calculating and obtaining pixel data set of the objective position according to the estimation equation using both the coefficient data set generated by the coefficient data generation means and the second plural pixel data sets selected by the second data selection means.

Also, an image display apparatus in accordance with the invention comprises image signal input means for inputting a first image signal containing plural pixel data sets, image signal processing means for converting the first image signal received from the image signal input means into a second image signal containing plural pixel data sets and then transmitting the second image signal, and image display means for displaying an image obtained by the second image signal received from the image signal processing means on an image display element. This image signal processing means includes first data selection means for selecting first plural pixel data sets located on a periphery of an objective position in the second image signal based on the first image signal, class detection means for detecting a class including pixel data set of the objective position based on the first plural pixel data sets selected by the first data selection means, first storage means for storing coefficient seed data set, the coefficient seed data set being coefficient data set in a production equation for producing coefficient data set used in an estimation equation, and the production equation containing a parameter corresponding to the class detected by the class detection means, coefficient data generation means for generating the coefficient data set used in the estimation equation corresponding to a value of the class detected by the class detection means, the coefficient data set used in the estimation equation being produced according to the production equation using both the coefficient seed data set stored in the first storage means and the value of the class detected by the class detection means, second data selection means for selecting second plural pixel data sets located on a periphery of the objective position in the second image signal based on the first image signal, and calculation means for calculating and obtaining the pixel data set of the objective position according to the estimation equation using both the coefficient data set generated by the coefficient data generation means and the second plural pixel data sets selected by the second data selection means.

According to the invention, plural informational data sets located on a periphery of the objective position in the second information signal are selected on the basis of the first information signal so that a class including the informational data set of the objective position is then detected on the basis of the first plural informational data sets. For example, level distribution patterns of the first plural informational data sets are detected so that a class including the informational data set of the objective position is then detected on the basis of the level distribution patterns. Also, second plural informational data sets located on a periphery of the objective position in the second information signal are selected on the basis of the first information signal. The first and second data selection means may be constituted commonly in use and thus, the first and second plural informational data sets may be the same as each other. The information signal here is an image signal or an audio signal, for example.

In this configuration, the informational data set of the objective position is produced corresponding to the class thus detected. That is, the storage means stores the coefficient seed data set, which is coefficient data set in the production equation for producing coefficient data set used in the estimation equation, wherein the production equation has a parameter corresponding to the class detected by the class detection means. This coefficient seed data set and a value of the class detected by the class detection means are used to generate the coefficient data set used in the estimation equation, which corresponds to the value of the detected class. The coefficient data set is used along with the second plural informational data sets, thereby producing the informational data set of the objective position according to the estimation equation.

According to this invention, such coefficient data set used in the estimation equation used in conversion of the first information signal into the second information signal can be produced according to the production equation using the coefficient seed data set, without requiring a memory for storing a large number of coefficient data sets, thus saving on the storage capacity of the memory.

By obtaining a total sum of the coefficient data set used in the estimation equation, the coefficient data set being produced using the coefficient seed data set, and dividing the informational data set of the objective position produced according to the estimation equation as mentioned above by this total sum to then normalize it, it is possible to remove fluctuations in level of the informational data set of the objective position due to a rounding error that occurs when the coefficient data set used in the estimation equation is obtained according to the production equation using the coefficient seed data set.

Also, by inputting a value of the parameter for deciding a fineness degree of class grouping into the class detection means, it is possible to change the fineness degree of grouping classes to be detected by the class detection means. For example, the value of this parameter is adjusted with the user operation means. Also, for example, the parameter value is automatically changed corresponding to a predetermined characteristic amount detected from the first information signal. Further, for example, the parameter value is automatically changed on the basis of information extracted from the first information signal.

Generally, the more finely grouped the classes detected by the class detection means are, the more the quality of an output by the second information signal is improved. At a certain degree of grouping classes at the time of learning, however, no matter how finely the classes detected by the class detection means are grouped, the quality of the output by the second information signal cannot be improved or even may be worsened depending on the first information signal of a motion picture, a still picture, an animation picture, etc. The quality of the output by the second information signal can be adjusted optimally by establishing such a configuration that a value of the parameter for deciding the class grouping fineness degree is input into the class detection means.

Additionally, a coefficient seed data production device in accordance with the invention for producing coefficient seed data set, the coefficient seed data set being coefficient data set in a production equation for producing coefficient data set used in an estimation equation for converting a first information signal containing plural informational data sets into a second information signal containing plural informational data sets, comprises signal processing means for processing a teacher signal corresponding to the second information signal to obtain an input signal corresponding to the first information signal, parameter adjustment means for adjusting a value of a parameter for deciding a quality of an output obtained from the input signal, the value corresponding to a parameter contained in the production equation, first data selection means for selecting first plural informational data sets located on a periphery of an objective position in the teacher signal based on the input signal, class detection means for detecting a class including an informational data set of the objective position based on the first plural informational data sets selected by the first data selection means, second data selection means for selecting second plural informational data sets located on a periphery of the objective position in the teacher signal based on the input signal, normal equation production means for producing a normal equation for obtaining the coefficient seed data set for each class using the class detected by the class detection means, the second plural informational data sets selected by the second data selection means, and the informational data set of the objective position in the teacher signal, and coefficient seed data calculation means for solving the normal equation to obtain the coefficient seed data set for each class.

Also, a method for producing coefficient seed data set in accordance with the invention, the coefficient seed data set being coefficient data set in a production equation for producing coefficient data set used in an estimation equation for converting a first information signal containing plural informational data sets into a second information signal containing plural informational data sets, comprises a first step of processing a teacher signal corresponding to the second information signal to obtain an input signal corresponding to the first information signal, a second step of adjusting a value of a parameter for deciding a quality of an output obtained from the input signal, the value corresponding to a parameter contained in the production equation, a third step of selecting first plural informational data sets located on a periphery of an objective position in the teacher signal based on the input signal, a fourth step of detecting a class including an informational data set of the objective position based on the first plural informational data sets selected at the third step, a fifth step of selecting second plural informational data sets located on a periphery of the objective position in the teacher signal based on the input signal, a sixth step of producing a normal equation for obtaining the coefficient seed data set for each class using the class detected at the fourth step, the second plural informational data sets selected at the fifth step, and the informational data set of the objective position in the teacher signal, and a seventh step of solving the normal equation to obtain the coefficient seed data set for each class.

Also, an information-providing medium in accordance with the invention provides a computer program for executing each of the steps of the above-mentioned method for producing coefficient seed data set.

According to the invention, a teacher signal corresponding to the second information signal is processed to obtain an input signal corresponding to the first information signal. In this case, the value of the parameter is adjusted to decide a quality of the output obtained from the input signal. For example, if the information signal is an image signal, the parameter value is adjusted to decide the picture quality of an image obtained from the input signal. If the information signal is an audio one, the parameter value is adjusted to decide the quality of a sound obtained from the input signal.

Based on this input signal are selected first plural informational data sets located on a periphery of an objective position in the teacher signal, and based on the first plural informational data sets is detected a class including the informational data set of the objective position. Based on this input signal are also selected second plural informational data sets located on a periphery of the objective position in the teacher signal.

In this configuration, such a value of the parameter is adjusted in plural steps, and then, the normal equation for obtaining coefficient seed data set is produced for each class using the class including the informational data set of the objective position in the teacher signal, the selected second plural informational data sets, and the informational data set of the objective position in the teacher signal. The normal equation is then solved to obtain the coefficient seed data set for each class.

The coefficient seed data set here refers to coefficient data set in the production equation, which contains a parameter, for producing coefficient data set used in the estimation equation for converting the first information signal into the second information signal. By using the coefficient seed data set, it is possible to obtain the coefficient data set corresponding to an arbitrarily adjusted value of the parameter according to the production equation. By thus adjusting a value of the parameter when converting the first information signal into the second information signal using the estimation equation, it is possible to adjust a quality of the output obtained by the second information signal, for example, the picture quality of an image, smoothly without steps.

Also, a coefficient seed data production device in accordance with the invention for producing coefficient seed data set, the coefficient seed data set being coefficient data set in a production equation for producing coefficient data set used in an estimation equation for converting a first information signal containing plural informational data sets into a second information signal containing plural informational data sets, comprises signal processing means for processing a teacher signal corresponding to the second information signal to obtain an input signal corresponding to the first information signal, parameter adjustment means for adjusting a value of a parameter for deciding a quality of an output obtained from the input signal, the value corresponding to a parameter contained in the production equation, first data selection means for selecting first plural informational data sets located on a periphery of an objective position in the teacher signal based on the input signal, class detection means for detecting a class including an informational data set of the objective position based on the first plural informational data sets selected by the first data selection means, second data selection means for selecting second plural informational data sets located on a periphery of the objective position in the teacher signal based on the input signal, first normal equation production means for producing a first normal equation for obtaining the coefficient data set used in the estimation equation for each combination of the class detected by the class detection means and the value of parameter adjusted by the parameter adjustment means using the class detected by the class detection means, the second plural informational data sets selected by the second data selection means, and the informational data set of the objective position in the teacher signal, coefficient data calculation means for solving the first normal equation to obtain the coefficient data set used in the estimation equation for the each combination, second normal equation production means for producing a second normal equation for obtaining the coefficient seed data set for each class using the coefficient data set for each combination obtained by the coefficient data calculation means, and coefficient seed data calculation means for solving the second normal equation to obtain the coefficient seed data set for each class.

Also, a method for producing coefficient seed data set in accordance with the invention, the coefficient seed data set being coefficient data set in a production equation for producing coefficient data set used in an estimation equation for converting a first information signal containing plural informational data sets into a second information signal containing plural informational data sets, comprises a first step of processing a teacher signal corresponding to the second information signal to obtain an input signal corresponding to the first information signal, a second step of adjusting a value of a parameter for deciding a quality of an output obtained from the input signal, the value corresponding to a parameter contained in the production equation, a third step of selecting first plural informational data sets located on a periphery of an objective position in the teacher signal based on the input signal, a fourth step of detecting a class including an informational data set of the objective position based on the first plural informational data sets selected at the third step, a fifth step of selecting second plural informational data sets located on a periphery of the objective position in the teacher signal based on the input signal, a sixth step of producing a first normal equation for obtaining the coefficient data set used in the estimation equation for each combination of the class and the value of parameter using the class detected at the fourth step, the second plural informational data sets selected at the fifth step, and the informational data set of the objective position in the teacher signal, a seventh step of solving the first normal equation to obtain the coefficient data set used in the estimation equation for each combination, an eighth step of producing a second normal equation for obtaining the coefficient seed data set for each class using the coefficient data set for each combination obtained at the seventh step, and a ninth step of solving the second normal equation to obtain the coefficient seed data set for each class.

Also, an information-providing medium in accordance with the invention provides a computer program for executing each of the steps of the above-mentioned method for producing coefficient seed data set.

According to the invention, a teacher signal corresponding to the second information signal is processed to obtain an input signal corresponding to the first information signal. In this case, a value of the parameter is adjusted to decide a quality of the output obtained from the input signal. For example, if the information signal is an image signal, the parameter value is adjusted to decide the picture quality of an image obtained from the input signal. If the information signal is an audio one, the parameter value is adjusted to decide the quality of a sound obtained from the input signal.

Based on this input signal are selected first plural informational data sets located on a periphery of an objective position in the teacher signal, and based on the first plural informational data sets is detected a class including the informational data set of the objective position. Based on this input signal are also selected second plural informational data sets located on a periphery of the objective position in the teacher signal.

In this configuration, such a value of the parameter is sequentially adjusted in plural steps, and then, the first normal equation for obtaining coefficient data set used in the estimation equation is produced for each combination of the class and the value of parameter using the class including the informational data set of the objective position in the teacher signal, the selected second plural informational data sets, and the informational data set of the objective position in the teacher signal. The first normal equation is then solved to obtain the coefficient data set used in the estimation equation for each combination.

Further, the second normal equation for obtaining the coefficient seed data set is produced for each class using the coefficient data set for each combination and then, the second normal equation is in turn solved to obtain the coefficient seed data set for each class.

The coefficient seed data set here refers to coefficient data set in the production equation, which contains a parameter, for producing coefficient data set used in the estimation equation for converting the first information signal into the second information signal. By using the coefficient seed data set, it is possible to obtain the coefficient data set used in the estimation equation corresponding to an arbitrarily adjusted value of the parameter according to the production equation. By thus adjusting the value of the parameter when converting the first information signal into the second information signal according to the estimation equation, it is possible to adjust a quality of the output obtained by the second information signal, for example, the picture quality of an image, smoothly without steps.

Also, a coefficient seed data production device in accordance with the invention for producing coefficient seed data set, the coefficient seed data set being coefficient data set in a production equation for producing coefficient data set used in an estimation equation for converting a first information signal containing plural informational data sets into a second information signal containing plural informational data sets, and the production equation containing a parameter corresponding to a class including an informational data set of an objective position in a teacher signal corresponding to the second information signal, comprises signal processing means for obtaining an input signal corresponding to the first information signal, first data selection means for selecting first plural informational data sets located on a periphery of the objective position in the teacher signal based on the input signal, class detection means for detecting the class including the informational data set of the objective position based on the first plural informational data sets selected by the first data selection means, second data selection means for selecting second plural informational data sets located on a periphery of the objective position in the teacher signal based on the input signal, normal equation production means for producing a normal equation for obtaining the coefficient seed data set using the class detected by the class detection means, the second plural informational data sets selected by the second data selection means, and the informational data set of the objective position in the teacher signal, and coefficient seed data calculation means for solving the normal equation to obtain the coefficient seed data set.

Also, a method for producing the coefficient seed data set in accordance with the invention, the coefficient seed data set being coefficient data set in a production equation for producing coefficient data set used in an estimation equation for converting a first information signal containing plural informational data sets into a second information signal containing plural informational data sets, and the production equation containing a parameter corresponding to a class including an informational data set of an objective position in a teacher signal corresponding to the second information signal, comprises a first step of obtaining an input signal corresponding to the first information signal, a second step of selecting first plural informational data sets located on a periphery of the objective position in the teacher signal based on the input signal, a third step of detecting the class including the informational data set of the objective position based on the first plural informational data sets selected at the second step, a fourth step of selecting second plural informational data sets located on a periphery of the objective position in the teacher signal based on the input signal, a fifth step of producing a normal equation of obtaining the coefficient seed data set using the class detected at the third step, the second plural informational data sets selected at the fourth step, and the informational data set of the objective position in the teacher signal, and a sixth step of solving the normal equation to obtain the coefficient seed data set.

Also, an information-providing medium in accordance with the invention provides a computer program for executing each of the steps of the above-mentioned method for producing the coefficient seed data set.

According to the invention, the teacher signal corresponding to the second information signal is processed to obtain the input signal corresponding to the first information signal. Based on this input signal are selected first plural informational data sets located on a periphery of an objective position in the teacher signal, and based on the first plural informational data sets is detected the class including the informational data set of the objective position. Based on the input signal are also selected second plural informational data sets located on a periphery of the objective position in the teacher signal.

In this configuration, the normal equation for obtaining coefficient seed data is produced using the class including the informational data set of the objective position in the teacher signal, the selected second plural informational data sets, and the informational data set of the objective position in the teacher signal. The normal equation is then solved to obtain the coefficient data set.

The coefficient seed data set here is coefficient data set on which the coefficient data set in an estimation equation used in conversion of the first information signal into the second information signal is produced for each class. By using this coefficient seed data set, it is possible to obtain the coefficient data set used in the estimation equation for each class according to the production equation.

Also, a coefficient seed data production device in accordance with the invention for producing coefficient seed data set, the coefficient seed data set being coefficient data set in a production equation for producing coefficient data set used in an estimation equation for converting a first information signal containing plural informational data sets into a second information signal containing plural informational data sets, and the production equation containing a parameter corresponding to a class including an informational data set of an objective position in a teacher signal corresponding to the second information signal, comprises signal processing means for obtaining an input signal corresponding to the first information signal, first data selection means for selecting first plural informational data sets located on a periphery of the objective position in the teacher signal based on the input signal, class detection means for detecting the class including the informational data set of the objective position based on the first plural informational data sets selected by the first data selection means, second data selection means for selecting second plural informational data sets located on a periphery of the objective position in the teacher signal based on the input signal, first normal equation production means for producing a first normal equation for obtaining the coefficient data set used in the estimation equation for each class detected by the class detection means using the class detected by the class detection means, the second plural informational data sets selected by the second data selection means, and the informational data set of the objective position in the teacher signal, coefficient data calculation means for solving the first normal equation to obtain the coefficient data set used in the estimation equation for the each class, second normal equation production means for producing a second normal equation for obtaining the coefficient seed data set using the coefficient data set for each class obtained by the coefficient data calculation means, and coefficient seed data calculation means for solving the second normal equation to obtain the coefficient seed data set.

Also, a method for producing coefficient seed data set in accordance with the invention, the coefficient seed data set being coefficient data set in a production equation for producing coefficient data set used in an estimation equation for converting a first information signal containing plural informational data sets into a second information signal containing plural informational data sets, and the production equation containing a parameter corresponding to a class including an informational data set of an objective position in a teacher signal corresponding to the second information signal, comprises a first step of obtaining an input signal corresponding to the first information signal, a second step of selecting first plural informational data sets located on a periphery of the objective position in the teacher signal based on the input signal, a third step of detecting the class including the informational data set of the objective position based on the first plural informational data sets selected at the second step, a fourth step of selecting second plural informational data sets located on a periphery of the objective position in the teacher signal based on the input signal, a fifth step of producing a first normal equation for obtaining the coefficient data set used in the estimation equation for each class using the class detected at the third step, the second plural informational data sets selected at the fourth step, and the informational data set of the objective position in the teacher signal, a sixth step of solving the first normal equation to obtain the coefficient data set used in the estimation equation for each class, a seventh step of producing a second normal equation for obtaining the coefficient seed data set using the coefficient data set for each class obtained at the sixth step, and an eighth step of solving the second normal equation to obtain the coefficient seed data set.

Also, an information-providing medium in accordance with the invention provides a computer program for executing each of the steps of the above-mentioned method for producing coefficient seed data set.

According to the invention, a teacher signal corresponding to the second information signal is processed to obtain an input signal corresponding to the first information signal. Based on this input signal are selected first plural informational data sets located on a periphery of an objective position in the teacher signal, and based on the first plural informational data sets is detected the class including the informational data set of the objective position. Based on the input signal are also selected second plural informational data sets located on a periphery of the objective position in the teacher signal.

In this configuration, the first normal equation for obtaining the coefficient data set used in the estimation equation is produced for each class using the class including the informational data set of the objective position in the teacher signal, the selected second plural informational data sets, and the informational data set of the objective position in the teacher signal. The first normal equation is then solved to obtain the coefficient data set used in the estimation equation for each class.

Further, the second normal equation for obtaining the coefficient seed data set is produced using the coefficient data set for each class. The second normal equation is in turn solved to obtain the coefficient seed data set.

The coefficient seed data set here is the coefficient data set on which the coefficient data set in the estimation equation used in conversion of the first information signal into the second information signal is produced for each class. By using the coefficient seed data set, it is possible to obtain the coefficient data set used in the estimation equation for each class according to the production equation.

BRIEF DESCRIPTION OF THE DRAWINGS

FIG. 18 is a block diagram showing a configuration example of a coefficient seed data production device;

FIG. 19 is a graph showing one example of a frequency response of a band-pass filter;

FIG. 20 is an illustration showing concept of another example of the method for producing coefficient seed data;

FIG. 31 is a block diagram showing a configuration of the TV receiver according to another embodiment of the invention;

FIG. 32 is a block diagram showing a configuration example of the coefficient seed data production device; and FIG. 33 is an illustration showing a concept of a method for producing coefficient seed data.

BEST MODE FOR CARRYING OUT THE INVENTION

Figure 1:
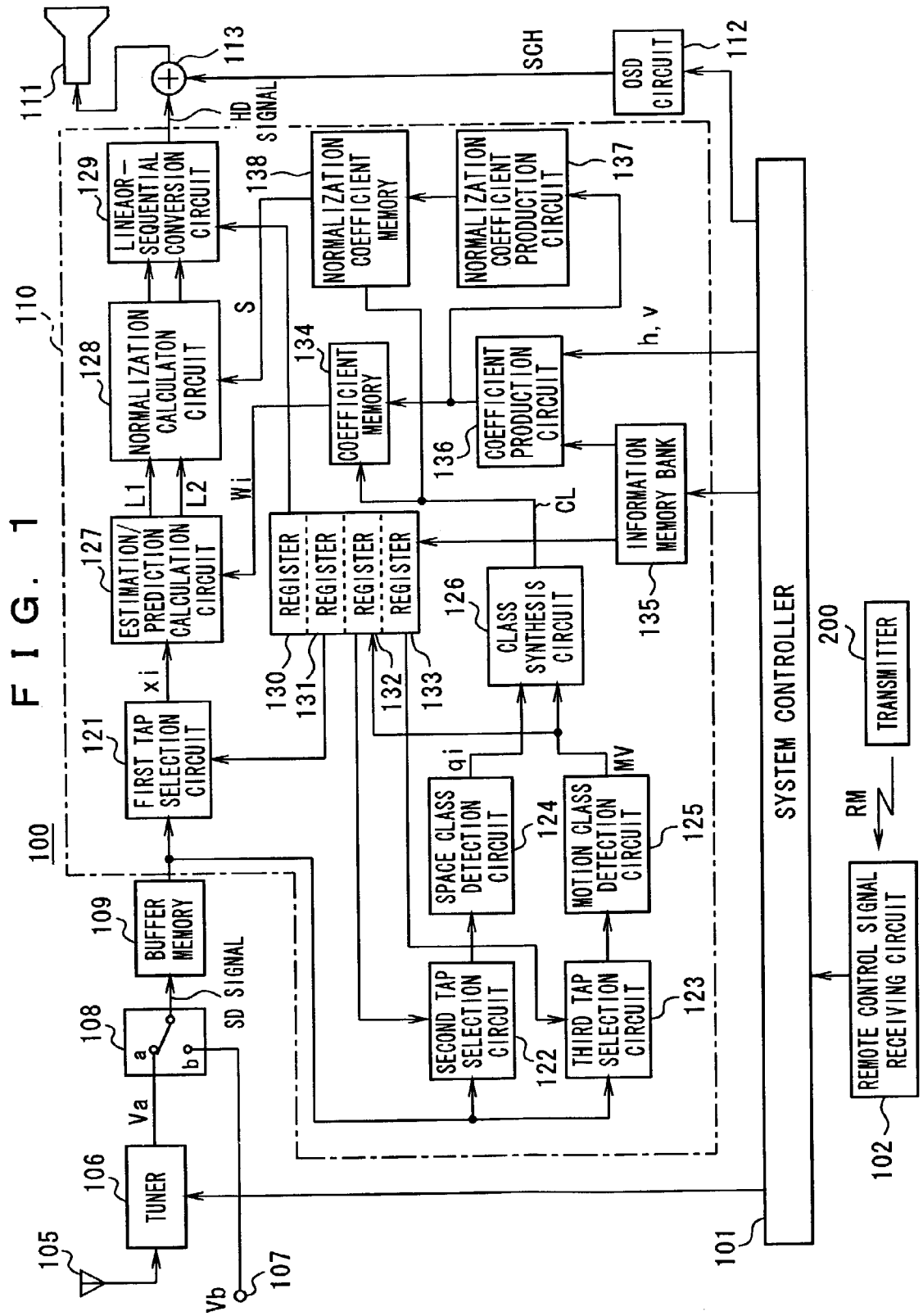
FIG. 1 is a block diagram showing a configuration of a TV receiver according to an embodiment of the invention.

The following will describe embodiments of the invention with reference to the drawings. FIG. 1 shows a configuration of a TV receiver 100 according to an embodiment of the invention. The TV receiver 100 receives a 525i signal as a Standard Definition (SD) signal from a broadcast signal and then converts this 525i signal into a 525p or 1050i signal as a High Definition (HD) signal to display an image by means of the 525p or 1050i signal.

Here, the 525i signal refers to an interlacing-system image signal having 525 lines, the 525p signal refers to a progressive-system (non-interlacing-system) image signal having 525 lines, and the 1050i signal refers to an interlacing-system image signal having 1050 lines.

The TV receiver 100 comprises a system controller 101 with a microcomputer for controlling the operations of the overall system, and a remote control signal receiving circuit 102 for receiving a remote control signal. The remote control signal receiving circuit 102 is connected, in configuration, to the system controller 101, and it is constituted so as to receive a remote control signal RM which a remote control transmitter 200 transmits when the user operates the transmitter 200 and then to supply the system controller 101 with an operation signal corresponding to the signal RM.

Also, the TV receiver 100 also comprises a reception antenna 105, a tuner 106 for receiving a broadcast signal (RF modulated signal) captured by the reception antenna 105 and performing processing such as channel selection processing, intermediate-frequency amplification processing, wave detection processing to obtain the above-mentioned SD signal Va (525i signal), an external input terminal 107 for inputting an external SD signal Vb (525i signal), a transfer switch 108 for selectively transmitting any one of the SD signals Va and Vb, and a buffer memory 109 for temporarily storing the SD signal received from the transfer switch 108.

The SD signal Va transmitted from the tuner 106 is supplied to the a-side fixed terminal of the transfer switch 108, while the SD signal Vb received through the external input terminal 107 is supplied to the b-side fixed terminal of the transfer switch 108. The system controller 101 controls the transfer operations of the transfer switch 108.

Also, the TV receiver 100 comprises an image signal processing section 110 for converting the SD signal (525i signal) temporarily stored in the buffer memory 109 into the HD signal (525p or 1050i signal), a display section 111 for displaying an image produced by means of the HD signal received from the image signal processing section 110, an On-Screen Display (OSD) circuit 112 for generating a display signal SCH for displaying characters, graphics, etc. on a screen of the display section 111, and a synthesizer 113 for synthesizing the display signal SCH and the HD signal received from the image signal processing section 110 to then supply it to the display section 111.

The display section 111 comprises a Cathode Ray Tube (CRT) or a flat panel display such as a Liquid Crystal Display (LCD). Also, the OSD circuit 112 generates the display signal SCH under the control of the system controller 101.

The following will describe the operations of the TV receiver 100 with reference to FIG. 1.

If the user operates a remote control transmitter 200 to select a mode in which an image according to the SD signal Va transmitted from the tuner 106 is displayed, the transfer switch 108 is connected to the a-side terminal under the control of the system controller 101 so that the SD signal Va can be transmitted from the transfer switch 108. If the user operates the remote control transmitter 200 to select a mode in which an image according to the SD signal Vb received through the external input terminal 107 is displayed, the transfer switch 108 is connected to the b-side terminal under the control of the system controller 101 so that the SD signal Vb can be transmitted from the transfer switch 108.

The SD signal (525i signal) thus transmitted from the transfer switch 108 is recorded on the buffer memory 109, which temporarily stores it. Then, the SD signal temporarily stored in the buffer memory 109 is supplied to the image signal processing section 110, which converts it into an HD signal (525p or 1050i signal). That is, the image signal processing section 110 obtains pixel data sets constituting the HD signal (hereinafter called "HD pixel data sets") from pixel data sets constituting the SD signal (hereinafter called "SD pixel data sets"). In this case, the user can select either the 525p signal or the 1050i signal when he or she operates the remote control transmitter 200. The HD signal transmitted from the image signal processing section 110 is supplied through the synthesizer 113 to the display section 111, which then displays an image based on the HD signal on its screen.

Also, although not described in the above, the user can operate the remote control transmitter 200 to adjust the horizontal and vertical resolutions of the image displayed on the screen of the display section 111 smoothly without steps as mentioned above. The image signal processing section 110 calculates HD pixel data sets according to an estimation equation, which will be described later. As coefficient data sets to be used in this estimation equation, the data sets corresponding to parameters h and v for deciding the respective horizontal and vertical resolutions adjusted by the user through operations of the remote control transmitter 200 are produced according to a production equation containing these parameters h, v and are used. As such, the horizontal and vertical resolutions of the image based on the HD signal transmitted from the image signal processing section 110 result in a correspondence with the adjusted parameters h and v, respectively.

Figure 2:
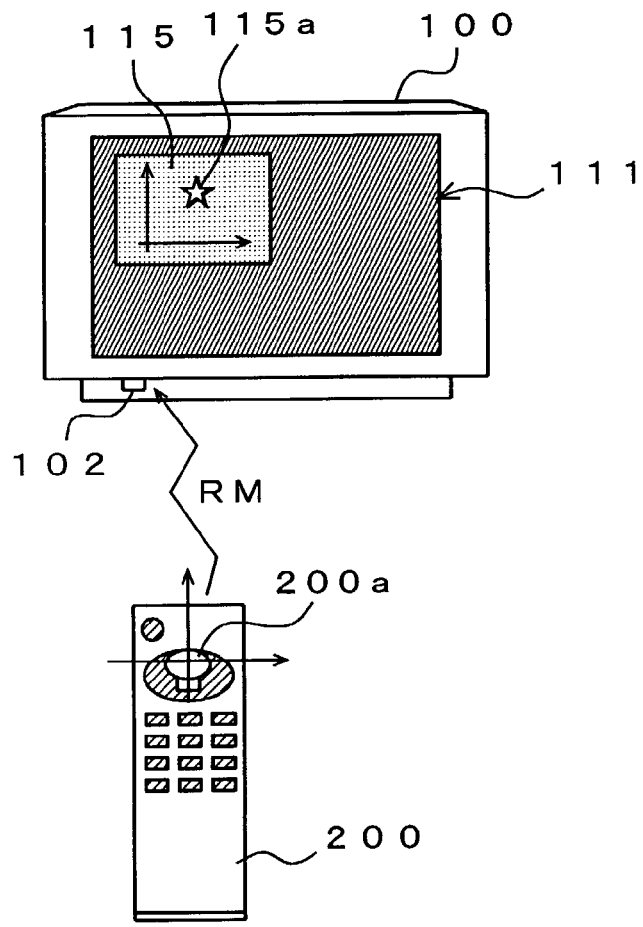
FIG. 2 is an illustration showing an example of a user interface for adjusting a picture quality.

FIG. 2 shows one example of a user interface for adjusting the parameters h and v. In adjustment, the display section 111 displays the adjustment screen 115 as OSD display wherein the adjustment position of the parameters h and v is indicated by a start-marked icon 115a. Also, the remote control transmitter 200 comprises a joystick 200a as user operation means.

Figure 3:
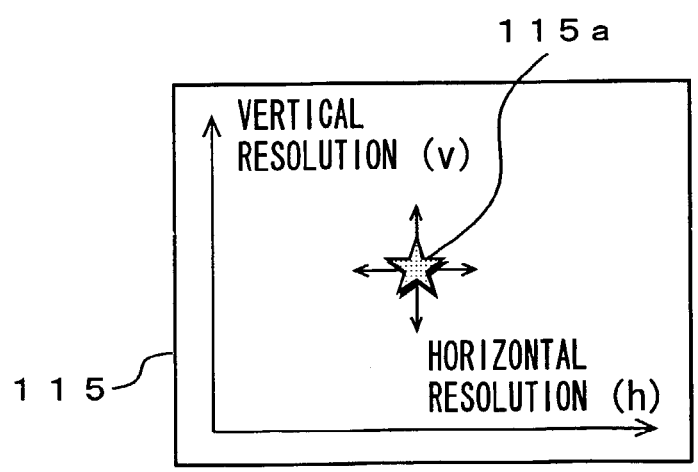
FIG. 3 is an expanded view showing an adjustment screen.

The user can operate the joystick 200a to move the icon 115a on the adjustment screen 115, thereby arbitrarily adjusting a value of the parameters h and v for deciding the horizontal and vertical resolutions. FIG. 3 shows an expanded part of the adjustment screen 115. When the icon 115a moves from side to side, the value of the parameter h for deciding the horizontal resolution can be adjusted, while when it moves up and down, the value of the parameter v for deciding the vertical resolution can be adjusted. The user can easily adjust the values of the parameters h and/or v with referencing the contents of the adjustment screen 115 displayed on the display section 111.

Incidentally, the remote control transmitter 200 may be equipped with, in place of the joystick 200a, any other pointing device such as a mouse or a track ball. Further, the values of the parameters h and v adjusted by the user may be displayed digitally on the adjustment screen 115.

The following will describe the details of the image signal processing section 110. The image signal processing section 110 includes first through third tap selection circuits 121 to 123 each for selectively extracting, from the SD signal (525i signal) stored in the buffer memory 109, plural SD pixel data sets located on a periphery of an objective position in the HD signal (1050i or 525p signal) and for transmitting them.

The first tap selection circuit 121 selectively extracts SD pixel data sets for use in prediction (hereinafter called "prediction tap"). The second tap selection circuit 122 selectively extracts SD pixel data sets for use in class grouping (hereinafter called "space class tap") corresponding to the distribution pattern of the levels of SD pixel data sets. The third tap selection circuit 123 selectively extracts SD pixel data sets for use in class grouping (hereinafter called "motion class tap") corresponding to motion. Note here that, if the space class is decided using SD pixel data sets that belong to a plurality of fields, this space class also contains motion information.

Figure 4:
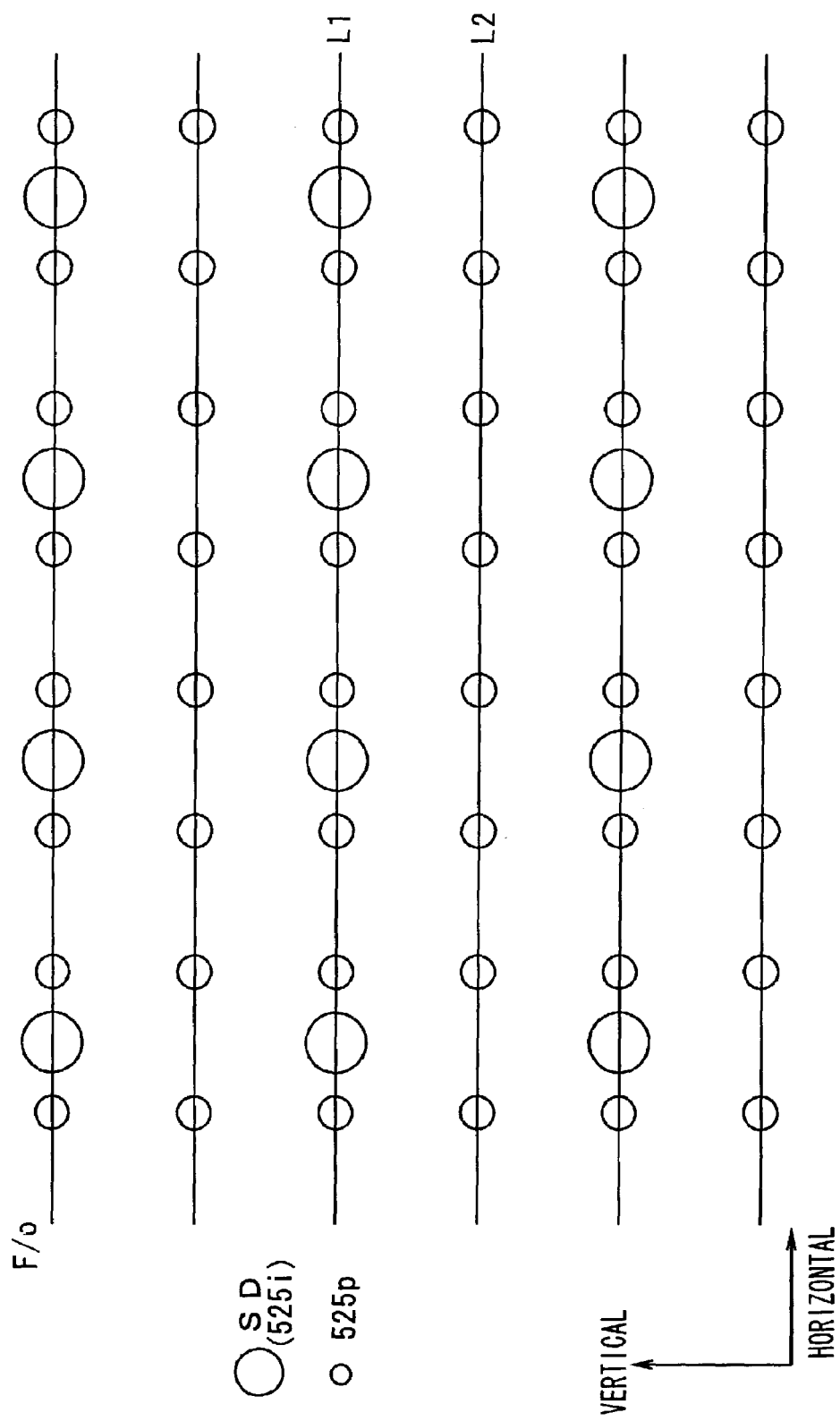
FIG. 4 is an illustration explaining a pixel position relationship between a 525i signal and a 525p signal.

FIG. 4 shows a pixel position relationship of odd-number (o) fields of a certain frame (F) between the 525i signal and the 525p signal. A larger dot represents a pixel of the 525i signal and a smaller dot represents a pixel of the 525p signal to be transmitted. In an even-number (e) field, a line of the 525i signal is shifted by a 0.5 line in space. As shown in FIG. 4, as the pixel data sets of the 525p signal are there present line data sets L1 at the same position as the line of the 525i signal, and line data sets L2 at the intermediate line between the upper and lower lines of the 525i signal. Each line of the 525p signal has pixels twice as many as those of each line of the 525i signal.

Figure 5:
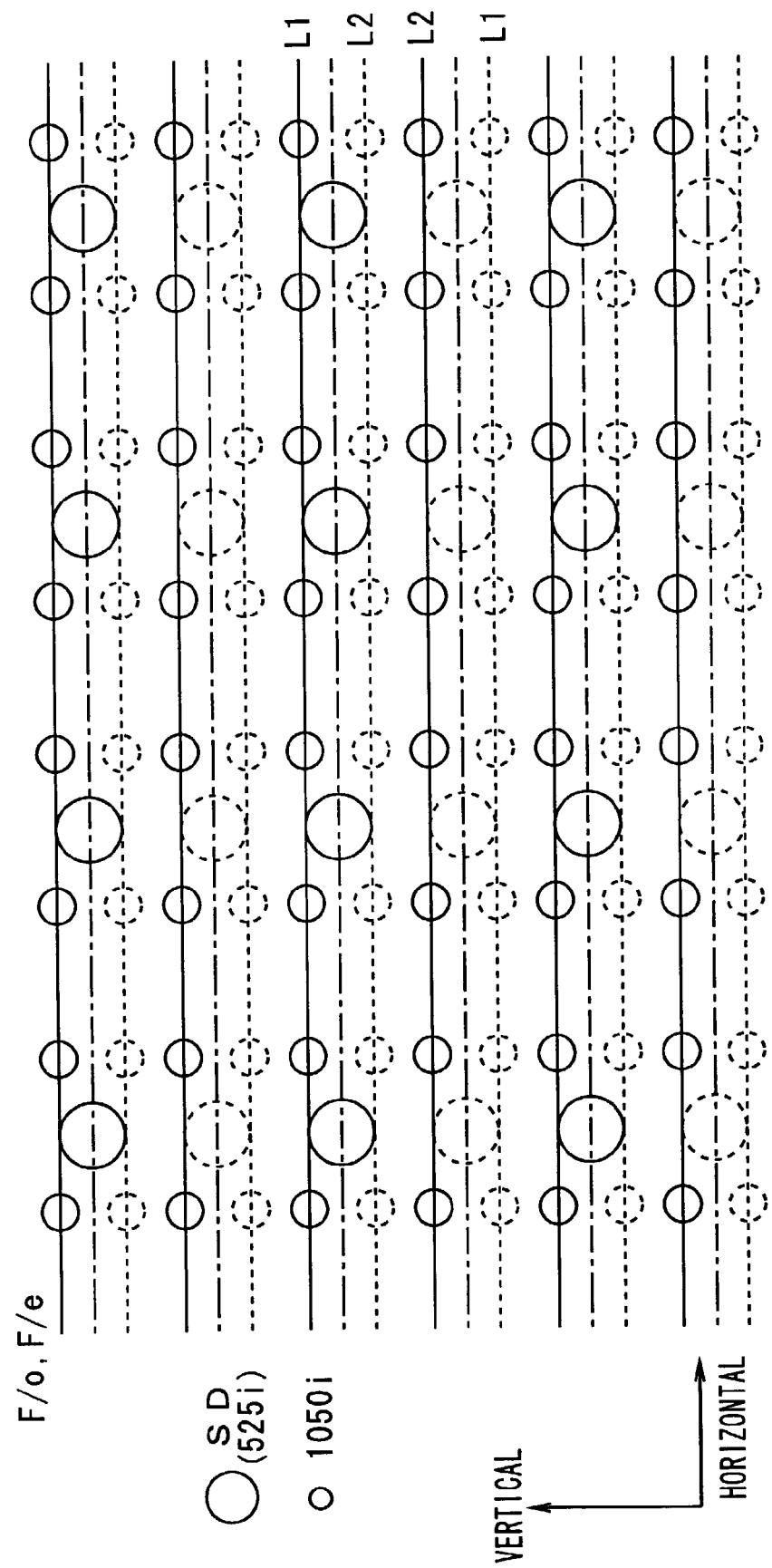
FIG. 5 is an illustration explaining a pixel position relationship between a 525i signal and a 1050i signal.

FIG. 5 is an illustration explaining a pixel position relationship of a certain frame (F) between the 525i signal and the 1050i signal. In the illustration, a solid line indicates the pixel position of an odd-number (o) field and a broken line indicates that of an even-number (e) field. A larger dot represents a pixel of the 525i signal and a smaller dot represents a pixel of the 1050i signal to be transmitted. As can be seen from FIG. 5, as the pixel data sets of the 1050i signal are there present line data sets L1 and L1' near the line of the 525i signal and line data sets L2 and L2' remote from the line of the 525i signal. The L1 and L2, herein, represent line data sets of an odd-number field and the L1' and L2' represent line data sets of an even-number field. Each line of the 1050i signal also has pixels twice as many as those of each line of the 525i signal.

Figure 6:
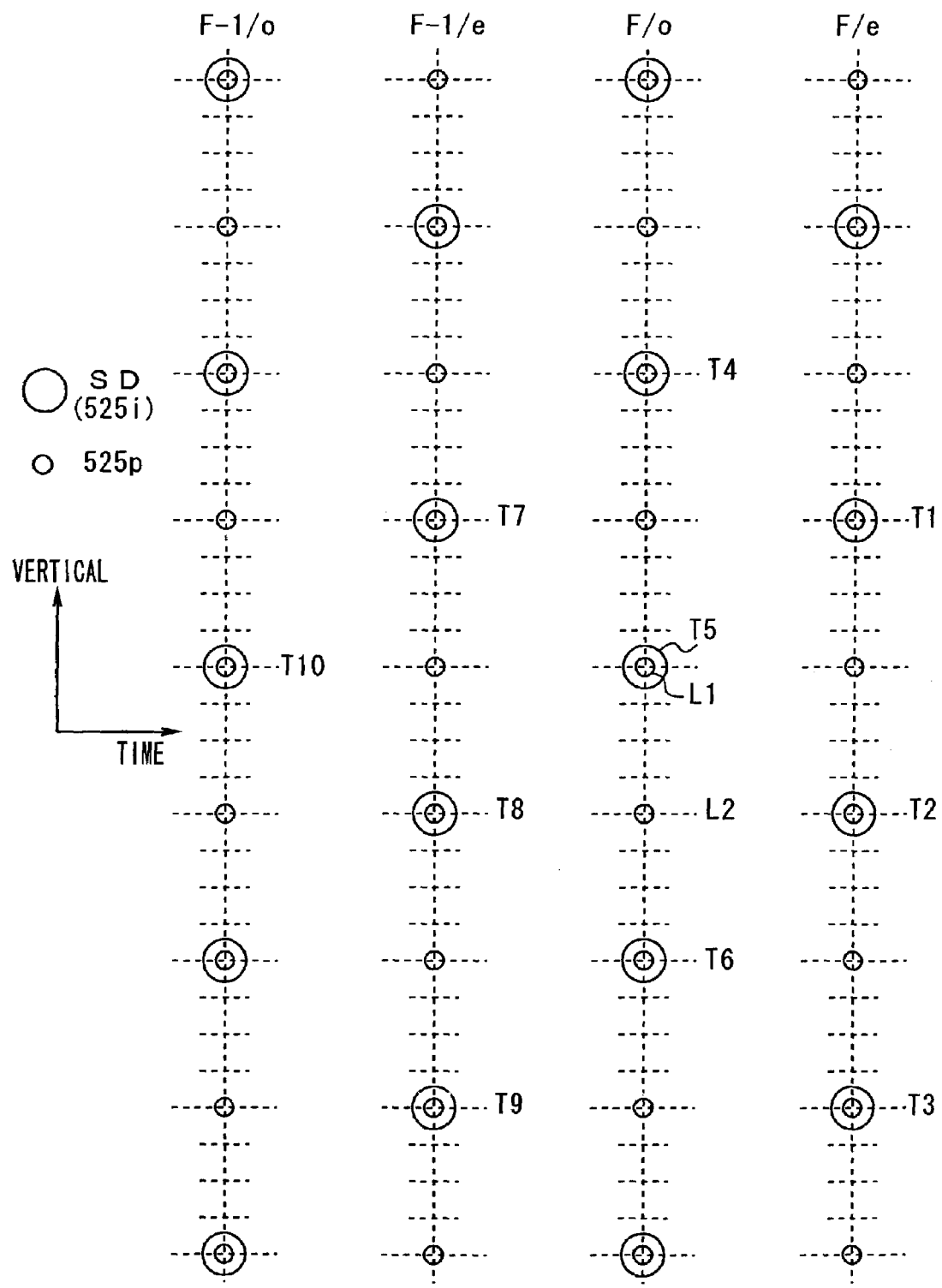
FIG. 6 is an illustration explaining a pixel position relationship between a 525i signal and a 525p signal and an example of a prediction tap.
Figure 7:
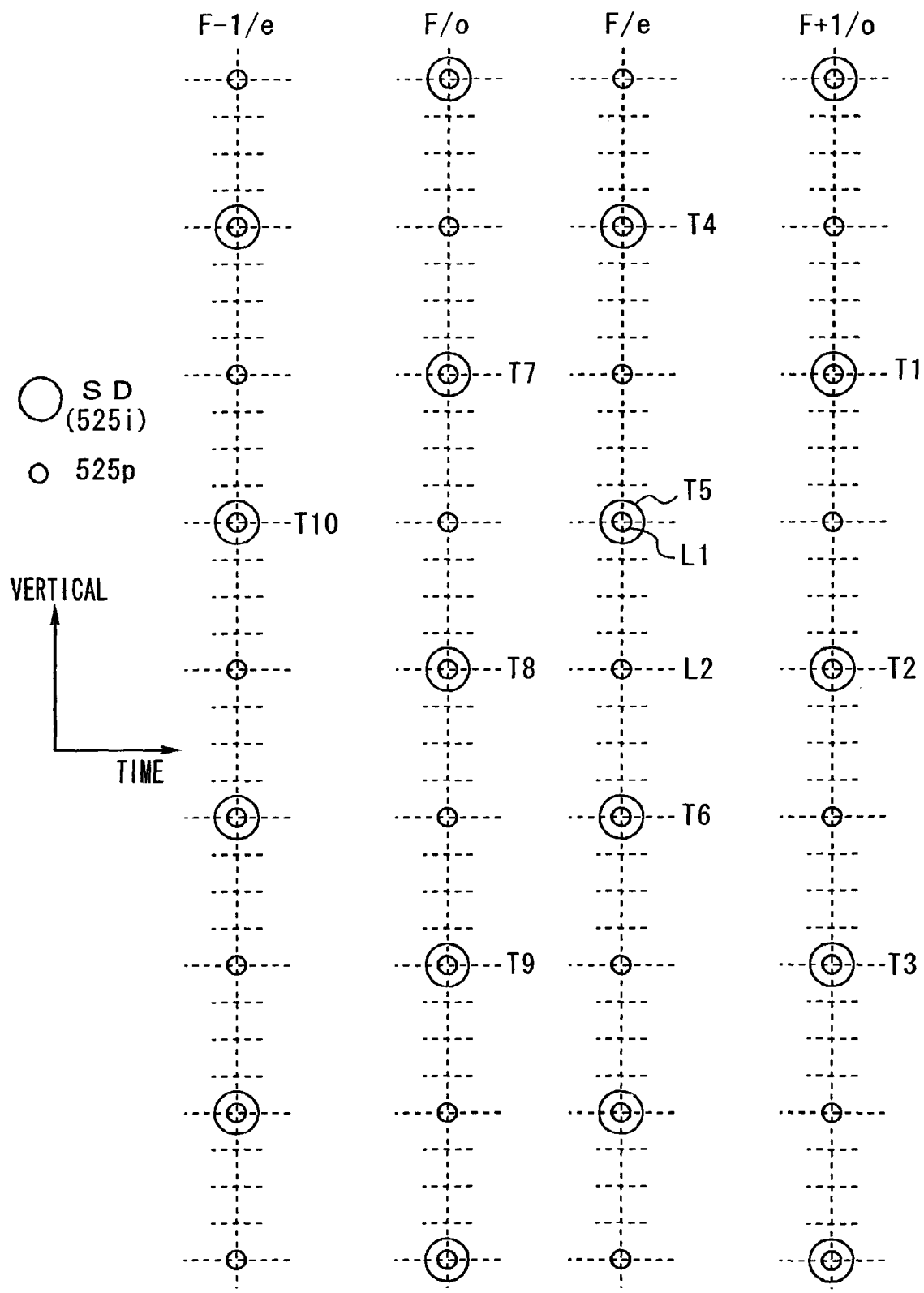
FIG. 7 is another illustration explaining a pixel position relationship between the 525i signal and the 525p signal and another example of a prediction tap.

FIGS. 6 and 7 show specific examples of a prediction tap (SD pixel) selected by the first tap selection circuit 121 when the 525i signal is converted into the 525p signal. FIGS. 6 and 7 show vertical pixel position relationship between the odd-number (o) and even-number (e) fields of time-wise consecutive frames F−1, F, and F+1.

As shown in FIG. 6, the prediction tap used when line data set L1 or L2 of a field F/o is predicted includes SD pixels T1, T2, and T3 that are contained in the next field F/e and that are present space-wise in the vicinity of a pixel (that is, pixel of an objective position) of a 525p signal to be produced, SD pixels T4, T5, and T6 that are contained in the field F/o and that are present space-wise in the vicinity of the pixel of the 525p signal to be produced, SD pixels T7, T8, and T9 that are contained in the previous field F−1/e and that are present space-wise in the vicinity of the pixel of the 525p signal to be produced, and SD pixel T10 that is contained in the further previous field F−1/o and that is present space-wise in the vicinity of a pixel of the 525p signal to be produced.

As shown in FIG. 7, a prediction tap used when line data set L1 or L2 of a field F/e is predicted includes SD pixels T1, T2, and T3 that are contained in the next field F+1/o and that are present space-wise in the vicinity of a pixel of the 525p signal to be produced, SD pixels T4, T5, and T6 that are contained in the field F/e and that are present space-wise in the vicinity of a pixel of the 525p signal to be produced, SD pixels T7, T8, and T9 that are contained in the previous field F/o and that are present space-wise in the vicinity of a pixel of the 525p signal to be produced, and SD pixel T10 that is contained in the further previous field F−1/e and that is present space-wise in the vicinity of a pixel of the 525p signal to be produced.

Note here that SD pixel T9 may not be selected as a prediction tap when line data set L1 is predicted, while SD pixel T4 may not be selected as a prediction tap when line data set L2 is predicted.

Figure 8:
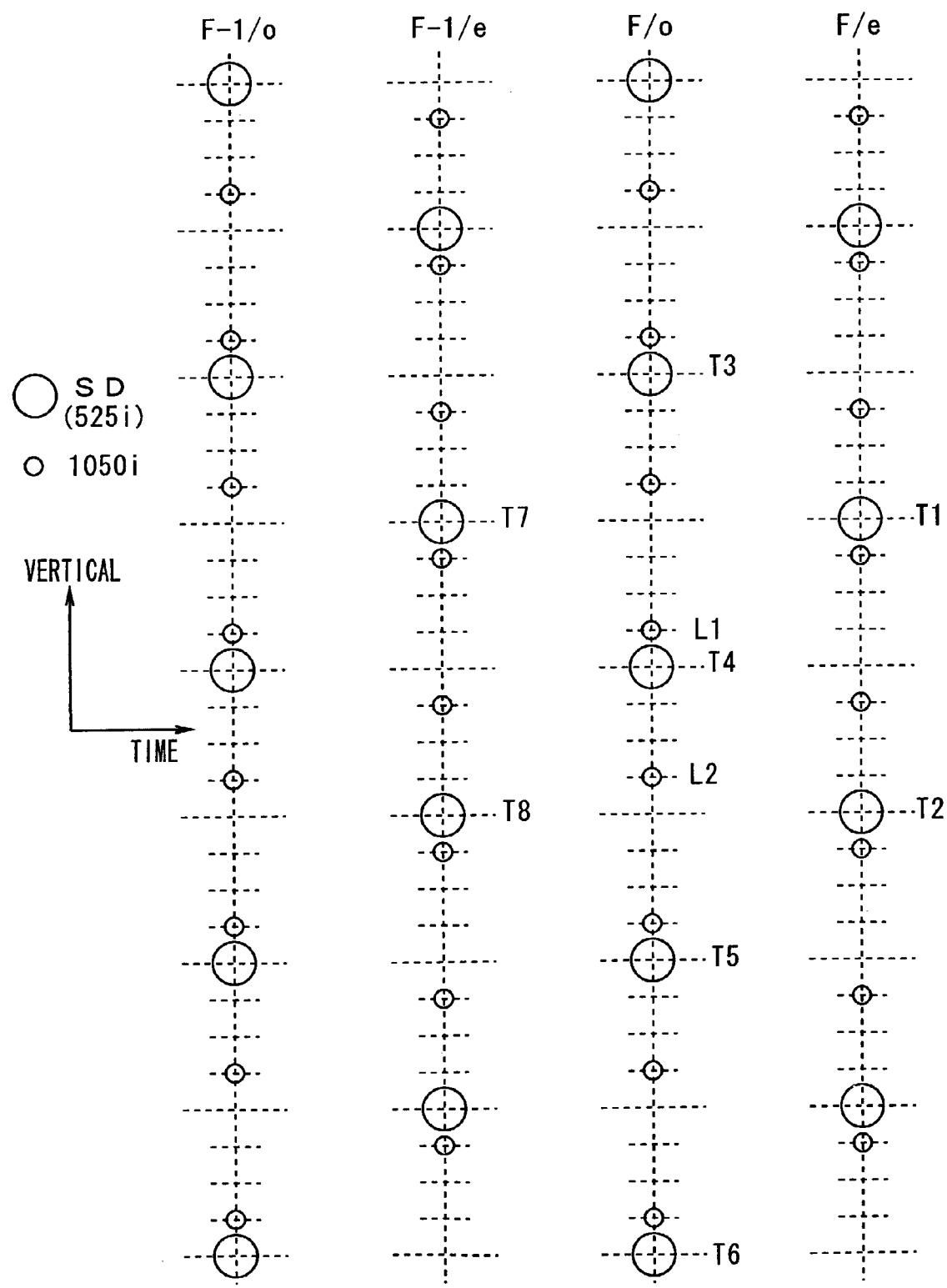
FIG. 8 is another illustration explaining a pixel position relationship between the 525i signal and the 1050i signal and another example of a prediction tap.
Figure 9:
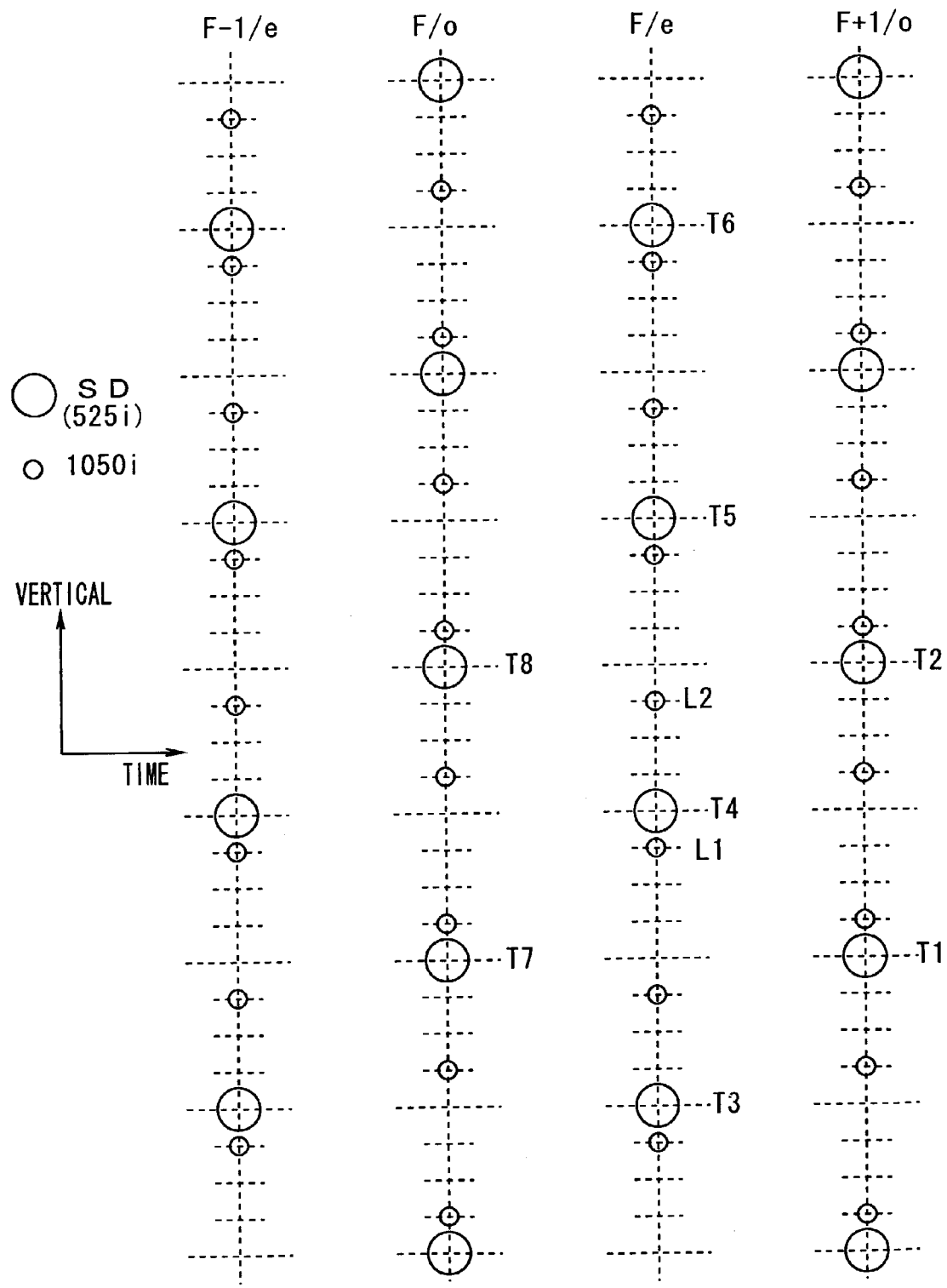
FIG. 9 is another illustration explaining a pixel position relationship between the 525i signal and the 1050i signal and another example of a prediction tap.

FIGS. 8 and 9 show specific examples of a prediction tap (SD pixel) selected by the first tap selection circuit 121 when the 525i signal is converted into the 1050i signal. FIGS. 8 and 9 also show vertical pixel position relationship between the odd-number (o) and even-number (e) fields of time-wise consecutive frames F−1, F, and F+1.

As shown in FIG. 8, a prediction tap used when line data set L1 or L2 of a field F/o is predicted includes SD pixels T1 and T2 that are contained in the next field F/e and that are present space-wise in the vicinity of a pixel (that is, pixel of an objective position) of a 1050i signal to be produced, SD pixels T3, T4, T5, and T6 that are contained in the field F/o and that are present space-wise in the vicinity of a pixel of the 1050i signal to be produced, and SD pixels T7 and T8 that are contained in the previous field F−1/e and that are present space-wise in the vicinity of a pixel of the 1050i signal to be produced.

As shown in FIG. 9, a prediction tap used when line data set L1' or L2' of the field F/e is predicted includes SD pixels T1 and T2 that are contained in the next field F+1/o and that are present space-wise in the vicinity of a pixel of a 1050ip signal to be produced, SD pixels T3, T4, T5, and T6 that are contained in the field F/e and that are present space-wise in the vicinity of a pixel of the 1050i signal to be produced, and SD pixels T7 and T8 that are contained in the previous field F/o and that are present space-wise in the vicinity of a pixel of the 1050i signal to be produced.

Note here that SD pixel T6 may not be selected as a prediction tap when line data set L1' is predicted, while SD pixel T3 may not be selected as a prediction tap when line data set L2' is predicted.

Further, as shown in FIGS. 6–9, in addition to the SD pixels present at the same position in a plurality of fields, one or more SD pixels in the horizontal direction may be selected as a prediction tap.

Figure 10:
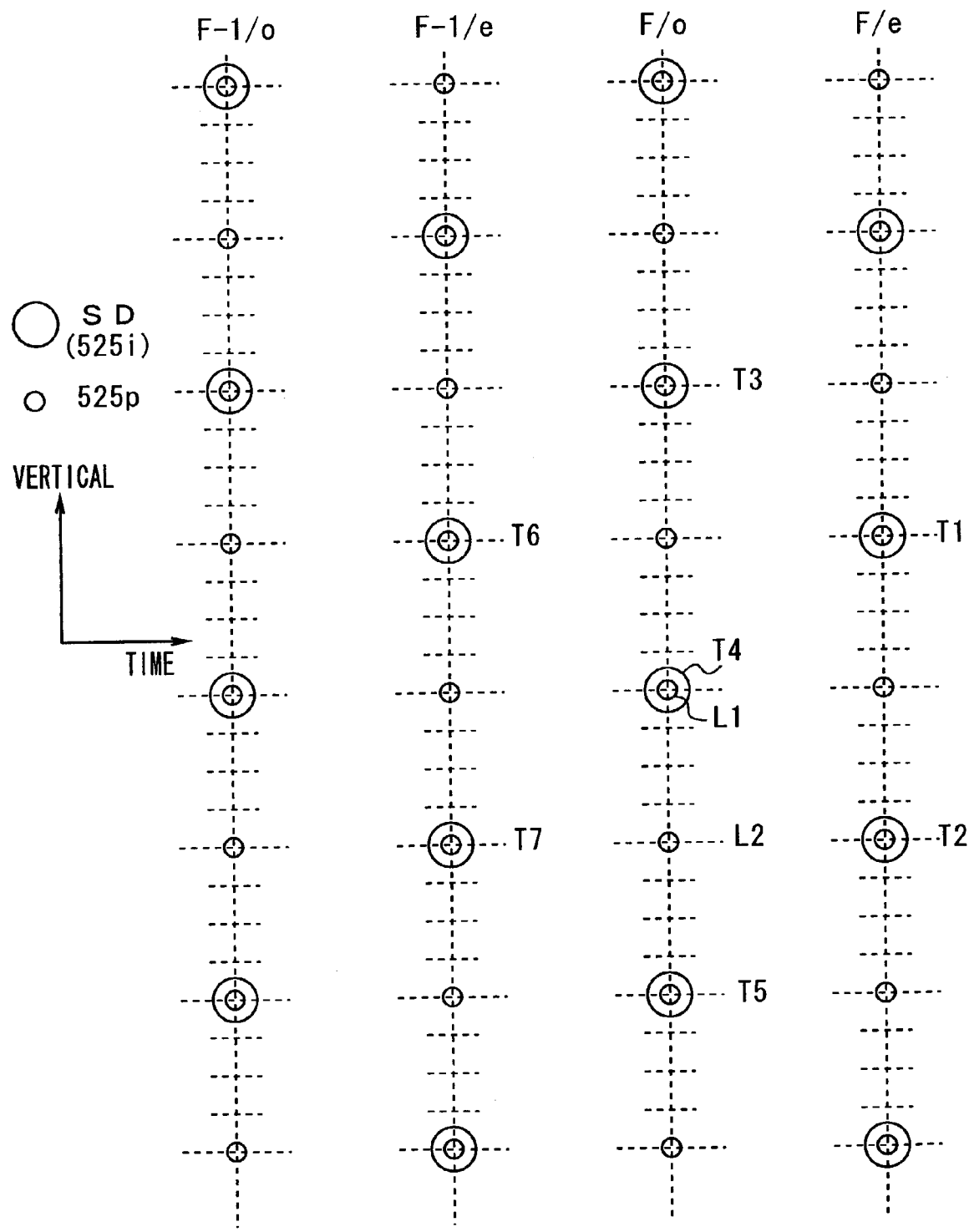
FIG. 10 is a further illustration explaining a pixel position relationship between the 525i signal and the 525p signal and an example of a space class tap.
Figure 11:
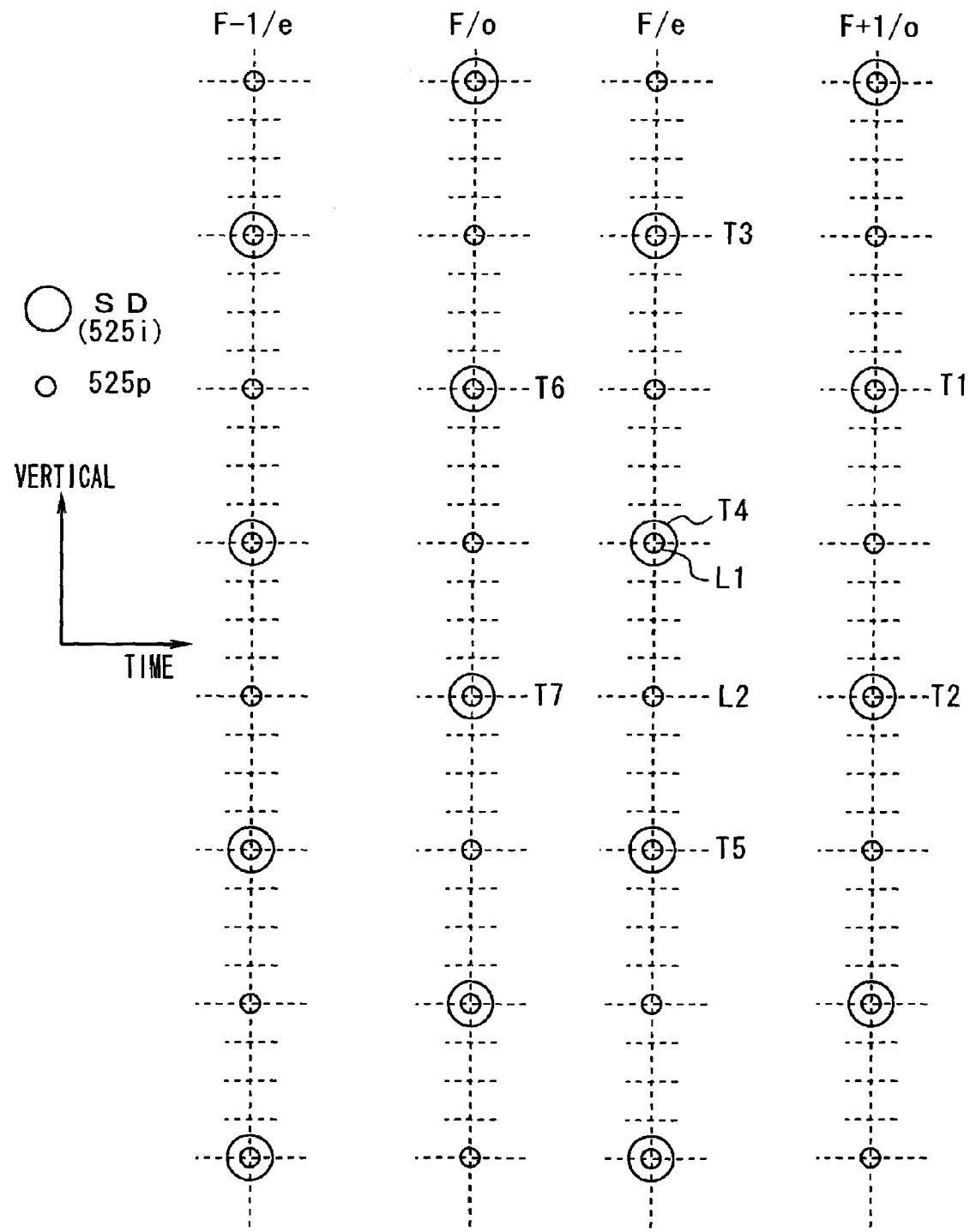
FIG. 11 is another illustration explaining a pixel position relationship between the 525i signal and the 525p signal and another example of a space class tap.

FIGS. 10 and 11 show specific examples of a space class tap (SD pixel) selected by the second tap selection circuit 122 when the 525i signal is converted into the 525p signal. FIGS. 10 and 11 show also the vertical pixel position relationship between odd-number (o) and even-number (e) fields of time-wise consecutive frames F−1, F, and F+1.

As shown in FIG. 10, a space class tap used when line data set L1 or L2 of a field F/o is predicted includes SD pixels T1 and T2 that are contained in the next field F/e and that are present space-wise in the vicinity of a pixel (that is, pixel of an objective position) of a 525p signal to be produced, SD pixels T3, T4, and T5 that are contained in the field F/o and that are present space-wise in the vicinity of a pixel of the 525p signal to be produced, and SD pixels T6 and T7 that are contained in the previous field F−1/e and that are present space-wise in the vicinity of a pixel of the 525p signal to be produced.

As shown in FIG. 11, a space class tap used when line data set L1 or L2 of a field F/e is predicted includes SD pixels T1 and T2 that are contained in the next field F+1/o and that are present space-wise in the vicinity of a pixel of the 525p signal to be produced, SD pixels T3, T4, and T5, that are contained in the field F/e and that are present space-wise in the vicinity of a pixel of the 525p signal to be produced, and SD pixels T6 and T7 that are contained in the previous field F/o and that are present space-wise in the vicinity of a pixel of the 525p signal to be produced.

Note here that SD pixel T7 may not be selected as a space class tap when line data set L1 is predicted, while SD pixel T6 may not be selected as a space class tap when line data set L2 is predicted.

Figure 12:
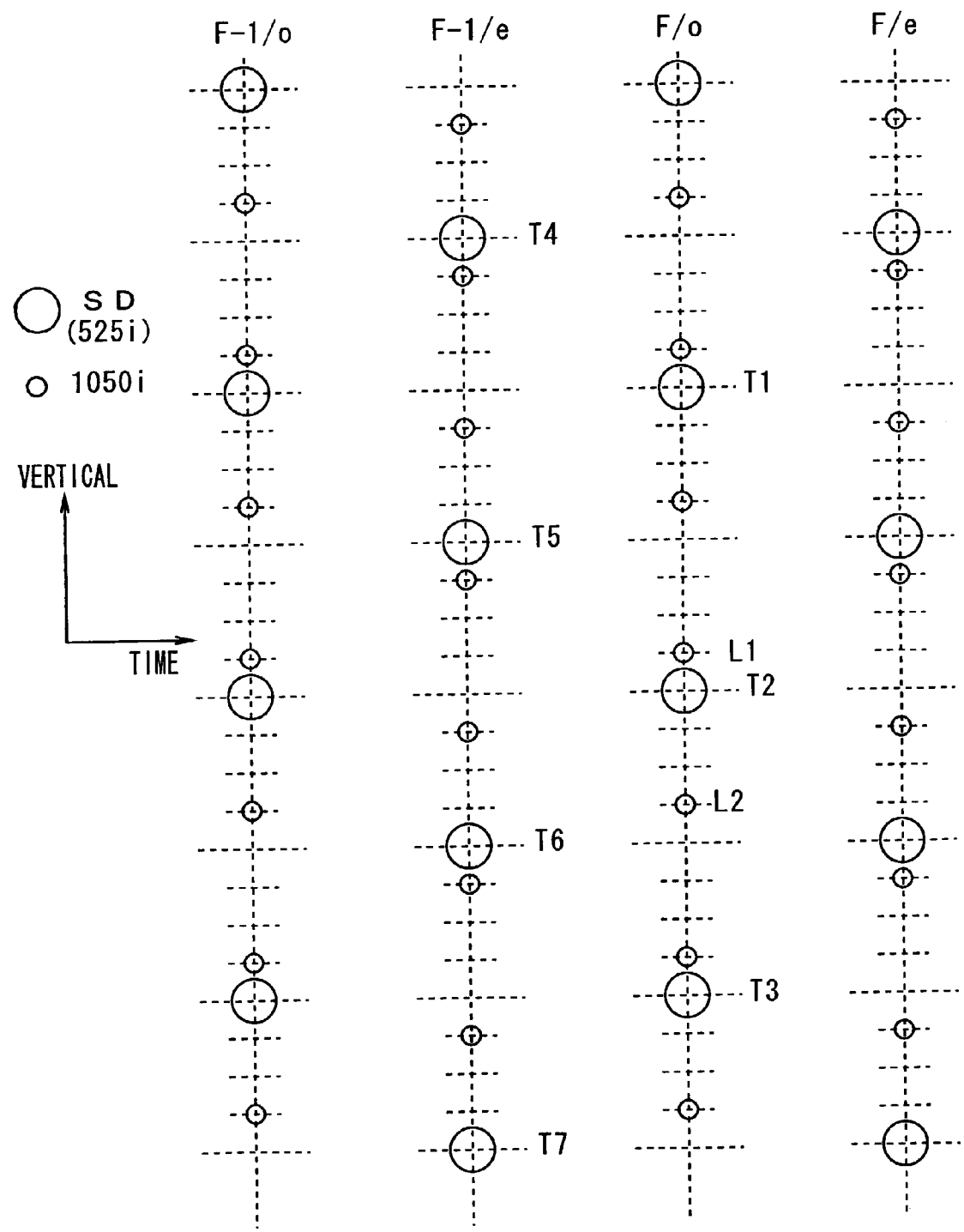
FIG. 12 is a further illustration explaining a pixel position relationship between the 525i signal and the 1050i signal and a further example of a space class tap.
Figure 13:
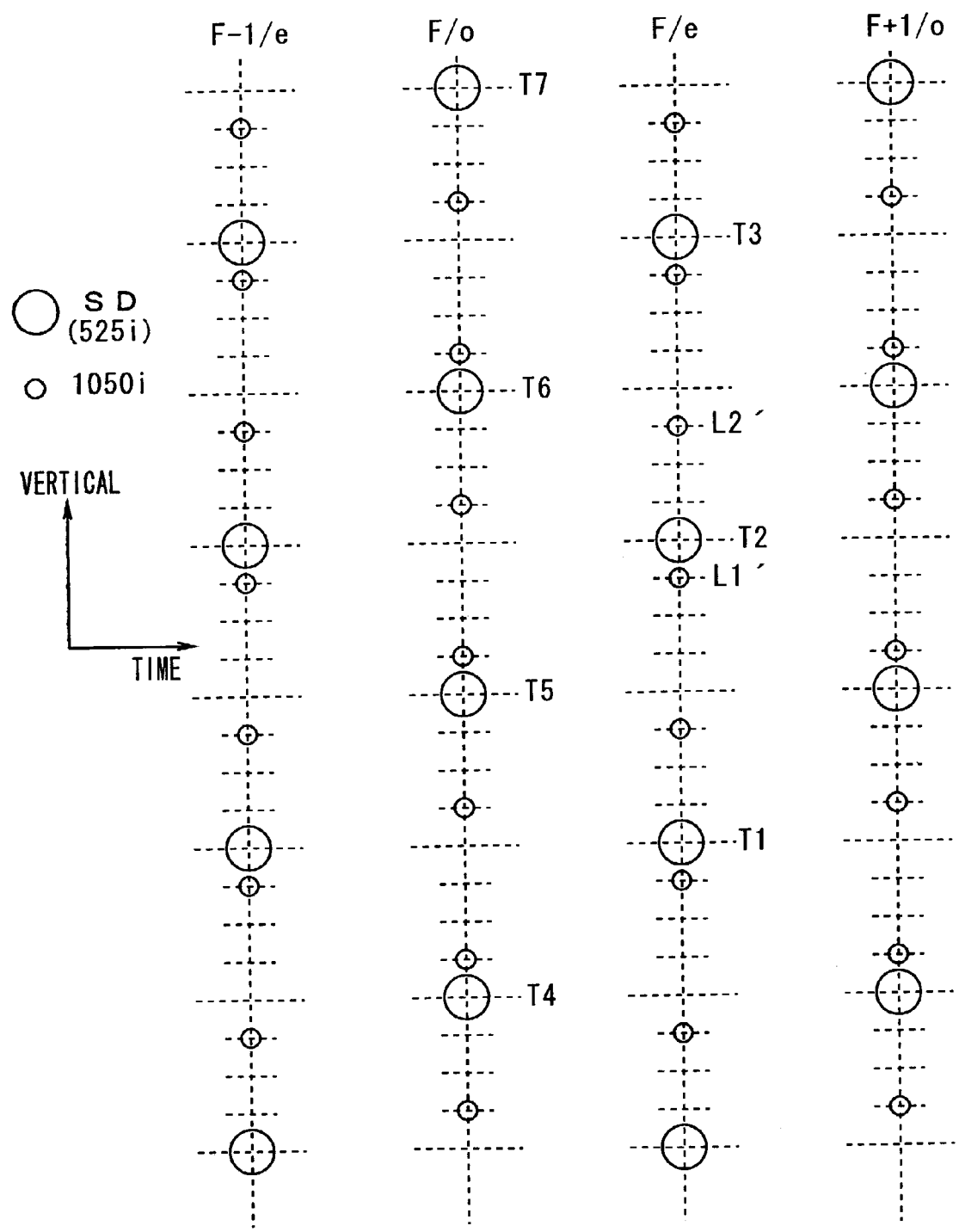
FIG. 13 is an additional illustration explaining a pixel position relationship between the 525i signal and the 1050i signal and an additional example of a space class tap.

FIGS. 12 and 13 show specific examples of a space class tap (SD pixel) selected by the second tap selection circuit 122 when the 525i signal is converted into the 1050i signal. FIGS. 12 and 13 also show the vertical pixel position relationship between odd-number (o) and even-number (e) fields of time-wise consecutive frames F−1, F, and F+1.

As shown in FIG. 12, a space class tap used when line data set L1 or L2 of a field F/o is predicted includes SD pixels T1, T2, and T3 that are contained in the field F/o and that are present space-wise in the vicinity of a pixel (that is, pixel of an objective position) of a 1050i signal to be produced, and SD pixels T4, T5, T6, and T7 that are contained in the previous field F−1/e and that are present space-wise in the vicinity of a pixel of the 1050i signal to be produced.

As shown in FIG. 13, a space class tap used when line data set L1' or L2' of a field F/e is predicted includes SD pixels T1, T2, and T3 that are contained in the field F/e and that are present space-wise in the vicinity of a pixel of the 1050i signal to be produced, and SD pixels T4, T5, T6, and T7 that are contained in the previous field F/o and that are present space-wise in the vicinity of a pixel of the 1050i signal to be produced.

Note here that SD pixel T7 may not be selected as a space class tap when line data set L1' is predicted, while SD pixel T4 may not be selected as a space class tap when line data set L2' is predicted.

Further, as shown in FIGS. 10–13, in addition to the SD pixels present at the same position in a plurality of fields, one or more SD pixels in the horizontal direction may be selected as a space class tap.

Figure 14:
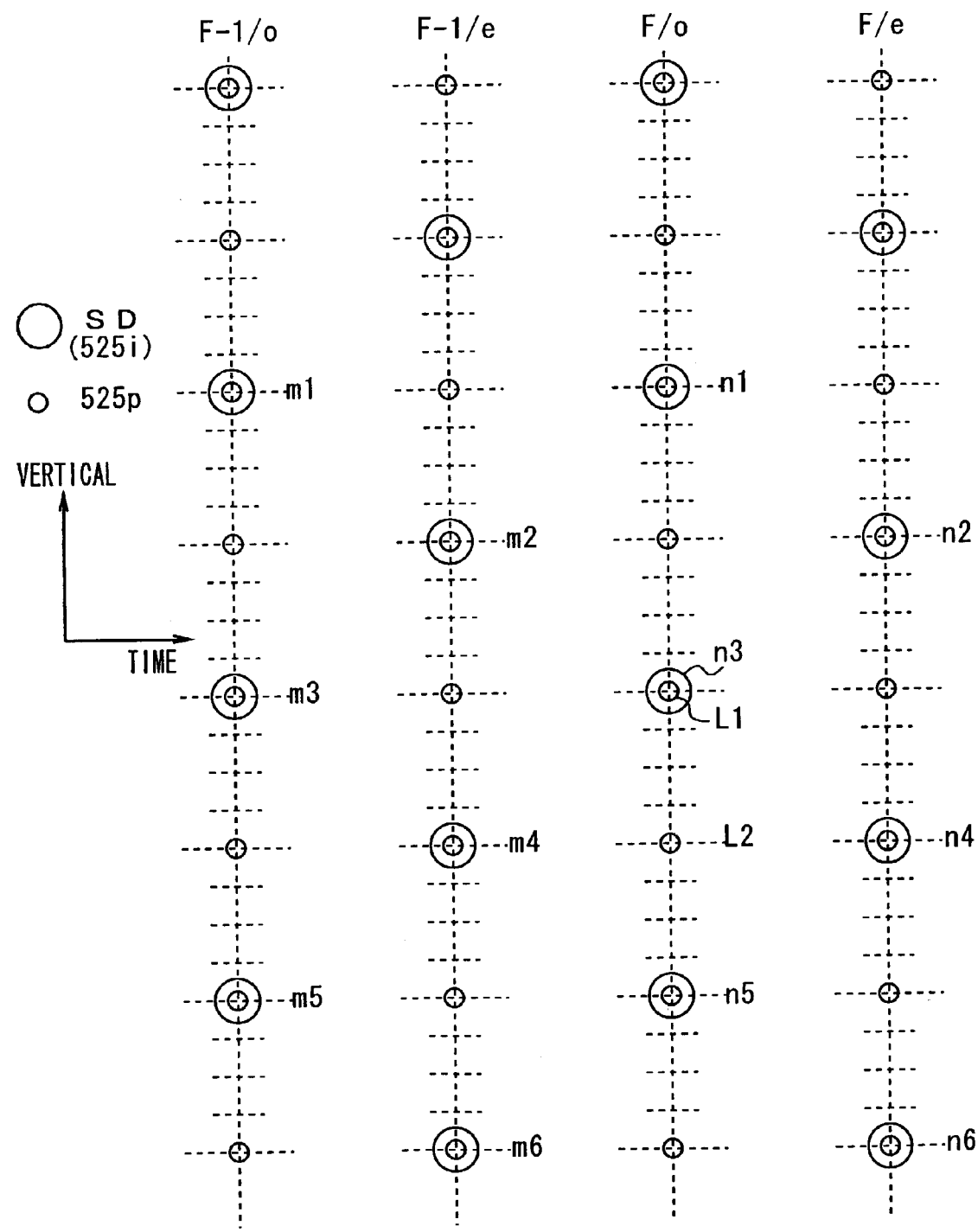
FIG. 14 is a further illustration explaining a pixel position relationship between the 525i signal and the 525p signal and an example of a motion class tap.

FIG. 14 shows a specific example of a motion class tap (SD pixel) selected by the third tap selection circuit 123 when the 525i signal is converted into the 525p signal. FIG. 14 also shows a vertical pixel position relationship between odd-number (o) and even-number (e) fields of time-wise consecutive frames F−1 and F. As shown in FIG. 14, a motion class tap used when line data set L1 or L2 of a field F/o is predicted includes SD pixels n2, n4, and n6 that are contained in the next field F/e and that are present space-wise in the vicinity of a pixel (that is, pixel of an objective position) of a 525p signal to be produced, SD pixels n1, n3, and n5 that are contained in the field F/o and that are present space-wise in the vicinity of a pixel of the 525p signal to be produced, SD pixels m2, m4, and m6 that are contained in the previous field F−1/e and that are present space-wise in the vicinity of a pixel of the 525p signal to be produced, and SD pixels m1, m3, and m5 that are contained in the further previous field F−1/o and that are present space-wise in the vicinity of a pixel of the 525p signal to be produced. The vertical position of each of the SD pixels n1 through n6 coincides with that of each of the SD pixels m1 through m6, respectively.

Figure 15:
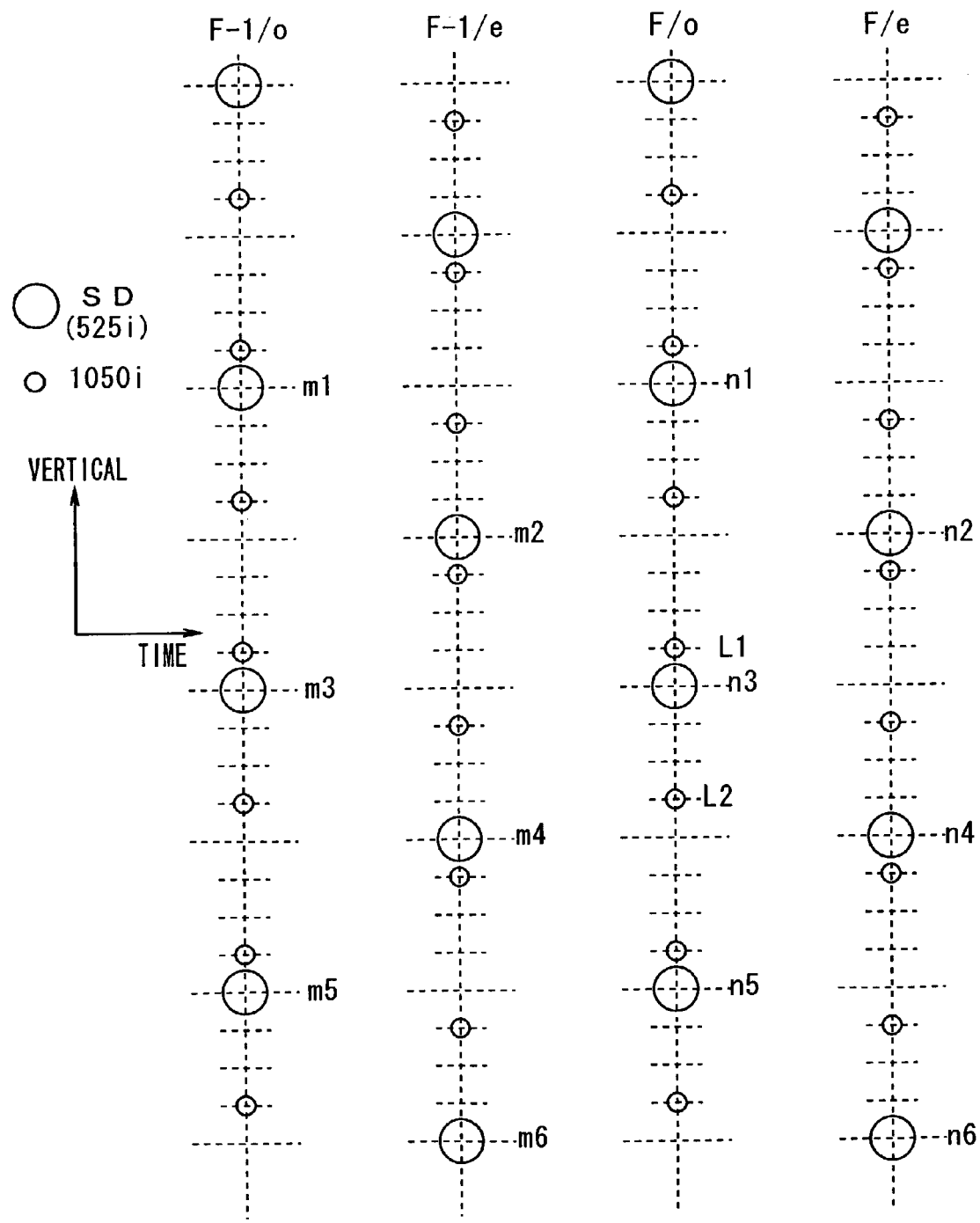
FIG. 15 is another illustration explaining a pixel position relationship between the 525i signal and the 1050i signal and another example of a motion class tap.

FIG. 15 shows a specific example of a motion class tap (SD pixel) selected by the third tap selection circuit 123 when the 525i signal is converted into the 1050i signal. FIG. 15 also shows the vertical pixel position relationship between odd-number (o) and even-number (e) fields of time-wise consecutive frames F−1 and F. As shown in FIG. 15, a motion class tap used when line data set L1 or L2 of a field F/o is predicted includes SD pixels n2, n4, and n6 that are contained in the next field F/e and that are present space-wise in the vicinity of a pixel of a 1050i signal to be produced, SD pixels n1, n3, and n5 that are contained in the field F/o and that are present space-wise in the vicinity of the pixel of the 1050i signal to be produced, SD pixels m2, m4, and m6 that are contained in the previous field F−1/e and that are present space-wise in the vicinity of a pixel of the 1050i signal to be produced, and SD pixels m1, m3, and m5 that are contained in the further previous field F−1/o and that are present space-wise in the vicinity of a pixel of the 1050i signal to be produced. The vertical position of each of the SD pixels n1 through n6 coincides with that of each of the SD pixels m1 through m6, respectively.

As shown in FIG. 1 again, the image signal processing section 110 also includes a space class detection circuit 124 for detecting a level distribution pattern of the data sets (SD pixel data sets) of a space class tap selectively extracted by the second tap selection circuit 122, detecting a space class based on this level distribution pattern, and then transmitting their class information.

The space class detection circuit 124 performs a calculation such that, for example, the SD pixel data sets are compressed from eight bit-data into two bit-data. The space class detection circuit 124 then transmits the compressed data sets corresponding to each of the SD pixel data sets as class information of the space class. According to this embodiment, the data compression is performed according to Adaptive Dynamic Range Coding (ADRC). Alternative to ADRC, the information may be compressed according to DPCM (prediction coding), VQ (Vector Quantization), etc.

Originally, although the ADRC has been developed as an adaptive re-quantization method for high-performance coding employed in a Video Tape Recorder (VTR), it is suitable for use in the above-mentioned data compression because it can efficiently represent a local pattern of a signal level with a small of word length. Assuming that, when the ADRC is employed, a maximum value and a minimum value of data sets (SD pixel data sets) of a space class tap are MAX and MIN, respectively, a dynamic range of the data sets of the space class tap is DR (=MAX−MIN+1), and the number of re-quantization bits is P, following Equation (1) can be calculated on each of the SD pixel data sets ki as space class tap data sets to obtain a re-quantization code qi as compressed data sets.

$$qi=[(ki-\text{MIN}+0.5)\cdot 2^P/DR] \quad (1)$$

In the Equation (1), the portion enclosed with [ ] means truncation processing. If SD pixel data sets of Na are given as the space class tap data sets, term, "i" indicates 1 through Na.

Also, the image signal processing section 110 also includes a motion class detection circuit 125 for detecting a motion class for mainly representing a degree of motion from data sets (SD pixel data sets) of a motion class tap selectively extracted by the third tap selection circuit 123 and then transmitting their class information.

The motion class detection circuit 125 calculates interframe differences from the data sets (SD pixel data sets) mi and ni of the motion class tap selectively extracted by the third tap selection circuit 123 and then performs threshold processing on an average value of the absolute values of thus calculated differences to detect a motion class, which is an index of the motion. That is, the motion class detection circuit 125 calculates an average value AV of the absolute values of the differences according to following Equation (2).

$$AV = \frac{\sum_{i=1}^{Nb} |mi-ni|}{Nb} \quad (2)$$

When the third tap selection circuit 123 extracts 12 SD pixel data sets of m1 through m6 and n1 through n6 as mentioned above, for example, Nb in the Equation (2) is six.

The motion class detection circuit 125 in turn compares thus calculated average value AV to one or a plurality of threshold values, thus obtaining motion information MV of a motion class. In a case where, for example, three threshold values of th1, th2, and th3 (th1<th2<th3) are provided to detect four motion classes, if AV≦th1, MV=0; if th1<AV≦th2, MV=1; if th2<AV≦th3, MV=2; and if th3<AV, MV=3.

Also, the image signal processing section 110 includes a class synthesis circuit 126 for obtaining a class code CL indicating a class including pixel data set of an HD signal to be produced (525p or 1050i signal), that is, pixel data set of an objective position, based on a re-quantization code qi as the class information of the space class received from the space class detection circuit 124 and the motion information MV of the motion class received from the motion class detection circuit 125.

The class synthesis circuit 126 calculates the class code CL according to following Equation (3).

$$CL = \sum_{i=1}^{Na} qi(2^p)^i + MV \cdot 2^{pNa} \quad (3)$$

Note here that in the Equation (3), Na indicates a number of data sets (SD pixel data sets) of the space class tap and P indicates a number of re-quantization bits by means of the ADRC.

Also, the image signal processing section 110 includes registers 130–133 and a coefficient memory 134. Operations of a later-described linear-sequential conversion circuit 129 need to be switched according to a case of transmitting the 525p signal and a case of transmitting the 1050i signal. The register 130 stores operation specification information for specifying the operations of the linear-sequential conversion circuit 129. The linear-sequential conversion circuit 129 operates according to the operation specification information received from the register 130.

The register 131 stores tap position information on the prediction tap selected by the first tap selection circuit 121. The first tap selection circuit 121 selects the prediction tap on the basis of the tap position information received from the register 131. For example, a plurality of SD pixels that may possibly be selected is given numbers for specification, and on the basis of the tap position information, a number of the SD pixels to be selected is specified. This holds true also with the following tap position information.

Herein, the register 132 stores tap position information A in a case of relatively small motion and tap position information B in a case of relatively large motion. Which one of these pieces of the tap position information A and B is to be supplied to the second tap selection circuit 122 is selected according to the motion information MV of the motion class received from the motion class detection circuit 125.

Herein, the register 132 stores tap position information A in a case of relatively small motion and tap position information B in a case of relatively large motion. Which one of these pieces of the tap position information A and B is to be supplied to the second tap selection circuit 122 is selected according to the class information MV of the motion class received from the motion class detection circuit 125.

That is, if there is no motion or small motion provided and therefore MV=0 or MV=1, the tap position information A is supplied to the second tap selection circuit 122, which in turn selects such a space class tap as to cover a plurality of fields as shown in FIGS. 10–13. Also, if the motion is relatively large and therefore MV=2 or MV=3, the tap position information B is supplied to the second tap selection circuit 122, which in turn selects such a space class tap as to be only SD pixel, which is not shown, that exists in the same field as that including a pixel to be produced.

Alternatively, the above-mentioned register 131 may store the tap position information in the case of relatively small motion and the tap position information in the case of relatively large motion, to select the tap position information to be supplied to the first tap selection circuit 121 based on the motion information MV of the motion class received from the motion class detection circuit 125.

The register 133 stores tap position information of the motion class tap selected by the third tap selection circuit 123. The third tap selection circuit 123 selects the motion class tap on the basis of the tap position information received from the register 133.

Further, for each class, the coefficient memory 134 stores coefficient data sets to be used in an estimation equation used in a later-described estimation/prediction calculation circuit 127. The coefficient data sets are used as information for converting the 525i signal as an SD signal into the 525p or 1050i signal as an HD signal. The coefficient memory 134 receives the class code CL, as read-out address information, from the above-mentioned class synthesis circuit 126, and transmits coefficient data sets corresponding to the class code CL to the estimation/prediction calculation circuit 127.

Also, the image signal processing section 110 includes an information memory bank 135. The information memory bank 135 beforehand accumulates therein operation specification information to be stored in the register 130 and tap position information to be stored in the registers 131–133.

Note here that as the operation specification information to be stored in the register 130, the information memory bank 135 beforehand accumulates therein first operation specification information to allow the linear-sequential conversion circuit 129 to transmit the 525p signal and second operation specification information to allow the linear-sequential conversion circuit 129 to transmit the 1050i signal.

The user can operate the remote control transmitter 200 to select a first conversion method of transmitting the 525p signal as the HD signal or a second conversion method of transmitting the 1050i signal as the HD signal. To the information memory bank 135, information of the selected conversion method is supplied through the system controller 101, and according to this selection information, the first or second operation specification information is loaded from the information memory bank 135 to the register 130.

Also, as tap position information of a prediction tap to be stored in the register 131, the information memory bank 135 beforehand accumulates therein first tap position information that corresponds to the first conversion method (525p) and second tap position information that corresponds to the second conversion method (1050i). From this information memory bank 135, the first or second tap position information is loaded to the register 131 according to the above-mentioned conversion method selection information.

Also, as tap position information of a space class tap to be stored in the register 132, the information memory bank 135 beforehand accumulates therein first tap position information that corresponds to the first conversion method (525p) and second tap position information that corresponds to the second conversion method (1050i). The first and second tap position information consists of tap position information in a case of relatively small motion and that in a case of relatively large motion, respectively. The first or second tap position information is loaded from this information memory bank 135 to the register 132 according to the above-mentioned conversion method selection information.

Also, as tap position information of a motion class tap to be stored in the register 133, the information memory bank 135 beforehand accumulates therein first tap position information that corresponds to the first conversion method (525p) and second tap position information that corresponds to the second conversion method (1050i). From this information memory bank 135, the first or second tap position information is loaded to the register 133 according to the above-mentioned conversion method selection information.

Also, the information memory bank 135 beforehand accumulates coefficient seed data sets, for each class, each corresponding to the first and second conversion methods, respectively. The coefficient seed data sets are coefficient data sets in a production equation for producing the coefficient data sets stored in the above-mentioned coefficient memory 134.

The later-described estimation/prediction calculation circuit 127 calculates HD pixel data sets y to be produced according to an estimation equation of following Equation (4) based on data sets xi of a prediction tap (SD pixel data sets) and coefficient data sets Wi read out of the coefficient memory 134.

$$y = \sum_{i=1}^{n} W_i \cdot x_i \quad (4)$$

If ten prediction taps are selected by the first tap selection circuit 121 as shown in FIGS. 4 and 7, the value of n in the Equation (4) is 10.

The coefficient data sets Wi (i=1 to n) in this estimation equation are produced according to a production equation that contains parameters h and v as shown by following Equation (5).

$$\begin{aligned}
W_1 &= w_{10} + w_{11}v + w_{12}h + w_{13}v^2 + w_{14}vh + w_{15}h^2 + \\
&\quad w_{16}v^3 + w_{17}v^2h + w_{18}vh^2 + w_{19}h^3 \\
W_2 &= w_{20} + w_{21}v + w_{22}h + w_{23}v^2 + w_{24}vh + w_{25}h^2 + \\
&\quad w_{26}v^3 + w_{27}v^2h + w_{28}vh^2 + w_{29}h^3 \\
&\vdots \\
W_i &= w_{i0} + w_{i1}v + w_{i2}h + w_{i3}v^2 + w_{i4}vh + w_{i5}h^2 + \\
&\quad w_{i6}v^3 + w_{i7}v^2h + w_{i8}vh^2 + w_{i9}h^3 \\
&\vdots \\
W_n &= w_{n0} + w_{n1}v + w_{n2}h + w_{n3}v^2 + w_{n4}vh + w_{n5}h^2 + \\
&\quad w_{n6}v^3 + w_{n7}v^2h + w_{n8}vh^2 + w_{n9}h^3
\end{aligned} \quad (5)$$

The information memory bank 135 stores therein such the coefficient seed data sets $w_{10}$ through $w_{n9}$, which are the coefficient data sets in this production equation, for each conversion method and for each class. How to produce the coefficient seed data sets will be described later.

Also, the image signal processing section 110 includes a coefficient production circuit 136 for producing the coefficient data sets Wi (i=1 to n) to be used in the estimation equation for each class according to the Equation (5) using the coefficient seed data sets for each class and values of the parameters h and v, wherein the coefficient data sets Wi correspond to the values of the parameters h and v. To this coefficient production circuit 136 are loaded the class-specific coefficient seed data sets corresponding to the first or second conversion method employed according to the above-mentioned conversion method selection information, from the information memory bank 135. Also, the system controller 101 supplies this coefficient production circuit 136 with values of the parameters h and v.

The above-mentioned coefficient memory 134 stores the coefficient data sets Wi (i=1 to n) for each class produced by this coefficient production circuit 136. The coefficient production circuit 136 produces the coefficient data sets Wi for each class in, for example, each vertical blanking period. With this, even when the user has changed a value of the parameter h or v under the operation of the remote control transmitter 200, the class-specific coefficient data sets Wi stored in the coefficient memory 134 can be changed immediately in correspondence to thus changed value of the parameter h or v, thus permitting the user to adjust the resolution smoothly.

Also, the image signal processing section 110 includes a normalization coefficient production circuit 137 for calculating a normalized coefficient S according to following Equation (6), in which the normalized coefficient S corresponds to the class-specific coefficient data sets Wi (i=1 to n) produced by the coefficient production circuit 136, and a normalization coefficient memory 138 for storing thus produced normalized coefficient S for each class.

$$S = \sum_{i=1}^{n} W_i \qquad (6)$$

The normalization coefficient memory 138 receives the class code CL from the above-mentioned class synthesis circuit 126 as read-out address information, and the normalized coefficient S corresponding to the class code CL is read out of this normalization coefficient memory 138 and supplied to the normalization calculation circuit 128, which will be described later.

Also, the image signal processing section 110 includes the estimation/prediction calculation circuit 127 for calculating pixel data set of an HD signal to be produced (that is, pixel data set of an objective position), based on the data sets (SD pixel data sets) xi of the prediction tap selectively extracted by the first tap selection circuit 121 and the coefficient data sets Wi read out of the coefficient memory 134.

It is necessary for this estimation/prediction calculation circuit 127 to produce line data sets L1 at the same line as that of the 525i signal and line data sets L2 at the intermediate position between the upper and lower lines of the 525i signal in odd-number (o) and even-number (e) fields, and also to double the number of pixels in each line with reference to FIG. 4 when transmitting the 525p signal. On the other hand, as shown in FIG. 5, it is necessary for this estimation/prediction calculation circuit 127 to produce line data sets L1 and L1' near the line of the 525i signal and line data sets L2 and L2' remote from the line of the 525i signal in odd-number (o) and even-number (e) fields and also to double the number of pixels in each line when transmitting the 1050i signal.

Therefore, the estimation/prediction calculation circuit 127 simultaneously produces data sets of four pixels that constitute the HD signal. For example, each of the data sets of four pixels is simultaneously produced using the estimation equations having different coefficient data sets, which are supplied from the coefficient memory 134. In this case, the estimation/prediction calculation circuit 127 calculates HD pixel data sets y to be produced according to the above Equation (4) based on the data sets (SD pixel data sets) xi of the prediction tap and coefficient data sets Wi read out of the coefficient memory 134.

Also, the image signal processing section 110 includes the normalization calculation circuit 128 for normalizing by dividing each of the HD pixel data sets y that constitute line data sets L1 and L2 (L1' and L2') received from the estimation/prediction calculation circuit 127 by the normalized coefficient S corresponding to the coefficient data sets Wi (i=1 to n) read out of the normalization coefficient memory 138 and used in each production. Although not described above, when the coefficient production circuit 136 produces the coefficient data sets to be used in the estimation equation according to the production equation based on the coefficient seed data sets, thus produced coefficient data sets contain a rounding error, so that a total sum of the coefficient data sets Wi (i=1 to n) do not always become 1.0. This causes the HD pixel data sets y calculated by the estimation/prediction calculation circuit 127 to fluctuate in level owing to the rounding error. As mentioned above, the fluctuations can be removed by normalization at the normalization calculation circuit 128.

Also, the image signal processing section 110 includes the linear-sequential conversion circuit 129 for performing line speed-doubling processing on a horizontal period so as to be a half period thereof and for linearly sequencing line data sets L1 and L2 (L1' and L2') received from the normalization calculation circuit 128 through the estimation/prediction calculation circuit 127.

Figure 16:
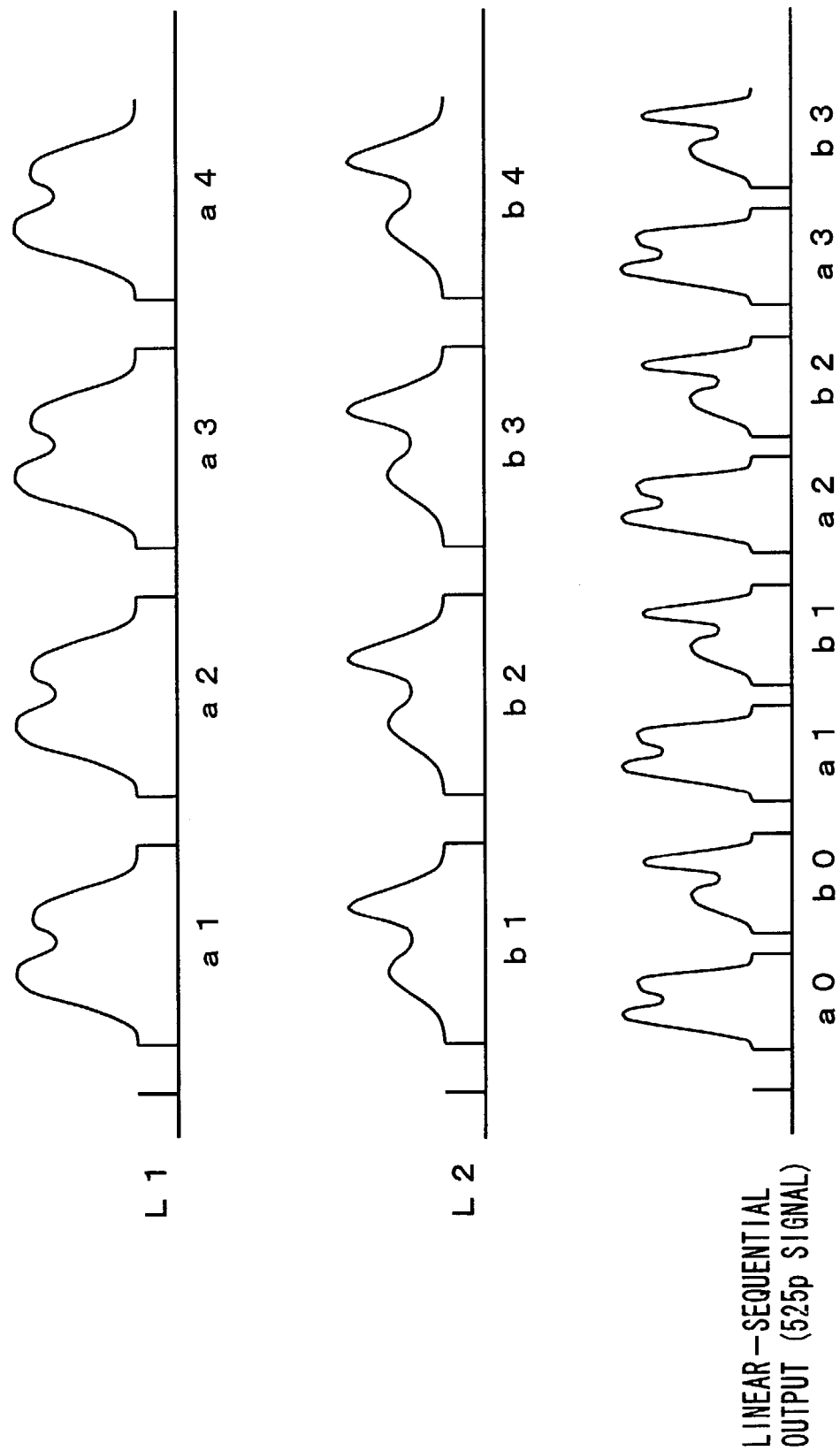
FIG. 16 is an illustration explaining line speed-doubling processing for transmitting the 525p signal.

FIG. 16 shows line speed-doubling processing for transmitting the 525p signal using an analog wave. As mentioned above, the estimation/prediction calculation circuit 127 produces the line data sets L1 and L2. The line data sets L1 include lines a1, a2, a3 . . . in this order, while the line data sets L2 include lines b1, b2, b3 . . . in this order. The linear-sequential conversion circuit 129 compresses each of these line data sets in the time-axis direction by half to then select thus compressed line data sets alternately, thus forming linear-sequential outputs a0, b0, a1, b1 . . . .

Incidentally, when transmitting the 1050i signal, the linear-sequential conversion circuit 129 generates a linear sequential output in order to satisfy the interlacing relationship between the odd-number and even-number fields. The linear-sequential conversion circuit 129, therefore, needs to switch the operation between transmitting of the 525p signal and transmitting of the 1050i signal. The concerned operation specification information is supplied from the register 130 as mentioned above.

The following will describe the operations of the image signal processing section 110.

Based on the SD signal (525i signal) stored in the buffer memory 109, the second tap selection circuit 122 selectively extracts data sets (SD pixel data sets) of a space class tap. In this case, the second tap selection circuit 122 selects a tap based on the tap position information, which is supplied from the register 132, corresponding to a user-selected conversion method and a motion class detected by the motion class detection circuit 125.

Data sets (SD pixel data sets) of the space class tap thus extracted selectively by the second tap selection circuit 122 are supplied to the space class detection circuit 124. This space class detection circuit 124, in turn, performs ADRC processing on each of the SD pixel data sets given as the data sets of the space class tap to thereby obtain a re-quantization code qi as the class information of the space class (class grouping for mainly indicating a waveform in the space) (see the Equation (1)).

Also, based on the SD signal (525i signal) stored in the buffer memory 109, the third tap selection circuit 123 selectively extracts data sets (SD pixel data sets) of a motion class tap. In this case, the third tap selection circuit 123 selects a tap based on the tap position information, which is supplied from the register 133, corresponding to the user-selected conversion method.

Data sets (SD pixel data sets) of the motion class tap thus extracted selectively by the third tap selection circuit 123 are supplied to the motion class detection circuit 125. This motion class detection circuit 125, in turn, obtains motion information MV of the motion class (class grouping for mainly indicating a degree of motion) from each of the SD pixel data sets given as data sets of the motion class tap.

This motion information MV and the above-mentioned re-quantization code qi are supplied to the class synthesis circuit 126. This class synthesis circuit 126 in turn obtains the class code CL indicating a class including pixel data set (pixel data set of an objective position) of the HD signal (525p or 1050i signal) to be produced on the basis of this motion information MV and the re-quantization code qi (see the Equation (3)). This class code CL is then supplied as read-out address information to the coefficient memory 134 and the normalization coefficient memory 138.

During each vertical blanking period, for example, the coefficient production circuit 136 produces the coefficient data sets Wi (i=1 to n) to be used in the estimation equation for each class, wherein the coefficient data sets Wi correspond to values of the parameters h and v and a conversion method that are adjusted or selected by the user. The coefficient memory 134 then stores them therein. Also, the normalization coefficient production circuit 137 produces the normalized coefficient S corresponding to the class-specific coefficient data sets Wi (i=1 to n) produced by the coefficient production circuit 136 as mentioned above, and the normalization coefficient memory 138 then stores therein the normalized coefficient S thus produced.

When the coefficient memory 134 receives the class code CL as read-out address information as mentioned above, the coefficient data sets Wi corresponding to the class code CL are read out of this coefficient memory 134 and supplied to the estimation/prediction calculation circuit 127. Also, based on the SD signal (525i signal) stored in the buffer memory 109, the first tap selection circuit 121 selectively extracts the data sets (SD pixel data sets) of a prediction tap. In this case, the first tap selection circuit 121 selects a tap based on the tap position information, which is supplied from the register 131, corresponding to a user-selected conversion method. The data sets (SD pixel data sets) xi of the prediction tap extracted selectively by this first tap selection circuit 121 are supplied to the estimation/prediction calculation circuit 127.

The estimation/prediction calculation circuit 127 calculates the pixel data set of the HD signal to be produced, that is, each of the pixel data sets (HD pixel data sets) y of the objective position using data sets (SD pixel data sets) xi of the prediction tap and coefficient data sets Wi read out of the coefficient memory 134 (see the Equation (4)). In this case, data sets of four pixels that constitute the HD signal are produced simultaneously.

Thus, if the first conversion method for transmitting the 525p signal is selected, line data sets L1 at the same position as that line of the 525i signal and line data sets L2 at the intermediate position between the upper and lower lines of the 525i signal are produced in the odd-number (o) and even-number (e) fields (see FIG. 4). On the other hand, if the second conversion method for transmitting the 1050i signal is selected, line data sets L1 and L1' near the line of the 525i signal and line data sets L2 and L2' remote from the line of the 525i signal are produced in the odd-number (o) and even-number (e) fields (see FIG. 5).

Thus, the line data sets L1 and L2 (L1' and L2') produced by the estimation/prediction calculation circuit 127 are supplied to the normalization calculation circuit 128. The normalization coefficient memory 138 is supplied with the class code CL as read-out address information as mentioned above, so that the normalized coefficient S corresponding to the class code CL, that is, normalized coefficient S corresponding to the coefficient data sets Wi (i=1 to n) used in production of each of the HD pixel data sets y that constitute the line data sets L1 and L2 (L1' and L2') received from the estimation/prediction calculation circuit 127 is read out of this normalization coefficient memory 138 and then supplied to the normalization calculation circuit 128. At the normalization calculation circuit 128, each of the HD pixel data sets y that constitutes the line data sets L1 and L2 (L1' and L2') received from the estimation/prediction calculation circuit 127 is divided by the respective normalized coefficient S to be normalized. Level fluctuations, which are caused by a rounding error occurred when the coefficient data sets to be used in the estimation equation (see the Equation (4)) are obtained according to the production equation (see the Equation (5)) using the coefficient seed data sets, are thus removed in the informational data set of an objective position.

The line data sets L1 and L2 (L1' and L2') thus normalized by the normalization calculation circuit 128 are supplied to the linear-sequential conversion circuit 129. This linear-sequential conversion circuit 129 in turn linear-sequences these line data sets L1 and L2 (L1' and L2') to produce the HD signal. In this case, the linear-sequential conversion circuit 129 operates according to the operation instruction information, which is supplied from the register 130, corresponding to the conversion method selected by the user. Therefore, if the user selects the first conversion method (525p), the linear-sequential conversion circuit 129 transmits the 525p signal. On the other hand, if the user selects the second conversion method (1050i), the linear-sequential conversion circuit 129 transmits the 1050i signal.

As mentioned above, the coefficient production circuit 136 produces the coefficient data sets Wi (i=1 to n) to be used in the estimation equation corresponding to values of the parameters h and v for each class using the coefficient seed data sets loaded from the information memory bank 135, and the coefficient memory 134 stores the coefficient data sets Wi. In this configuration, the estimation/prediction calculation circuit 127 calculates the HD pixel data sets y using the coefficient data sets Wi (i=1 to n) read out of this coefficient memory 134 in correspondence to the class code CL. The user, therefore, can adjust the values of the parameters h and v to thereby adjust in a step-less manner the horizontal and vertical picture qualities of an image obtained on the basis of the HD signal. Incidentally, in this case, the coefficient production circuit 136 produces the class-specific coefficient data sets corresponding to the adjusted values of the parameters h and v as required and used, thereby eliminating the necessity of a memory for storing a large number of coefficient data sets.

As mentioned above, the information memory bank 135 stores therein the coefficient seed data sets for each conversion method and for each class. These coefficient seed data sets are produced by learning beforehand.

First, an illustrative method for producing the coefficient seed data sets will be described. Specifically, an example is given for obtaining coefficient seed data sets $w_{10}$ through $w_{n9}$, which are coefficient data sets in the production equation of the Equation (5).

Here, for the following explanation, the terms ti (i=0 through 9) are defined as following Equation (7).

$$t_0=1,\ t_1=v,\ t_2=h,\ t_3=v^2,\ t_4=vh,\ t_5=h^2,\ t_6=v^3,\ t_7=v^2h,\ t_8=vh^2,\ t_9=h^3 \qquad (7)$$

By using the Equation (7), the Equation (5) is transformed into following Equation (8):

$$W_j = \sum_{i=0}^{9} W_{ji} t_i \qquad (8)$$

Finally, an undetermined coefficient wxy is obtained by learning. That is, for each conversion method and for each class, by using plural SD pixel data sets and plural HD pixel data sets, a coefficient value that minimizes a square error is determined. That is, the least square method is employed for solution. Supposing the number of times of learning to be m, a residual error in data sets of the k-th ($1 \leq k \leq m$) learning to be $e_k$, and a total sum of square errors to be E, the value of E can be given by following Equation (9) based on the Equations (4) and (5).

$$\begin{aligned}
E &= \sum_{k=1}^{m} e_k^2 \\
&= \sum_{k=1}^{m} ([y_k - (W_1 x_{1K} + W_2 x_{2K} + \ldots + W_n x_{nK})])^2 \\
&= \sum_{k=1}^{m} \{y_k - [(t_0 w_{10} + t_1 w_{11} + \ldots + t_9 w_{19}) x_{1k} + \ldots + \\
&\qquad (t_0 w_{n0} + t_1 w_{n1} + \ldots + t_9 w_{n9}) x_{nk}]\}^2 \\
&= \sum_{k=1}^{m} \{y_k - [(w_{10} + w_{11} v + \ldots + w_{19} h^3) x_{1k} + \ldots + \\
&\qquad (w_{n0} + w_{n1} v + \ldots + w_{n9} h^3) x_{nk}]\}^2
\end{aligned} \qquad (9)$$

In the equation, terms $x_{ik}$ indicate the k-th pixel data set of an i-th prediction tap position of an SD image and terms $y_k$ indicate k-th pixel data set of the corresponding k-th HD image.

According to a solution by use of the least square method, a value of $w_{xy}$ that makes partial differentiation of the Equation (9) into zero is calculated. This is indicated by following Equation (10).

$$\frac{\partial E}{\partial w_{ij}} = \sum_{k=1}^{m} 2\left(\frac{\partial e_k}{\partial w_{ij}}\right) e_k = -\sum_{k=1}^{m} 2 t_j x_{ik} e_k = 0 \qquad (10)$$

Assuming terms $X_{ipjq}$ and $Y_{ip}$ as given in following Equations (11) and (12), the Equation (10) can be changed into following Equation (13) by use of matrix.

$$X_{ipjq} = \sum_{k=1}^{m} x_{ik} t_p x_{jk} t_q \qquad (11)$$

$$Y_{ip} = \sum_{k=1}^{m} x_{ik} t_p y_k \qquad (12)$$

$$\begin{bmatrix} X_{1010} & X_{1011} & X_{1012} & \cdots & X_{1019} & X_{1020} & \cdots & X_{10n9} \\ X_{1110} & X_{1111} & X_{1112} & \cdots & X_{1119} & X_{1120} & \cdots & X_{11n9} \\ X_{1210} & X_{1211} & X_{1212} & \cdots & X_{1219} & X_{1220} & \cdots & X_{12n9} \\ \vdots & \vdots & \vdots & \ddots & \vdots & \vdots & \ddots & \vdots \\ X_{1910} & X_{1911} & X_{1912} & \cdots & X_{1919} & X_{1920} & \cdots & X_{19n9} \\ X_{2010} & X_{2011} & X_{2012} & \cdots & X_{2019} & X_{2020} & \cdots & X_{20n9} \\ \vdots & \vdots & \vdots & \ddots & \vdots & \vdots & \ddots & \vdots \\ X_{n910} & X_{n911} & X_{n912} & \cdots & X_{n919} & X_{n920} & \cdots & X_{n9n9} \end{bmatrix} \begin{bmatrix} w_{10} \\ w_{11} \\ w_{12} \\ \vdots \\ w_{19} \\ w_{20} \\ \vdots \\ w_{n9} \end{bmatrix} = \begin{bmatrix} Y_{10} \\ Y_{11} \\ Y_{12} \\ \vdots \\ Y_{19} \\ Y_{20} \\ \vdots \\ Y_{n9} \end{bmatrix} \qquad (13)$$

This equation is generally referred to as a normal equation. This normal equation is solved with respect to $w_{xy}$ using a sweeping-out method (Gauss-Jordan's elimination method) and the like, thus calculating the coefficient seed data sets.

Figure 17:
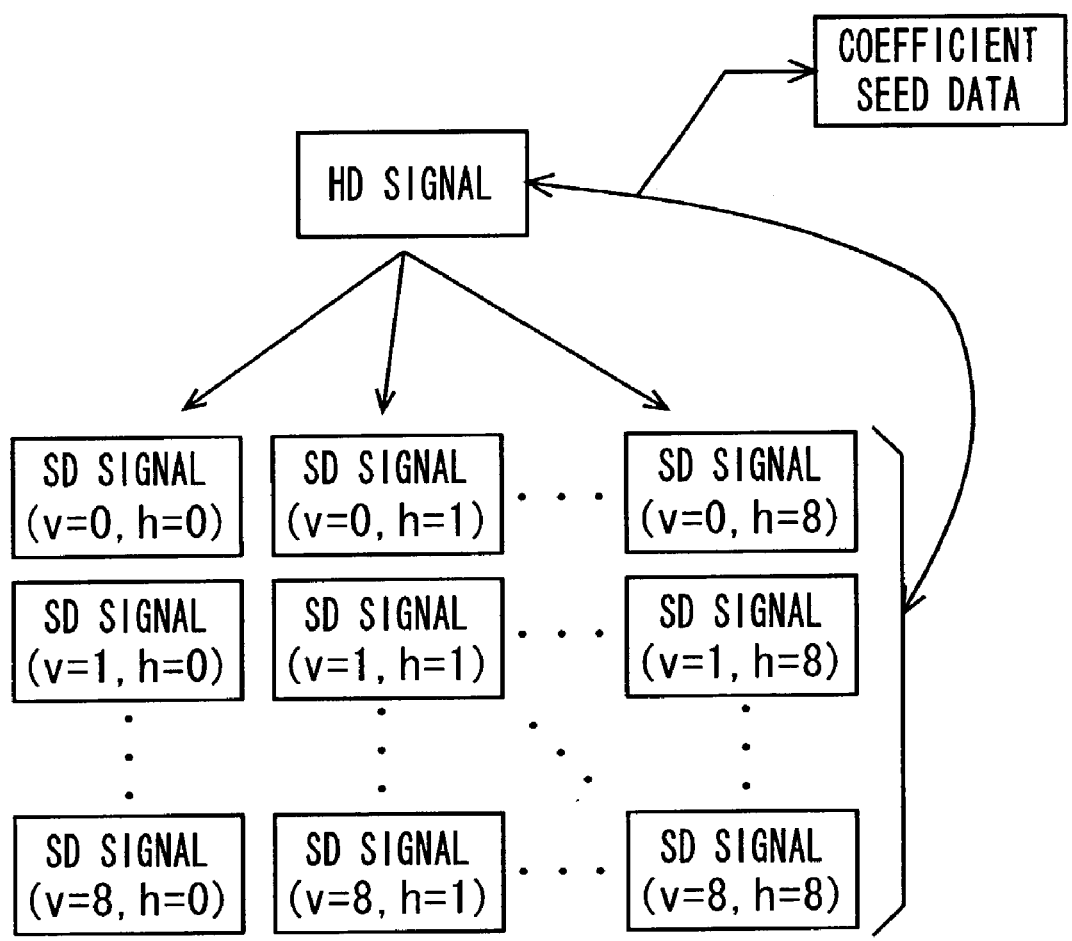
FIG. 17 is an illustration showing concept of one example of a method for producing coefficient seed data.

FIG. 17 shows a concept of the above-mentioned method for producing the coefficient seed data sets. Specifically, a plurality of SD signals is produced from an HD signal. For example, SD signals of total 81 kinds are produced with the parameters h and v for varying a horizontal band and a vertical band of a filter used at the time of producing the SD signals from the HD signal being varied respectively at nine steps. By performing learning between a plurality of SD signals thus produced and the HD signal, the coefficient seed data sets are produced.

FIG. 18 shows a configuration of a coefficient seed data production device 150 for producing the coefficient seed data sets based on the above-mentioned concept.

This coefficient seed data production device 150 includes an input terminal 151 for receiving the HD signal (525p or 1050i signal) as a teacher signal, and an SD signal production circuit 152 for performing a thinning-out processing on this HD signal horizontally and vertically to thereby obtain SD signal as an input signal.

This SD signal production circuit 152 receives a conversion method selection signal as a control signal. If the first conversion method (for obtaining the 525p signal from the 525i signal at the image signal processing section 110 shown in FIG. 1) is selected, the SD signal production circuit 152 performs the thinning-out processing on the 525p signal to thereby produce SD signal (see FIG. 4). On the other hand, if the second conversion method (for obtaining the 1050i signal from the 525i signal at the image signal processing section 110 shown in FIG. 1) is selected, the SD signal production circuit 152 performs the thinning-out processing on the 1050i signal to thereby produce SD signal (see FIG. 5).

Also, the SD signal production circuit 152 receives the parameters h and v as control signals. In correspondence with these parameters h and v, the horizontal and vertical bands of the filter used when producing the SD signals from the HD signal are varied. The following will describe some examples of details of the filter.

For example, it is conceivable to constitute the filter by a band-pass filter for restricting the horizontal-band frequencies and a band-pass filter for restricting the vertical-band frequencies. In this case, as shown in FIG. 19, by designing a frequency response corresponding to step-wise given values of the parameter h or v to perform inverse Fourier transform, a one-dimensional filter having the frequency response corresponding to the step-wise given values of the parameter h or v can be obtained.

Also, for example, it is conceivable to constitute the filter by a one-dimensional Gaussian filter for restricting the horizontal-band frequencies and a one-dimensional Gaussian filter for restricting the vertical-band frequencies. Such the one-dimensional Gaussian filter can be represented by following Equation (14).

$$\text{Out} = \frac{1.0}{\sigma\sqrt{2.0\pi}} e^{\frac{-(4.0x-37)^2}{2.0\sigma^2}} \quad (14)$$

In this case, by step-wise changing the value of a standard deviation σ in correspondence with the step-wise given values of the parameter h or v, a one-dimensional Gaussian filter having the frequency response that corresponds to the step-wise give values of the parameter h or v can be obtained.

Also, for example, it is conceivable to constitute the filter by a two-dimensional filter F (h, v) having both horizontal and vertical frequency responses that are decided by the parameters h and v, respectively. In this method for producing two-dimensional filter, similar to the above-mentioned one-dimensional filter, the two-dimensional frequency response corresponding to the step-wise given values of the parameters h and v is designed, and two-dimensional inverse Fourier transform is performed. As a result, the two-dimensional filter having the two-dimensional frequency response that corresponds to the step-wise given values of the parameters h and v can be obtained.

Also, the coefficient seed data production device 150 includes first through third tap selection circuits 153–155 each for selectively extracting, and then transmitting, the plural SD pixel data sets located on a periphery of an objective position in an HD signal (1050i or 525p signal) from the signal (525i signal) received from the SD signal production circuit 152.

These first through third tap selection circuits 153–155 are constituted like the first through third tap selection circuits 121–123 of the above-mentioned image signal processing section 110. A tap to be selected by any of the first through third tap selection circuits 153–155 is specified according to the tap position information received from a tap selection control circuit 156.

The tap selection control circuit 156 receives a conversion method selection signal as the control signal. The first through third tap selection circuits 153–155 are supplied with different tap position information according to a different conversion methods, that is, whether the first conversion method or the second conversion method is selected. Also, the tap selection control circuit 156 receives the motion information MV of the motion class from a motion class detection circuit 158, which is described later. Thus, the tap position information supplied to the second tap selection circuit 154 is adapted to change with the magnitude of the motion.

Also, the coefficient seed data production device 150 includes a space class detection circuit 157 for detecting a level distribution pattern of the data sets (SD pixel data sets) of the space class tap selectively extracted by the second tap selection circuit 154, for detecting a space class based on this level distribution pattern, and then for transmitting class information of this space class. This space class detection circuit 157 is constituted like the space class detection circuit 124 of the above-mentioned image signal processing section 110. This space class detection circuit 157 transmits, as class information indicating the space class, a re-quantization code qi for each of the SD pixel data sets as the data sets of the space class tap.

Also, the coefficient seed data production device 150 includes the motion class detection circuit 158 for detecting a motion class mainly indicating a degree of motion from the data sets (SD pixel data sets) of the motion class tap selectively extracted by the third tap selection circuit 155 and then for transmitting the motion information MV thereof. This motion class detection circuit 158 is constituted like the motion class detection circuit 125 of the above-mentioned image signal processing section 110. This motion class detection circuit 158 calculates inter-frame differences from the data sets (SD pixel data sets) of the motion class tap selectively extracted by the third tap selection circuit 155 to then perform threshold value processing on an average value of the absolute values of these differences, thus detecting a motion class that provides an index of motion.

Also, the coefficient seed data production device 150 includes a class synthesis circuit 159 for obtaining a class code CL for indicating a class including pixel data set of an objective position in the HD signal (525p or 1050i signal), based on the re-quantization code qi given as class information of the space class received from the space class detection circuit 157 and the motion information MV of the motion class received from the motion class detection circuit 158. This class synthesis circuit 159 is also constituted like the class synthesis circuit 126 of the above-mentioned image signal processing section 110.

Also, the coefficient seed data production device 150 includes a normal equation production section 160 for producing a normal equation (see the Equation (13)) to be used for obtaining the coefficient seed data sets $w_{10}$ through $w_{n9}$ for each class, based on each of the HD pixel data sets y given as pixel data set of the objective position obtained from the HD signal received at the input terminal 151, data sets (SD pixel data sets) xi of the prediction tap selectively extracted by the first tap selection circuit 153 respectively in correspondence with thus obtained each of the HD pixel data sets y, and the class code CL received from the class synthesis circuit 159 respectively in correspondence with each of the HD pixel data sets y thus obtained.

In this case, learning data sets are produced in combination of one of the HD pixel data sets y and the pixel data sets of the prediction tap in number of n each corresponding thereto. The parameters h and v to be supplied to the SD signal production circuit 152 are sequentially changed so that a plurality of SD signals having the horizontal and vertical bands each varying in a step-by-step manner can be sequentially produced. Thus, a normal equation having many learning data sets registered therein is produced in the normal equation production section 160.

Herein, the coefficient seed data sets calculated by learning between the HD signal and the SD signals produced by passing this HD signal through a narrow-band filter are used to obtain the HD signal with a high resolution. Conversely, the coefficient seed data sets calculated by learning between the HD signal and the SD signals produced by passing this HD signal through a wide-band filter are used to obtain the HD signal with a low resolution. As mentioned above, a plurality of SD signals can be produced sequentially to thereby register the learning data sets, thus obtaining the coefficient seed data sets for obtaining HD signal having continuous resolution.

Incidentally, although not shown, when disposing a delay circuit for time matching at a preceding stage to the first tap selection circuit 153, a timing for supplying the SD pixel data sets xi from this first tap selection circuit 153 to the normal equation production section 160 can be adjusted.

Also, the coefficient seed data production device 150 includes a coefficient seed data decision section 161 for receiving data sets of the normal equation produced for each class by the normal equation production section 160, and for solving this class-specific normal equation in order to obtain coefficient seed data sets $w_{10}$ through $w_{n9}$ for each class, and a coefficient seed memory 162 for storing thus obtained coefficient seed data sets $w_{10}$ through $w_{n9}$. The coefficient seed data decision section 161 solves the normal equation according to a method such as the sweeping-out method, thus obtaining coefficient seed data sets $w_{10}$ through $w_{n9}$.

The following will describe the operations of the coefficient seed data production device 150 shown in FIG. 18. HD signal (525p or 1050i signal) as a teacher signal is supplied to the input terminal 151 and then it undergoes thinning-out processing both horizontally and vertically in the SD signal production circuit 152, thus producing SD signal (525i signal) as an input signal.

In this case, if the first conversion method (for obtaining the 525p signal from the 525i signal by the image signal processing section 110 shown in FIG. 1) is selected, the SD signal production circuit 152 performs the thinning-out processing on the 525p signal to thereby produce the SD signal. On the other hand, if the second conversion method (for obtaining the 1050i signal from the 525i signal by the image signal processing section 110 shown in FIG. 1) is selected, the SD signal production circuit 152 performs the thinning-out processing on the 1050i signal to thereby produce the SD signal. Also, in this case, the SD signal production circuit 152 receives the parameters h and v as the control signals to sequentially produce a plurality of the SD signals having horizontal and vertical bands each varying in a step-by-step manner.

Based on these SD signals (525i signals), the second tap selection circuit 154 selectively extracts the data sets (SD pixel data sets) of the space class tap located on a periphery of an objective position in the HD signal (525p or 1050i signal). This second tap selection circuit 154 selects a tap based on the tap position information, which is supplied from the tap selection control circuit 156, corresponding to selected conversion method and a motion class detected by the motion class detection circuit 158.

The data sets (SD pixel data sets) of the space class tap selectively extracted by this second tap selection circuit 154 are supplied to the space class detection circuit 157. This space class detection circuit 157 performs ADRC processing on each of the SD pixel data sets given as the data sets of the space class tap to thereby obtain the re-quantization code qi used as the class information of the space class (class grouping mainly for indicating of a waveform in a space) (see the Equation (1)).

Also, based on the SD signals produced by the SD signal production circuit 152, the third tap selection circuit 155 selectively extracts the data sets (SD pixel data sets) of a motion class tap located on a periphery of the objective position in the HD signal. In this case, the third tap selection circuit 155 selects a tap based on the tap position information, which is supplied from the tap selection control circuit 156, corresponding to a selected conversion method.

The data sets (SD pixel data sets) of a motion class tap selectively extracted by this third tap selection circuit 155 are supplied to the motion class detection circuit 158. This motion class detection circuit 158 obtains motion information MV of a motion class (class grouping for mainly indicating a degree of motion) based on each of the SD pixel data sets given as the data sets of the motion class tap.

This motion information MV and the above-mentioned re-quantization code qi are supplied to the class synthesis circuit 159. This class synthesis circuit 159 obtains a class code CL indicating a class that includes the pixel data set of the objective position in the HD signal (525p or 1050i signal), based on this motion information MV and the re-quantization code qi (see the Equation (3)).

Also, based on the SD signals produced by the SD signal production circuit 152, the first tap selection circuit 153 selectively extracts the data sets (SD pixel data sets) of the prediction tap located on a periphery of the objective position in the HD signal. In this case, the first tap selection circuit 153 selects a tap based on the tap position information, which is supplied from the tap selection control circuit 156, corresponding to a selected conversion method.

Then, the normal equation production circuit 160 produces a normal equation for producing coefficient seed data sets $w_{10}$ through $w_{n9}$ (see the Equation (13)) for each class based on each of the HD pixel data sets y given as pixel data set of the objective position obtained from the HD signal supplied at the input terminal 151, the data sets (SD pixel data sets) xi of the prediction tap selectively extracted by the first tap selection circuit 153 in respective correspondence to each of the HD pixel data sets y thus given, and a class code CL received from the class synthesis circuit 159 in respective correspondence to each of the HD pixel data sets y thus given.

Then, this normal equation is solved by the coefficient seed data decision section 161, which obtains coefficient seed data sets $w_{10}$ through $w_{n9}$ for each class. Thus obtained coefficient seed data sets $w_{10}$ through $w_{n9}$ are stored in the coefficient seed memory 162 in which the addresses are sub-divided for each class.

Thus, the coefficient seed data production device 150 shown in FIG. 18 can produce class-specific coefficient seed data sets $w_{10}$ through $w_{n9}$ to be stored in the information memory bank 135 of the image signal processing section 110 shown in FIG. 1. In this case, the SD signal production circuit 152 produces the SD signal (525i signal) using the 525p or 1050i signal according to selected conversion method, thus producing the coefficient seed data sets each corresponding to the first conversion method (for obtaining the 525p signal from the 525i signal at the image signal processing section 110) and the second conversion method (for obtaining the 1050i signal from the 525i signal at the image signal processing section 110).

The following will describe another illustrative method for producing coefficient seed data sets. This example will also show how to obtain coefficient seed data sets $w_{10}$ through $w_{n9}$, which are coefficient data sets in the production equation of the Equation (5).

FIG. 20 shows a concept of this example. Based on this concept, a plurality of SD signals is produced from an HD signal. For example, SD signals of total 81 kinds are produced with varying in nine steps the parameters h and v, respectively, for varying the horizontal and vertical bands of a filter used in production of the SD signals from the HD signal. Then learning is performed between each of the SD signals thus produced and the HD signal so that the coefficient data sets Wi to be used in the estimation equation of the Equation (4) can be produced. Then, the coefficient seed data sets are produced using the coefficient data sets Wi thus produced corresponding to each of the SD signals.

First, how to obtain the coefficient data sets to be used in the estimation equation will be described. Herein, a description will be made as to a case where the coefficient data sets Wi (i=1 to n) to be used in the estimation equation of the Equation (4) are obtained using the least square method. Typically, a consideration will be made on an observation equation of following Equation (15) as a generalized example, defining X as input data sets, W as coefficient data sets, and Y as a prediction value.

$$XW = Y \quad (15)$$

$$X = \begin{bmatrix} x_{11} & x_{12} & \cdots & x_{1n} \\ x_{21} & x_{22} & \cdots & x_{2n} \\ \cdots & \cdots & \cdots & \cdots \\ x_{m1} & x_{m2} & \cdots & x_{mn} \end{bmatrix}, \quad W = \begin{bmatrix} W_1 \\ W_2 \\ \cdots \\ W_n \end{bmatrix}, \quad Y = \begin{bmatrix} y_1 \\ y_2 \\ \cdots \\ y_m \end{bmatrix}$$

In the Equation (15), term m indicates the number of learning data sets and term n indicates the number of prediction taps.

Data sets collected by the observation equation of the Equation (15) are subjected to the least square method. From this observation equation of the Equation (15), the following residual equation of Equation (16) is considered.

$$XW = Y + E, \quad E = \begin{bmatrix} e_1 \\ e_2 \\ \cdots \\ e_m \end{bmatrix} \quad (16)$$

Based on the residual equation of the Equation (16), it is considered that the conditions are satisfied to minimize $e_2$ in following Equation (17). That is, it is necessary only to take the conditions of following Equation (18) into account.

$$e^2 = \sum_{i=1}^{m} e_i^2 \quad (17)$$

$$e_1 \frac{\partial e_1}{\partial w_i} + e_2 \frac{\partial e_2}{\partial w_i} + \ldots + e_m \frac{\partial e_m}{\partial w_i} = 0 \; (i = 1, 2, \ldots, n) \quad (18)$$

That is, conditions in the number of n based on the value i in the Equation (18) are considered, and $W_1, W_2, \ldots, W_n$ having values satisfying these conditions may be calculated. As such, from the residual equation of the Equation (16), following Equation (19) can be obtained. Further from the Equations (19) and (15), following Equation (20) can be obtained.

$$\frac{\partial e_i}{\partial w_1} = x_{i1}, \; \frac{\partial e_i}{\partial w_2} = x_{i2}, \; \ldots, \; \frac{\partial e_i}{\partial w_n} = x_{in} \; (i = 1, 2, \ldots, m) \quad (19)$$

$$\sum_{i=1}^{m} e_i x_{i1} = 0, \; \sum_{i=1}^{m} e_i x_{i2} = 0, \; \ldots, \; \sum_{i=1}^{m} e_i x_{in} = 0 \quad (20)$$

From the Equations (16) and (20), a normal equation of following Equation (21) can be obtained.

$$\begin{cases} \left(\sum_{j=1}^{m} x_{j1} x_{j1}\right) w_1 + \left(\sum_{j=1}^{m} x_{j1} x_{j2}\right) w_2 + \ldots + \left(\sum_{j=1}^{m} x_{j1} x_{jn}\right) w_n = \left(\sum_{j=1}^{m} x_{j1} y_j\right) \\ \left(\sum_{j=1}^{m} x_{j2} x_{j1}\right) w_1 + \left(\sum_{j=1}^{m} x_{j2} x_{j2}\right) w_2 + \ldots + \left(\sum_{j=1}^{m} x_{j2} x_{jn}\right) w_n = \left(\sum_{j=1}^{m} x_{j2} y_j\right) \\ \cdots \\ \left(\sum_{j=1}^{m} x_{jn} x_{j1}\right) w_1 + \left(\sum_{j=1}^{m} x_{jn} x_{j2}\right) w_2 + \ldots + \left(\sum_{j=1}^{m} x_{jn} x_{jn}\right) w_n = \left(\sum_{j=1}^{m} x_{jn} y_j\right) \end{cases} \quad (21)$$

Since the normal equation of the Equation (21) is capable of making equations in the same number as unknown number n, the most probable value of each Wi can be obtained. In this case, the simultaneous equations are solved using the sweeping-out method etc.

The following will describe how to obtain the coefficient seed data sets using the coefficient data sets produced in correspondence to each of the SD signals.

Suppose coefficient data sets in a certain class, which are obtained as a result of learning performed by use of the SD signals corresponding to the parameters h and v, to be $k_{vhi}$. Herein, the term i indicates a prediction tap number. From this value of $k_{vhi}$, coefficient seed data sets of this class are obtained.

Each of the coefficient data sets Wi (i=1 to n) is given by the above-mentioned Equation (5) using the coefficient seed data sets $w_{10}$ through $w_{n9}$. Herein, under the consideration that the least square method has bee used on the coefficient data sets Wi, the residual is given by following Equation (22).

$$e_{vhi} = k_{vhi} - (w_{i0} + w_{i1}v + w_{i2}h + w_{i3}v^2 + w_{i4}vh + w_{i5}h^2 + \qquad (22)$$
$$w_{i6}v^3 + w_{i7}v^2h + w_{i8}vh^2 + w_{i9}h^3)$$

$$= k_{vhi} - \sum_{j=0}^{9} w_{ij} t_j$$

Herein, the term $t_j$ is given in the above-mentioned Equation (7). By performing the least square method on the Equation (22), following Equation (23) can be obtained.

$$\frac{\partial}{\partial w_{ij}} = \sum_v \sum_h (e_{vhi})^2 = \sum_v \sum_h 2\left(\frac{\partial e_{vhi}}{\partial w_{ij}}\right) e_{vhi} \quad (23)$$
$$= -\sum_v \sum_h 2 t_j e_{vhi}$$
$$= 0$$

Herein, by defining $X_{jk}$ and $Y_j$ to be such as given in following Equations (24) and (25), respectively, the Equation (23) is changed to following Equation (26).

$$X_{jk} = \sum_v \sum_h t_j t_k \quad (24)$$

$$Y_j = \sum_v \sum_h t_j k_{vhi} \quad (25)$$

$$\begin{bmatrix} X_{00} & X_{01} & \cdots & X_{09} \\ X_{10} & X_{11} & \cdots & X_{19} \\ \vdots & \vdots & \ddots & \vdots \\ X_{90} & X_{91} & \cdots & X_{99} \end{bmatrix} \begin{bmatrix} w_{i0} \\ w_{i1} \\ \vdots \\ w_{i9} \end{bmatrix} = \begin{bmatrix} Y_0 \\ Y_1 \\ \vdots \\ Y_9 \end{bmatrix} \quad (26)$$

This Equation (26) is also a normal equation and so can be solved by a general solution such as the sweeping-out method, thus calculating the coefficient seed data sets $w_{10}$ through $w_{n9}$.

Figure 21:
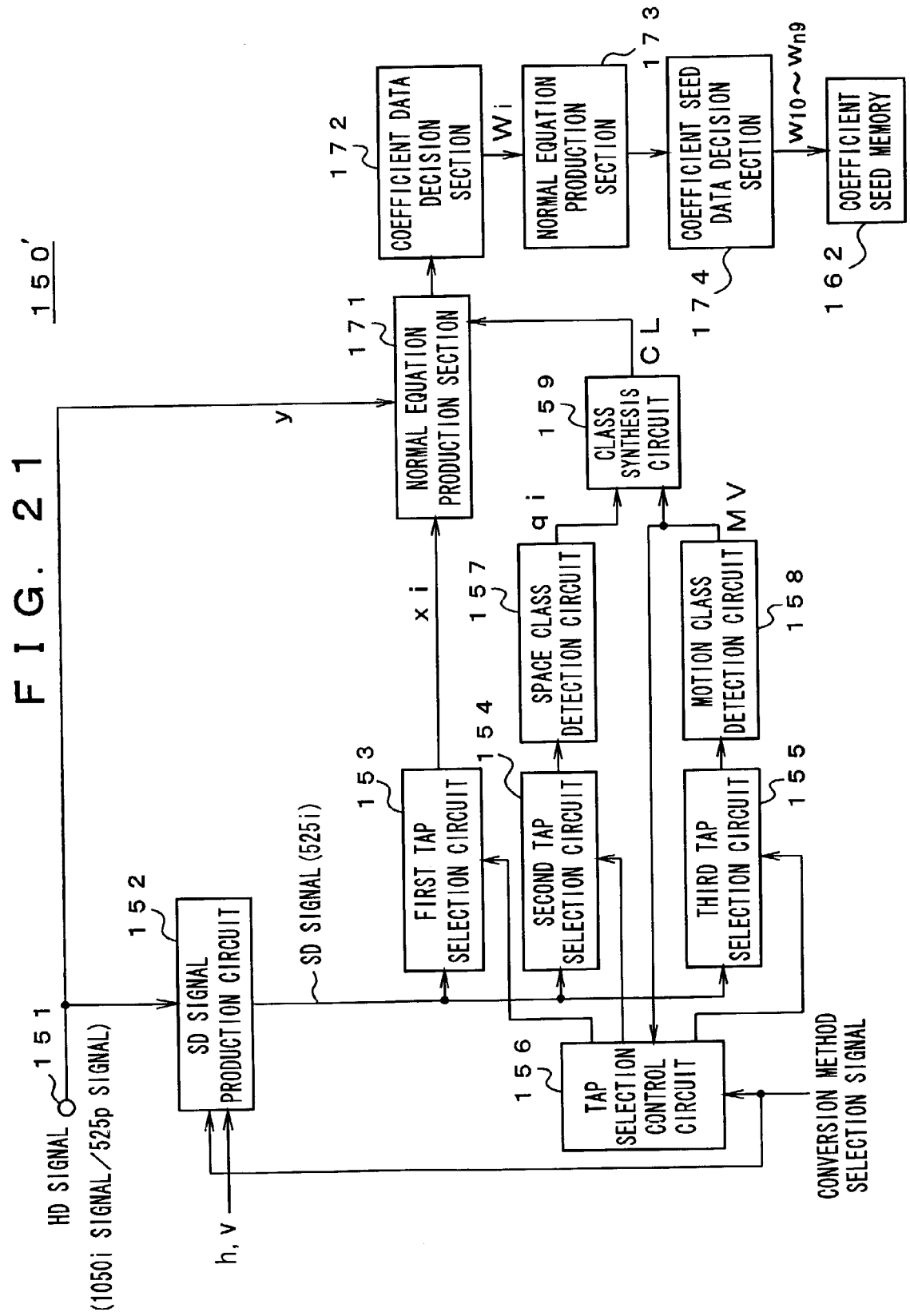
FIG. 21 is a block diagram showing a configuration example of another coefficient seed data production device.

FIG. 21 shows a configuration of another coefficient seed data production device 150' for producing coefficient seed data sets based on a concept shown in FIG. 20. In FIG. 21, components that correspond to those in FIG. 20 are indicated by the same reference symbols and their detailed description is omitted.

The coefficient seed data production device 150' includes a normal equation production section 171 for producing a normal equation (see the Equation (21)) to be used for obtaining coefficient data sets Wi (i=1 to n) for each class, based on each of the HD pixel data sets y given as pixel data set of the objective position obtained from the HD signal received at the input terminal 151, data sets (SD pixel data sets) $x_i$ of the prediction tap selectively extracted by the first tap selection circuit 153 respectively in correspondence with each of the HD pixel data sets y thus obtained, and the class codes CL received from the class synthesis circuit 159 respectively in correspondence with each of the HD pixel data sets y thus obtained.

In this case, learning data sets are produced in combination of one of the HD pixel data sets y and the pixel data sets of the prediction tap in the number of n corresponding thereto. The parameters h and v to be supplied to the SD signal production circuit 152 are sequentially changed so that a plurality of SD signals which have horizontal and vertical bands changed step-wise can be sequentially produced, thus producing learning data sets between the HD signal and each of the SD signals. This permits the normal equation production section 171 to produce a normal equation for obtaining the coefficient data sets Wi (i=1 to n) for each class in respective correspondence with each of the SD signals.

Also, the coefficient seed data production device 150' includes a coefficient data decision section 172 for receiving data sets of the normal equation produced by the normal equation production section 171 to then solve this normal equation in order to obtain the coefficient data sets Wi for each class in respective correspondence to each SD signal, and a normal equation production section 173 for producing a normal equation (see the Equation (26)) for obtaining the coefficient seed data sets $w_{10}$ through $w_{n9}$ for each class using the class-specific coefficient data sets Wi that correspond to each of the SD signals.

Also, the coefficient seed data production device 150' includes a coefficient seed data decision section 174 for receiving data sets of the normal equation produced for each class by the normal equation production section 173 to then solve the normal equation for each class in order to obtain the coefficient seed data sets $w_{10}$ through $w_{n9}$ for each class, and the coefficient seed memory 162 for storing coefficient seed data sets $w_{10}$ through $w_{n9}$ thus obtained.

The other components of the coefficient seed data production device 150' shown in FIG. 21 are constituted like those of the coefficient seed data production device 150 shown in FIG. 18.

The following will describe the operations of the coefficient seed data production device 150'. At the input terminal 151, an HD signal (525p or 1050i signal) as a teacher signal is supplied. Then, the HD signal is subjected to the thinning-out processing horizontally and vertically in the SD signal production circuit 152, thus producing the SD signal (525i signal) as the input signal.

In this case, if the first conversion method (for obtaining the 525p signal from the 525i signal by the image signal processing section 110 shown in FIG. 1) is selected, the SD signal production circuit 152 performs a thinning-out processing on the 525p signal to produce the SD signal. On the other hand, if the second conversion method (for obtaining the 1050i signal from the 525i signal by the image signal processing section 110 shown in FIG. 1) is selected, the SD signal production circuit 152 performs a thinning-out processing on the 1050i signal to produce the SD signal. Also, in this case, the SD signal production circuit 152 receives the parameters h and v as the control signal so that a plurality of SD signals are sequentially produced with their horizontal and vertical bands varying in a step-by step manner.

Based on the SD signals (525i signals), the second tap selection circuit 154 selectively extracts the data sets (SD pixel data sets) of a space class tap located on a periphery of an objective position in the HD signal (525p or 1050i signal). This second tap selection circuit 154 selects a tap based on the tap position information, which is received from the tap selection control circuit 156, corresponding to a selected conversion method and a motion class detected by the motion class detection circuit 158.

The data sets (SD pixel data sets) of the space class tap selectively extracted by this second tap selection circuit 154 are supplied to the space class detection circuit 157. This space class detection circuit 157 performs ADRC processing on each of the SD pixel data sets given as the data sets of the space class tap to thereby obtain a re-quantization code qi used as class information of a space class (class grouping mainly for indicating of a waveform in a space) (see the Equation (1)).

Also, based on the SD signals produced by the SD signal production circuit 152, the third tap selection circuit 155 selectively extracts the data sets (SD pixel data sets) of a motion class tap located on a periphery of the objective position in the HD signal. In this case, the third tap selection circuit 155 selects a tap based on the tap position information, which is supplied from the tap selection control circuit 156, corresponding to the selected conversion method.

The data sets (SD pixel data sets) of a motion class tap selectively extracted by this third tap selection circuit 155 are supplied to the motion class detection circuit 158. This motion class detection circuit 158 obtains motion information MV of a motion class (class grouping for mainly indicating a degree of motion) based on each of the SD pixel data sets given as the data sets of the motion class tap.

The motion information MV and the above-mentioned re-quantization code qi are supplied to the class synthesis circuit 159. This class synthesis circuit 159 obtains a class code CL that indicates a class including pixel data set of an objective position in the HD signal (525p or 1050i signal), based on this motion information MV and the re-quantization code qi (see the Equation (3)).

Also, based on the SD signals produced by the SD signal production circuit 152, the first tap selection circuit 153 selectively extracts the data sets (SD pixel data sets) of a prediction tap located on a periphery of the objective position in the HD signal. In this case, the first tap selection circuit 153 selects a tap based on the tap position information, which is supplied from the tap selection control circuit 156, corresponding to the selected conversion method.

Then, the normal equation production section 171 produces a normal equation (see the Equation (21)) for obtaining coefficient data sets $W_i$ (i=1 to n) for each class in respective correspondence to each of the SD signals produced by the SD signal production circuit 152 based on each of the HD pixel data sets y given as pixel data set of the objective position obtained from the HD signal received at the input terminal 151, the data sets (SD pixel data sets) xi of a prediction tap selectively extracted by the first tap selection circuit 153 in respective correspondence to each of the HD pixel data sets y thus given, and each of the class codes CL received from the class synthesis circuit 159 in respective correspondence to each of the HD pixel data sets y thus given.

Then, this normal equation is solved by the coefficient data decision section 172 so that coefficient data sets Wi for each class in respective correspondence to each of the SD signals can be obtained. Based on the class-specific coefficient data sets Wi corresponding to each of the SD signals, the normal equation production section 173 produces a normal equation (see the Equation (26)) for obtaining coefficient seed data sets $w_{10}$ through $w_{n9}$ for each class.

Then, this normal equation is solved by the coefficient seed data decision section 174 so that the coefficient seed data sets $w_{10}$ through $w_{n9}$ for each class can be obtained. The coefficient seed data sets $w_{10}$ through $w_{n9}$ are stored in the coefficient seed memory 162 in which the addresses are sub-divided for each class.

Thus, the coefficient seed data production device 150' shown in FIG. 21 can also produce coefficient seed data sets $w_{10}$ through $w_{n9}$ for each class which are to be stored in the information memory bank 135 of the image signal processing section 110 shown in FIG. 1. In this case, the SD signal production circuit 152 can produce the SD signal (525i signal) using the 525p or 1050i signal based on a selected conversion method, and it can also specifically produce coefficient seed data sets that correspond to any one of the first conversion method (for obtaining the 525p signal from the 525i signal at the image signal processing section 110) and the second conversion method (for obtaining the 1050i signal from the 525i signal at the image signal processing section 110).

Although the image signal processing section 110 of FIG. 1 uses a production equation of the Equation (5) in order to produce the coefficient data sets Wi (i=1 to n), the invention is not limited thereto; for example, following Equation (27) or (28) or even a polynomial with a different degree or an equation expressed by other functions may be used.

$$W_1 = w_{10} + w_{11}v + w_{12}h + w_{13}v^2 + w_{14}h^2 + w_{15}v^3 + w_{16}h^3 \quad (27)$$
$$W_2 = w_{20} + w_{21}v + w_{22}h + w_{23}v^2 + w_{24}h^2 + w_{25}v^3 + w_{26}h^3$$
$$\vdots$$
$$W_i = w_{i0} + w_{i1}v + w_{i2}h + w_{i3}v^2 + w_{i4}h^2 + w_{i5}v^3 + w_{i6}h^3$$
$$\vdots$$
$$W_n = w_{n0} + w_{n1}v + w_{n2}h + w_{n3}v^2 + w_{n4}h^2 + w_{n5}v^3 + w_{n6}h^3$$

$$W_1 = w_{10} + w_{11}v + w_{12}h + w_{13}v^2 + w_{14}vh + w_{15}h^2 \quad (28)$$
$$W_2 = w_{20} + w_{21}v + w_{22}h + w_{23}v^2 + w_{24}vh + w_{25}h^2$$
$$\vdots$$
$$W_i = w_{i0} + w_{i1}v + w_{i2}h + w_{i3}v^2 + w_{i4}vh + w_{i5}h^2$$
$$\vdots$$
$$W_n = w_{n0} + w_{n1}v + w_{n2}h + w_{n3}v^2 + w_{n4}vh + w_{n5}h^2$$

Also, although the image signal processing section 110 of FIG. 1 can set the parameters h and v which specify horizontal and vertical resolutions respectively to then adjust the values of these parameters for adjustment of the horizontal and vertical resolutions of an image, the invention is not limited thereto; for example, a parameter z which specifies a degree of noise cancellation (degree of noise reduction) may be provided so that its value can be adjusted to adjust the noise cancellation degree in the image.

In this case, for example, following Equation (29) or (30) may be used as a production equation to produce coefficient data sets Wi (i=1 to n) or even a polynomial with a different degree or an equation which can be expressed by other functions may be used.

$$W_1 = w_{10} + w_{11}z + w_{12}z^2 + w_{13}z^3 \quad (29)$$
$$W_2 = w_{20} + w_{21}z + w_{22}z^2 + w_{23}z^3$$
$$\vdots$$
$$W_i = w_{i0} + w_{i1}z + w_{i2}z^2 + w_{i3}z^3$$
$$\vdots$$
$$W_n = w_{n0} + w_{n1}z + w_{n2}z^2 + w_{n3}z^3$$

$$W_1 = w_{10} + w_{11}z + w_{12}z^2 \quad (30)$$
$$W_2 = w_{20} + w_{21}z + w_{22}z^2$$
$$\vdots$$
$$W_i = w_{i0} + w_{i1}z + w_{i2}z^2$$
$$\vdots$$
$$W_n = w_{n0} + w_{n1}z + w_{n2}z^2$$

The coefficient seed data sets, which are coefficient data sets in the production equation containing the parameter z as mentioned above, can be produced by the coefficient seed data production device 150 shown in FIG. 18 or the coefficient seed data production device 150' shown in FIG. 21 like in a case of producing the coefficient seed data sets, which are coefficient data sets in the production equation containing the above-mentioned parameters h and v.

In this case, the SD signal production circuit 152 receives the parameter z as a control signal, so that a noise adding state into the SD signal is changed step-wise corresponding to a value of this parameter z when the SD signals are produced from the HD signal. By thus varying step-wise the noise adding state into the SD signals to register learning data sets, the coefficient seed data sets can be produced for obtaining continuous noise cancellation degrees.

The following will give some examples of the details of a noise adding method that corresponds to a value of the parameter z.

Figure 22A:
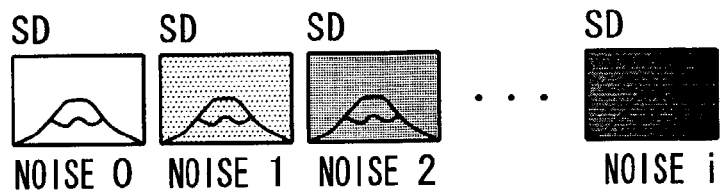
FIGS. 22A–22C are illustrations each for explaining a noise adding method.

For example, as shown in FIG. 22A, by adding into each of the SD signals a noise signal having its step-wise changed amplitude level, the SD signals are produced with their noise level varying step-wise.

Figure 22B:
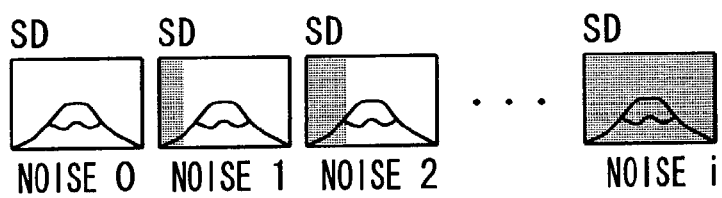

Alternatively, for example, as shown in FIG. 22B, when a noise signal having a constant amplitude level is added to each of the SD signals, a screen region to be added varies step-wise.

Figure 22C:
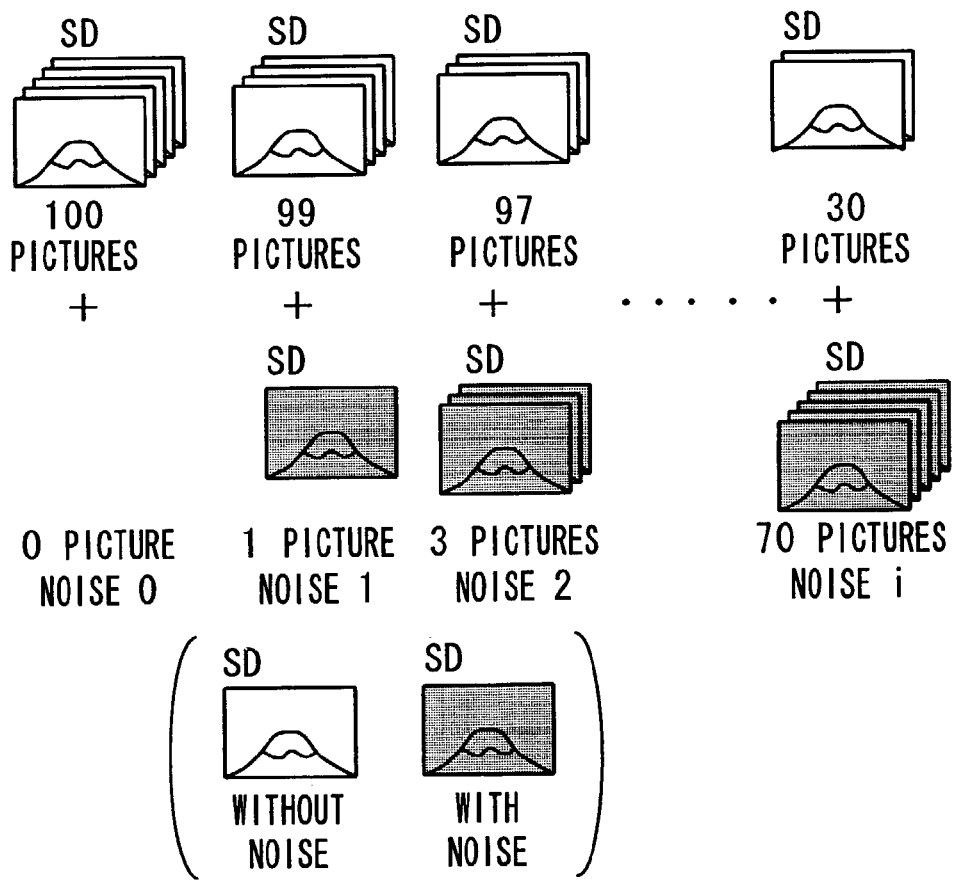

Further, for example, as shown in FIG. 22C, as the SD signal (for one screen) are prepared one that contains no noise and another that contains noise. Then, when a normal equation is produced, a plurality of learning is performed on each of the SD signals.

For example, for "noise 0", learning is performed 100 times on each of the SD signals containing no noise, while for "noise i", learning is performed 30 times on each of the SD signals containing no noise and 70 times on each of the SD signals containing noise. Therefore, "noise i" provides a learning system of calculating the coefficient seed data sets with a higher noise cancellation. By thus varying step-wise the number of times of learning performed on the SD signals containing no noise and that containing noise, coefficient seed data sets for obtaining continuous noise cancellation degrees can be obtained.

Although not described above, this method can be also implemented in a form of addition of normal equations.

First, learning is performed so as to calculate coefficient data sets to be used in the estimation equations for "noise 0" through "noise i". In this case, the above-mentioned Equation (21) is used as the normal equation employed in this calculation. Defining $P_{ij}$ and $Q_j$ to be such as given in following Equations (31) and (32), respectively, the Equation (21) can be changed into following Equation (33).

$$P_{ij} = \sum_p x_{pi} x_{pj} \tag{31}$$

$$Q_j = \sum_p x_{pj} y_p \tag{32}$$

$$\begin{bmatrix} P_{11} & P_{12} & \cdots & P_{1n} \\ P_{21} & P_{22} & \cdots & P_{2n} \\ \vdots & \vdots & \ddots & \vdots \\ P_{n1} & P_{n2} & \cdots & P_{nn} \end{bmatrix} \begin{bmatrix} w_1 \\ w_2 \\ \vdots \\ w_n \end{bmatrix} = \begin{bmatrix} Q_1 \\ Q_2 \\ \vdots \\ Q_n \end{bmatrix} \tag{33}$$

In these equations, $x_{ij}$ indicates the i-th learned value of the SD pixel data sets of the j-th prediction tap position, $y_i$ indicates the i-th learned value of HD pixel data sets, and Wi indicates a coefficient.

Through such learning, the left-hand side member and the right-hand side member of the Equation (33) are defined to be $[P1_{ij}]$ and $[Q1_i]$ respectively in a case where the SD signal containing no noise is learned, while likewise the left-hand member and the right-hand side member of the Equation (33) are defined to be $[P2_{ij}]$ and $[Q2_i]$ respectively in a case where the SD signal containing noise is learned. In such a case, $[P_{aij}]$ and $[Q_{ai}]$ are defined like in following Equations (34) and (35). Herein, the term "a" satisfies a relationship of $0 \leq a \leq 1$.

$$[P_{aij}]=(1-a)[P1_{ij}]+a[P2_{ij}] \tag{34}$$

$$[Q_{ai}]=(1-a)[Q1_i]+a[Q2_i] \tag{35}$$

In this case, a normal equation for a=0 is given by following Equation (36) and equivalent to that for "noise 0" of FIG. 22C, while that for a=0.7 is equivalent to a normal equation for "noise i" of FIG. 22C.

$$[P_{aij}][W_i]=[Q_{ai}] \tag{36}$$

By step-wise varying the value of this "a" to produce a normal equation for each noise level, target coefficient seed data sets can be obtained. In this case, as explained with the coefficient seed data production device 150' of FIG. 21, the normal equation for each noise level is used to calculate coefficient data sets Wi, which is in turn used to obtain coefficient seed data sets.

Also, by combining the normal equations for all of the noise levels, it is possible to produce the normal equation such as the above-mentioned Equation (13) for obtaining coefficient seed data sets. This method is specifically described as follow. Here, such an example is considered as to produce a normal equation for obtaining the coefficient seed data sets using the above-mentioned Equation (30).

SD signals which have noise levels corresponding to some kinds of parameters z are produced beforehand and then learning is performed on the SD signals, so that [P] and [Q] given in the above-mentioned Equations (34) and (35) are prepared, respectively. These are expressed as $[P_{nij}]$ and $[Q_{ni}]$, respectively. Also, the above-mentioned Equation (7) is changed into following Equation (37):

$$t_0=1, t_1=z, t_2=z^2 \tag{37}$$

In this case, the above-mentioned Equations (24) and (25) are changed to following Equations (38) and (39), respectively. By solving following Equation (40) with respect to these equations, the coefficient seed data sets $w_{ij}$ can be obtained. In this case, a variable indicating a total sum of prediction taps is changed to m.

$$X_{ipjq} = \sum_z t_p t_q P_{zij} \tag{38}$$

$$Y_{ip} = \sum_z t_p Q_{zl} \tag{39}$$

$$\begin{bmatrix} X_{1010} & X_{1011} & X_{1012} & X_{1020} & \cdots & X_{10m2} \\ X_{1110} & X_{1111} & X_{1112} & X_{1120} & \cdots & X_{11m2} \\ X_{1210} & X_{1211} & X_{1212} & X_{1220} & \cdots & X_{12m2} \\ X_{2010} & X_{2011} & X_{2012} & X_{2020} & \cdots & X_{20m2} \\ \vdots & \vdots & \vdots & \vdots & \ddots & \vdots \\ X_{m210} & X_{m211} & X_{m212} & X_{m220} & \cdots & X_{m2m2} \end{bmatrix} \begin{bmatrix} w_{10} \\ w_{11} \\ w_{12} \\ w_{10} \\ \vdots \\ w_{m2} \end{bmatrix} \begin{bmatrix} Y_{10} \\ Y_{11} \\ Y_{12} \\ Y_{20} \\ \vdots \\ Y_{m2} \end{bmatrix} \tag{40}$$

Also, although the image signal processing section 110 of FIG. 1 sets the parameters h and v for specifying the horizontal and vertical resolutions respectively and adjusts their values to thereby adjust the horizontal and vertical resolutions of an image, the invention is not limited thereto; for example, both the horizontal and vertical resolutions may be adapted to be adjusted by one parameter in configuration. For example, one parameter r may be set to specify the horizontal and vertical resolutions. In this case, for example, the parameter r is supposed to have a relationship between r=1 and h=1, v=1; between r=2 and h=2, v=2; between r=1 and h=1, v=2; between r=2 and h=2, v=3, . . . . In this case, as a production equation for producing the coefficient data sets Wi (i=1 to n), an r's polynomial etc. is used.

Also, although the image signal processing section 110 of FIG. 1 sets the parameters h and v for specifying the horizontal and vertical resolutions respectively and adjusts their values to thereby adjust the horizontal and vertical resolutions of an image, the invention is not limited thereto; for example, the parameter r for adjusting these horizontal and vertical resolutions and the above-mentioned parameter z for specifying the above-mentioned noise cancellation degree (noise reduction degree) may be set to adjust the values of these parameters r and z, thus adjusting the horizontal and vertical resolutions of an image and the noise cancellation degree in a similar configuration.

In this case, as a production equation for producing coefficient data sets Wi (i=1 to n), for example, following Equation (41) may be used and even a polynomial with a different degree or an equation expressed by other functions may be used for implementation.

$$W_1 = w_{10} + w_{11}r + w_{12}z + w_{13}r^2 + w_{14}rz + w_{15}z^2 + \qquad (41)$$
$$w_{16}r^3 + w_{17}r^2z + w_{18}rz^2 + w_{19}z^3$$
$$W_2 = w_{20} + w_{21}r + w_{22}z + w_{23}r^2 + w_{24}rz + w_{25}z^2 +$$
$$w_{26}r^3 + w_{27}r^2z + w_{28}rz^2 + w_{29}z^3$$
$$\vdots$$
$$W_i = w_{i0} + w_{i1}r + w_{i2}z + w_{i3}r^2 + w_{i4}rz + w_{i5}z^2 +$$
$$w_{i6}r^3 + w_{i7}r^2z + w_{i8}rz^2 + w_{i9}z^3$$
$$\vdots$$
$$W_n = w_{n0} + w_{n1}r + w_{n2}z + w_{n3}r^2 + w_{n4}rz + w_{n5}z^2 +$$
$$w_{n6}r^3 + w_{n7}r^2z + w_{n8}rz^2 + w_{n9}z^3$$

Figure 24:
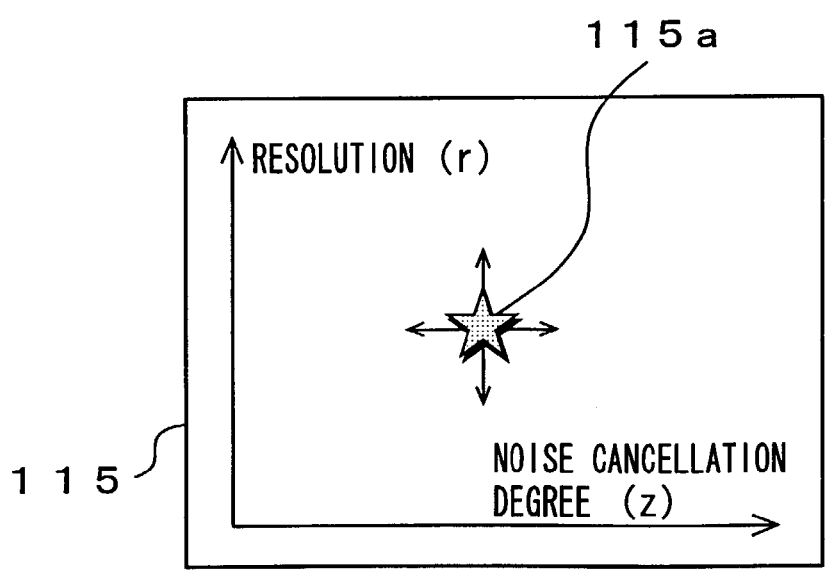
FIG. 24 is an illustration showing one example of the adjustment screen for the parameters r and z.

Thus, a user interface for adjusting the parameters r and z can be also constituted as shown in FIG. 2. The user can operate the joystick 200a to thereby move the position of the icon 115a on the adjustment screen 115, thus arbitrarily adjusting the values of the parameters r and z which specify the resolution and the noise cancellation degree (noise reduction degree), respectively. FIG. 24 shows an expanded part of the adjustment screen 115. When the icon 115a is moved from side to side, the value of the parameter r for determining the resolution can be adjusted, while when it is moved up and down, the value of the parameter z for determining the noise cancellation degree can be adjusted.

The user can easily adjust the parameters r and z with referencing the adjustment screen 115 displayed on the display section 111 (see FIG. 2). Note here that the values of the parameters r and z adjusted by the user may be digitally indicated on the adjustment screen 115.

Thus, the coefficient seed data sets, which are coefficient data sets in the production equation containing the parameters r and z, can be produced by the coefficient seed data production device 150 shown in FIG. 18 or the coefficient seed data production device 150' shown in FIG. 21 like in a case of producing the coefficient seed data sets, which are coefficient data sets in the production equation containing the above-mentioned parameters h and v.

In this case, the SD signal production circuit 152 receives parameters r and z as the control signals, so that when the SD signals are produced from the HD signal, the horizontal and vertical bands of each of the SD signals and the state of adding noise into the SD signals vary step-wise corresponding to the values of these parameters r and z.

Figure 23:
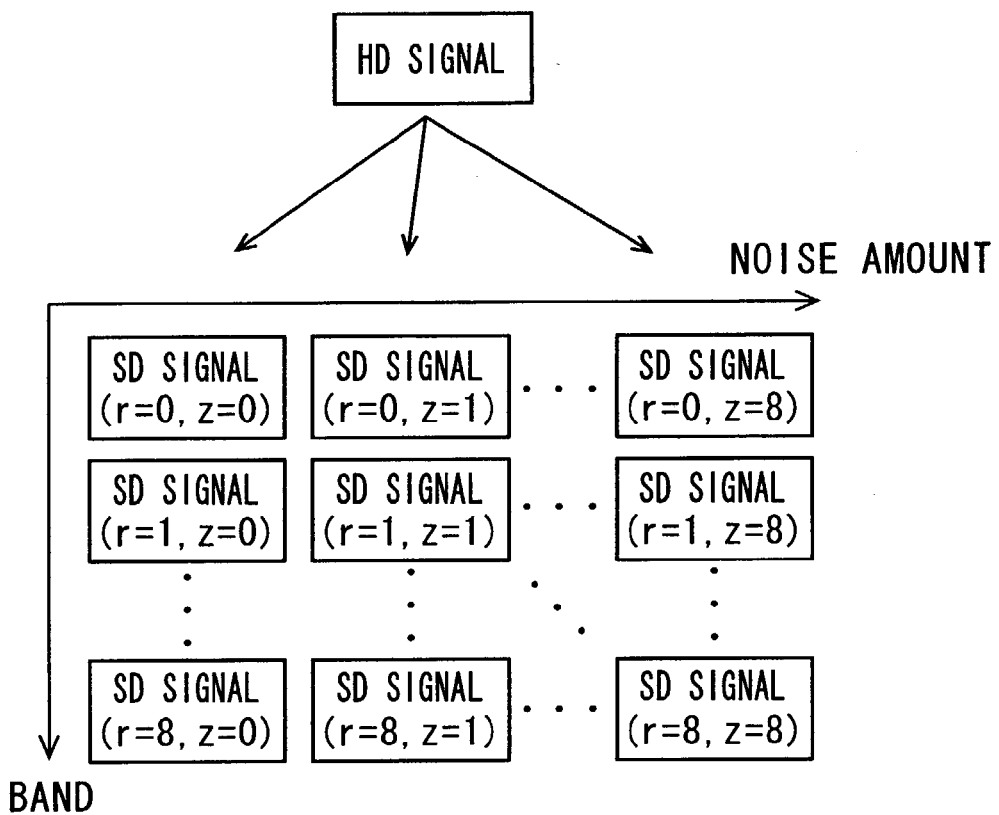
FIG. 23 is an illustration showing an example of producing an SD signal (parameters: r and z)

FIG. 23 shows an example of producing the SD signals each corresponding to the values of the parameters r and z. In this example, the parameters r and z vary in nine steps, respectively, to produce SD signals of total 81 kinds. The parameters r and z may vary in 10 steps or more. In this case, the accuracy is improved for calculating the coefficient seed data sets but the amount of calculations to be performed is increased.

Also, although the image signal processing section 110 of FIG. 1 sets the parameters h and v which specify the horizontal and vertical resolutions respectively and adjusts their values to adjust the horizontal and vertical resolutions of an image, the invention is not limited thereto; for example, the above-mentioned parameter z for specifying the noise cancellation degree (noise reduction degree) may similarly be set, besides these parameters h and v so that the values of these parameters h, v, and z can be adjusted, thereby adjusting the horizontal and vertical resolutions and the noise cancellation degree in configuration.

In this case, as a production equation for producing the coefficient data sets Wi (i=1 to n), for example, following Equation (42) may be used and even a polynomial with a different degree or an equation expressed by other functions may be used for implementation.

$$W_1 = w_{1\_0} + \qquad (42)$$
$$w_{1\_1}v + w_{1\_2}h + w_{1\_3}z +$$
$$w_{1\_4}v^2 + w_{1\_5}h^2 + w_{1\_6}z^2 + w_{1\_7}vh + w_{1\_8}hz + w_{1\_9}zv +$$
$$w_{1\_10}v^3 + w_{1\_11}h^3 + w_{1\_12}z^3 + w_{1\_13}v^2h + w_{1\_14}vh^2 + w_{1\_15}vhz +$$
$$w_{1\_16}vz^2 + w_{1\_17}h^2z + w_{1\_18}hz^2 + w_{1\_19}z^3$$
$$W_2 = w_{2\_0} +$$
$$w_{2\_1}v + w_{2\_2}h + w_{2\_3}z +$$
$$w_{2\_4}v^2 + w_{2\_5}h^2 + w_{2\_6}z^2 + w_{2\_7}vh + w_{2\_8}hz + w_{2\_9}zv +$$
$$w_{2\_10}v^3 + w_{2\_11}h^3 + w_{2\_12}z^3 + w_{2\_13}v^2h + w_{2\_14}vh^2 + w_{2\_15}vhz +$$
$$w_{2\_16}vz^2 + w_{2\_17}h^2z + w_{2\_18}hz^2 + w_{2\_19}z^3$$
$$\vdots$$
$$W_i = w_{i\_0} +$$
$$w_{i\_1}v + w_{i\_2}h + w_{i\_3}z +$$
$$w_{i\_4}v^2 + w_{i\_5}h^2 + w_{i\_6}z^2 + w_{i\_7}vh + w_{i\_8}hz + w_{i\_9}zv +$$
$$w_{i\_10}v^3 + w_{i\_11}h^3 + w_{i\_12}z^3 + w_{i\_13}v^2h + w_{i\_14}vh^2 +$$
$$w_{i\_15}vhz + w_{i\_16}vz^2 + w_{i\_17}h^2z + w_{i\_18}hz^2 + w_{i\_19}z^3$$
$$\vdots$$
$$W_n = w_{n\_0} +$$
$$w_{n\_1}v = w_{n\_2}h + w_{n\_3}z +$$
$$w_{n\_4}v^2 + w_{n\_5}h^2 + w_{n\_6}z^2 + w_{n\_7}vh + w_{n\_8}hz + w_{n\_9}zv +$$
$$w_{n\_10}v^3 + w_{n\_11}h^3 + w_{n\_12}z^3 + w_{n\_13}v^2h + w_{n\_14}vh^2 +$$

-continued
$$w_{n\_15}vhz + w_{n\_16}vz^2 + w_{n\_17}h^2z + w_{n\_18}hz^2 +$$
$$w_{n\_19}z^3$$

Thus, a user interface for adjusting the parameters h, v, and z can also be constituted as shown in FIG. 2. The user can operate the joystick 200a to move the position of the icon 115a on the adjustment screen 115, thus arbitrarily adjusting the values of the parameters h and v which specify the resolutions and of the parameter z that specifies the noise cancellation degree (noise reduction degree).

Figure 26:
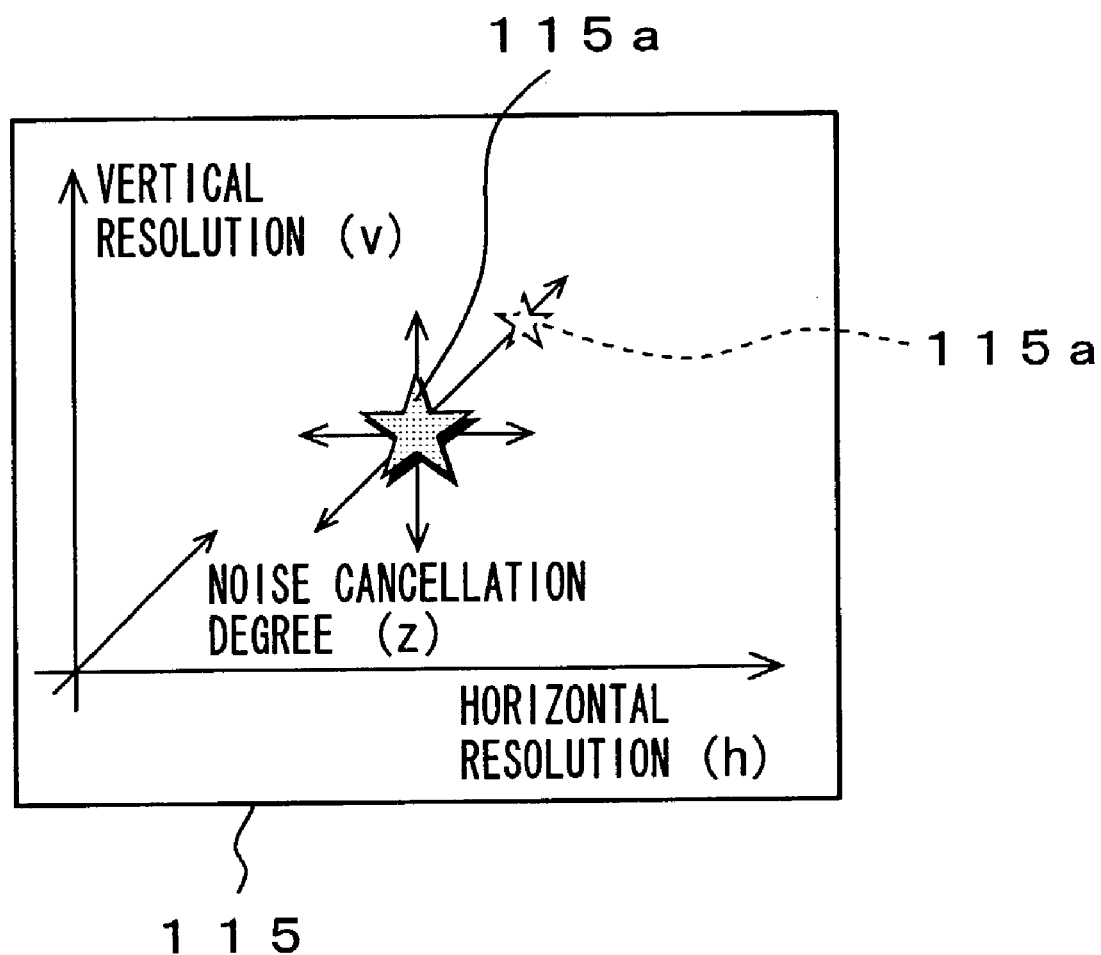
FIG. 26 is an illustration showing one example of the adjustment screen for the parameters h, v, and z.

FIG. 26 shows an expanded part of the adjustment screen 115. When the icon 115a is moved from side to side, the value of the parameter h for deciding the horizontal resolution can be adjusted; when it is moved up and down, the value of the parameter v for deciding the vertical resolution can be adjusted; and when the icon 115a is moved in the depth direction, the parameter z for adjusting the noise cancellation degree can be adjusted. To move the icon 115a in the depth direction, for example, the joystick 200a can be obliquely operated.

In this case, the depth direction can be expressed by changing the size, the color thickness or hue, etc. of the icon 115a. The icon 115a indicated by a broken line is changed in size to indicate that the icon 115a itself indicated by a solid line in the figure has moved in the depth direction.

The user can easily adjust the parameters h, v, and z with referencing the adjustment screen 115 displayed on the display section 111 (see FIG. 2). The values of the parameters h, v, and z adjusted by the user may be digitally indicated on the adjustment screen 115.

Thus, the coefficient seed data sets, which are coefficient data sets in the production equation containing the parameters h, v, and z, can be produced by the coefficient seed data production device 150 shown in FIG. 18 or the coefficient seed data production device 150' shown in FIG. 21 like in a case of producing coefficient seed data sets, which are coefficient data sets in the production equation containing the above-mentioned parameters h and v.

In this case, the SD signal production circuit 152 receives the parameters h, v, and z as the control signals, so that when the SD signals are produced from the HD signal, the horizontal and vertical bands of each of the SD signals and the state of adding noise into the SD signals vary step-wise corresponding to the values of these parameters h, v, and z.

Figure 25:
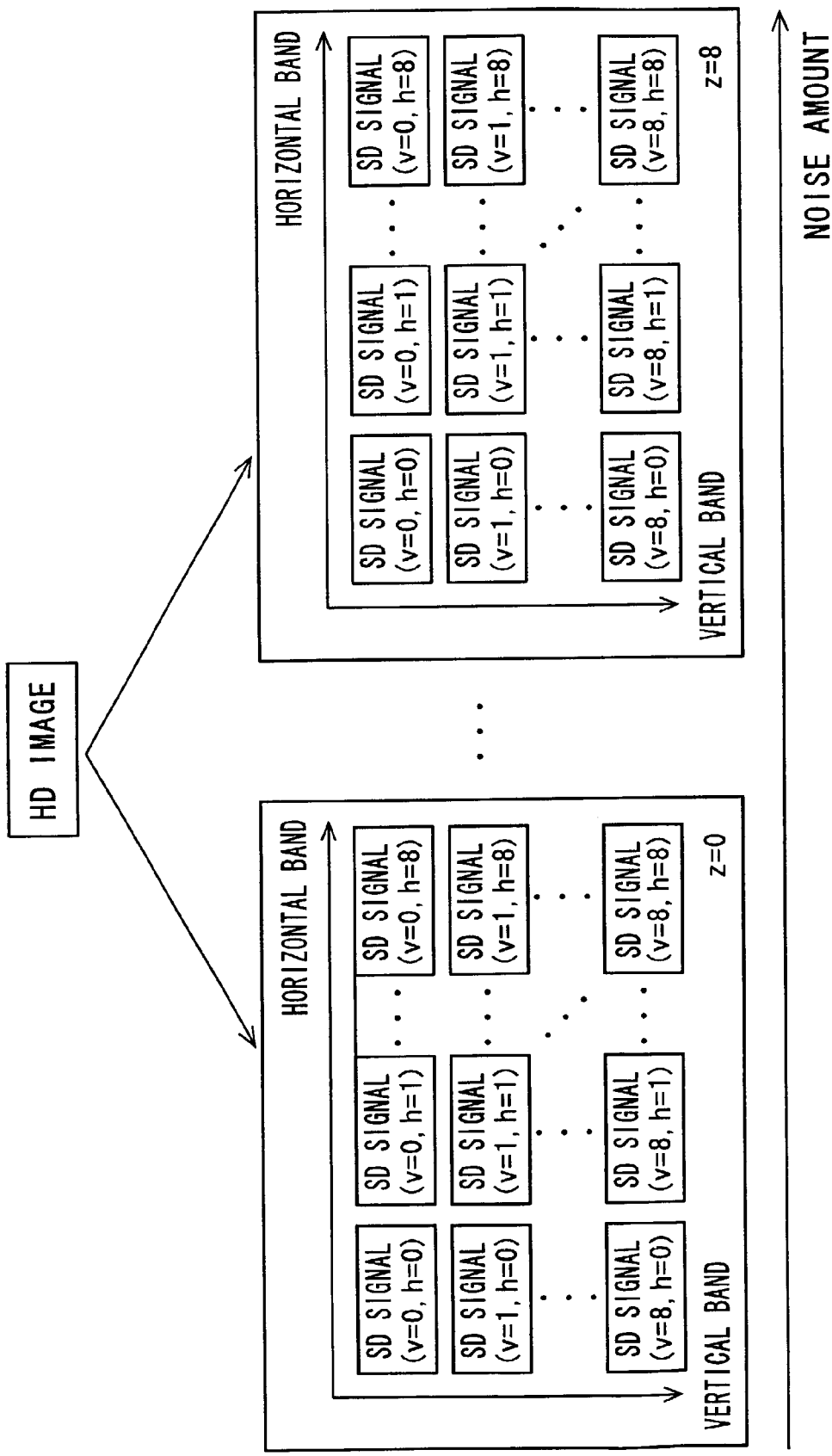
FIG. 25 is an illustration showing an example of producing the SD signal (parameters: h, v, and z)

FIG. 25 shows an example of producing the SD signals each corresponding to the values of the parameters h, v, and z. In this example, the parameters h, v, and z vary in nine steps, respectively, to produce SD signals of total 729 kinds. The parameters h, v, and z may vary in 10 steps or more. In this case, the accuracy is improved for calculating the coefficient seed data sets but the amount of calculations to be performed is increased.

Figure 27:
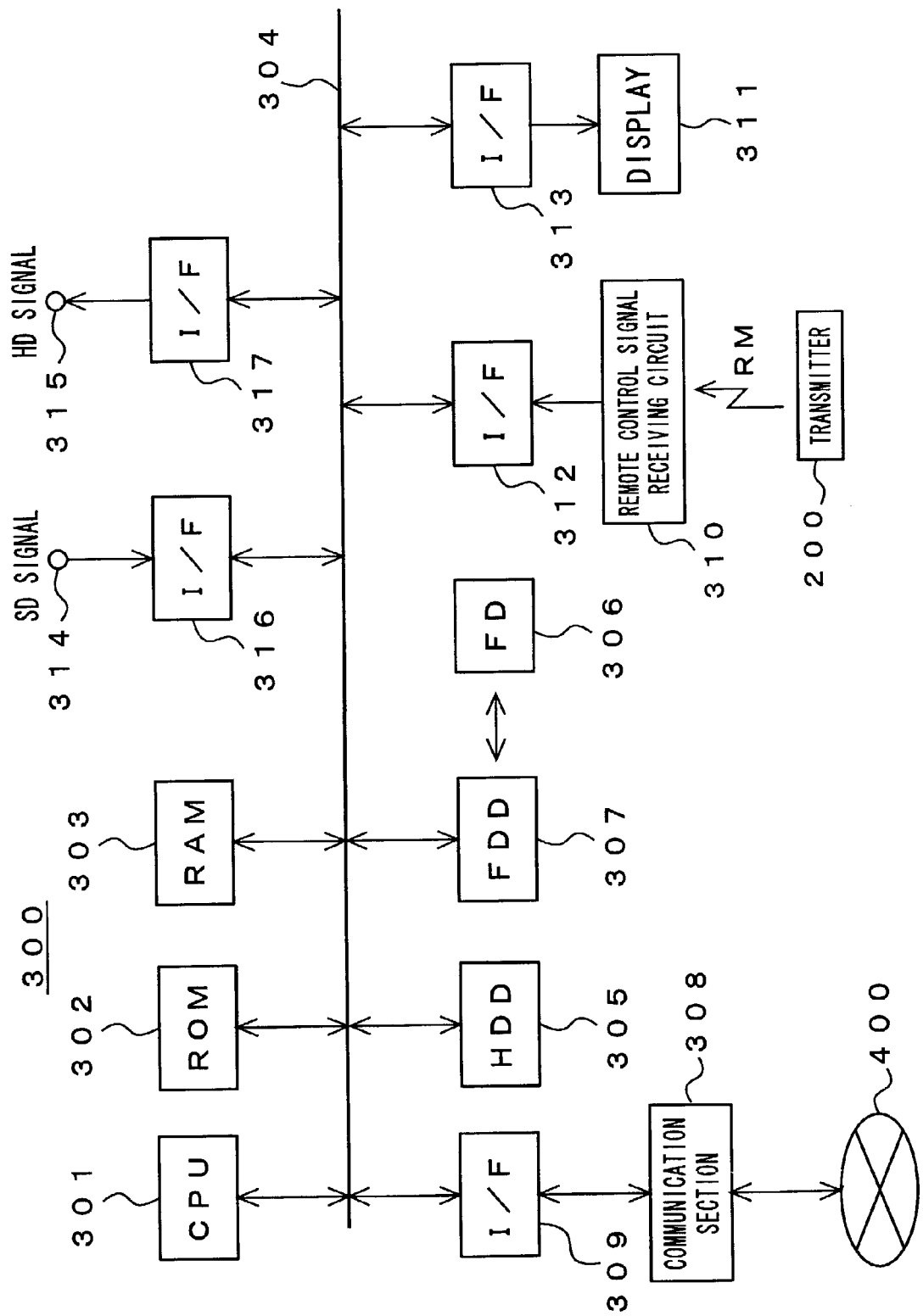
FIG. 27 is a block diagram showing a configuration example of an image signal processor for software-wise implementation.

Alternatively, the processing performed at the image signal processing section 110 of FIG. 1 may be carried out software-wise by, for example, an image signal processor 300 shown in FIG. 27.

First, the image signal processor 300 shown in FIG. 27 will be described. This image signal processor 300 comprises a CPU 301 for controlling the operations of the apparatus as a whole, a ROM (Read Only Memory) 302 for storing operation programs of this CPU 301, coefficient seed data sets, etc., and a RAM (Random Access Memory) 303 constituting a work area for the CPU 301. These CPU 301, ROM 302, and RAM 303 are all connected to a bus 304.

Also, the image signal processor 300 comprises a hard disk drive (HDD) 305 and a flexible disk (herein after called floppy disk) drive (FDD) 307 for driving a floppy disk 306, which are used as an external memory. These drives 305 and 307 are both connected to the bus 304.

Also, the image signal processor 300 comprises a communication section 308 for connecting to a communication network 400 such as the Internet through either wired transmission or wireless transmission. This communication section 308 is connected to the bus 304 via an interface 309.

Also, the image signal processor 300 comprises a user interface section. This user interface section has a remote control signal receiving circuit 310 for receiving a remote control signal RM from a remote control transmitter 200, and a display 311 consisting of an Liquid Crystal Display (LCD) and the like. The remote control signal receiving circuit 310 is connected via an interface 312 to the bus 304 and, similarly, the display 311 is connected via an interface 313 to the bus 304.

Also, the image signal processor 300 comprises an input terminal 314 for receiving the SD signal, and an output terminal 315 for transmitting the HD signal. The input terminal 314 is connected via an interface 316 to the bus 304 and, similarly, the output terminal 315 is connected via an interface 317 to the bus 304.

Instead of storing the processing programs, the coefficient seed data sets, etc. in the ROM 302 beforehand as mentioned above, for example, they may be downloaded via the communication section 308 from the communication network 400 such as the Internet, and accumulated on the hard disk or in the RAM 303 for use. Also, these processing programs, the coefficient seed data sets, etc. may be provided on the floppy disk 306.

Also, instead of inputting the SD signal to be processed through the input terminal 314, the SD signal may be recorded on the hard disk beforehand or downloaded via the communication section 308 from the communication network 400 such as the Internet. Also, instead of transmitting processed HD signal through the output terminal 315 or concurrent with this, an image of the processed HD signal may be supplied to the display 311 to be displayed thereon, the processed HD signal may be stored on the hard disk or it may be sent via the communication section 308 to the communication network 400 such as the internet.

Figure 28:
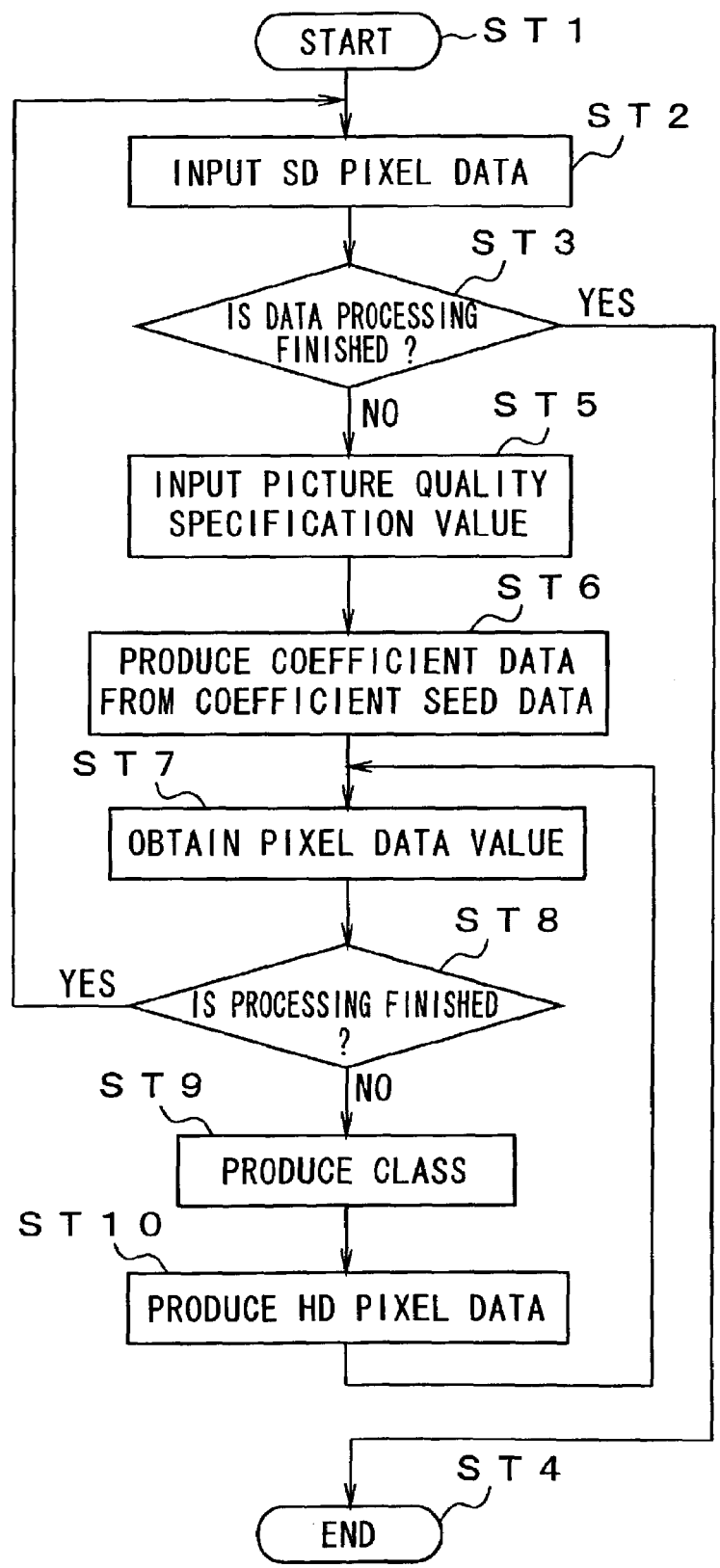
FIG. 28 is a flowchart for showing a procedure for processing an image signal.

The following will describe a processing procedure for obtaining HD signal from SD signal at the image signal processor 300 shown in FIG. 27 with reference to a flow-chart of FIG. 28.

First, the processing starts at step ST1 and, at step ST2, SD pixel data sets are input in units of a frame or a field. If the SD pixel data sets are input through the input terminal 314, then the RAM 303 temporarily stores the SD pixel data sets. Also, if the SD pixel sets are recorded on a hard disk, then the SD pixel data sets are read out of the hard disk drive 305 and the RAM 303 temporarily stores them. At step ST3 then, it is judged whether or not the processing of the input SD pixel data sets in all the frames or fields is finished. If it is finished, then the process finishes at step ST4. Contrarily, if it is not finished, then the procedure goes to step ST5.

At step ST5, a picture quality specification value (for example, a value of the parameter h or v) input by the user under the control of the remote control transmitter 200 is read out of the RAM 303, for example. At step ST6 then, the coefficient data sets Wi to be used in the estimation equation (see the Equation (4)) for each class are produced according to a production equation (see the Equation (5)) using thus read picture quality specification value and the coefficient seed data sets for each class.

Next, at step ST7, based on the SD pixel data sets input at step ST2, pixel data sets of class taps and prediction taps corresponding to each HD pixel data set to be produced are obtained. At step ST8 then, it is judged whether or not the processing of obtaining the HD pixel data sets in all the regions of the input SD pixel data sets is finished. If it is finished, then the procedure returns to step ST2, thus shifting to the processing of inputting SD pixel data set of the next frame or field. On the other hand, if it is not finished, then the procedure goes to step ST9.

At step ST9, a class code CL is produced from the SD pixel data sets of the class taps obtained at step ST7. At step ST10 then, the HD pixel data sets are produced according to the estimation equation using the coefficient data sets corresponding to that class code CL and the SD pixel data sets of the prediction taps, and then the procedure returns to step ST7 wherein the above-mentioned processing is repeated.

Thus, the processing along the flowchart shown in FIG. 28 is performed to process the SD pixel data sets that constitute the input SD signal, so that HD pixel data sets that constitute the HD signal sets can be obtained. As mentioned above, the HD signal thus processed and obtained is transmitted through the output terminal 315 or supplied to the display 311 that displays an image thereon or even supplied to the hard disk drive 305 that records them on a hard disk.

Also, the processing at the coefficient seed data production device 150 of FIG. 18 can be carried out software-wise by a processing apparatus, not shown.

Figure 29:
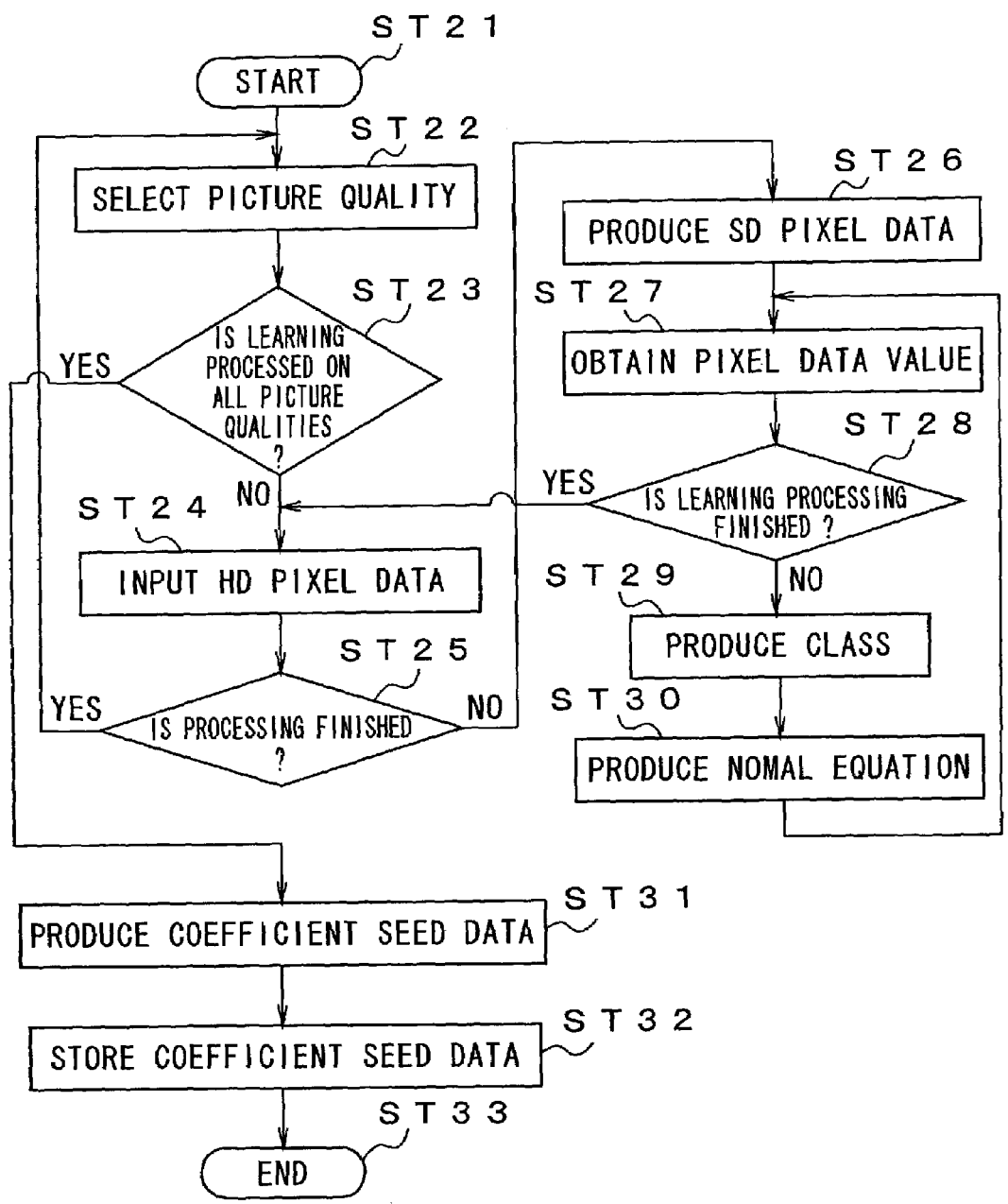
FIG. 29 is a flowchart for showing coefficient seed data production processing (part 1)

The following will describe a processing procedure for producing coefficient seed data sets with reference to a flowchart of FIG. 29.

First, the procedure starts at step ST21 and, at step ST22, a picture quality pattern (which is identified by, for example, the parameters h and v) to be used in learning is selected. At step ST23 then, it is judged whether or not the learning on all the picture quality patterns is finished. If learning on all of them is not finished, the procedure goes to step ST24.

At step ST24, already known HD pixel data sets are input in units of a frame or field. At step ST25 then, it is judged whether or not the processing on all the HD pixel data sets is finished. If it is finished, then the procedure returns to step ST22 wherein the next picture quality pattern is selected and then the above-mentioned processing is repeated. If it is not finished yet, the procedure goes to step ST26.

At step ST26, SD pixel data sets are produced from the HD pixel data sets input at step ST24 on the basis of the picture quality pattern selected at ST22. At step ST27, pixel data sets of class taps and prediction taps are obtained in correspondence to each HD pixel data set input at the step ST24 on the basis of the SD pixel data sets produced at step ST26. At step ST28 then, it is judged whether or not the learning processing on all the regions of the produced SD pixel data sets is finished. If it is finished, then the procedure returns to step ST24 wherein the above-mentioned processing is repeated after the next HD pixel data sets are input, while it is not finished yet, then the procedure goes to step ST29.

At step ST29, a class code CL is produced from the SD pixel data sets of the class taps obtained at step ST27. At step ST30 then, a normal equation (see the Equation (13)) is produced. Then, the procedure returns to step ST27.

Also, if it decides at step ST23 that the learning on all the picture quality patterns is finished, the procedure goes to step ST31. At step ST31, the normal equation is solved according to the sweeping method etc. to calculate the coefficient seed data sets for each class and, at step ST32, the coefficient seed data sets are stored in a memory and then, at step ST33, the processing ends.

Thus, the processing is performed along the flowchart shown in FIG. 29 so that the coefficient seed data sets for each class can be obtained using the same method as that by the coefficient seed data production device 150 shown in FIG. 18.

Also, the processing by the coefficient seed data production device 150' of FIG. 21 can also be carried out software-wise by a processing apparatus, not shown.

Figure 30:
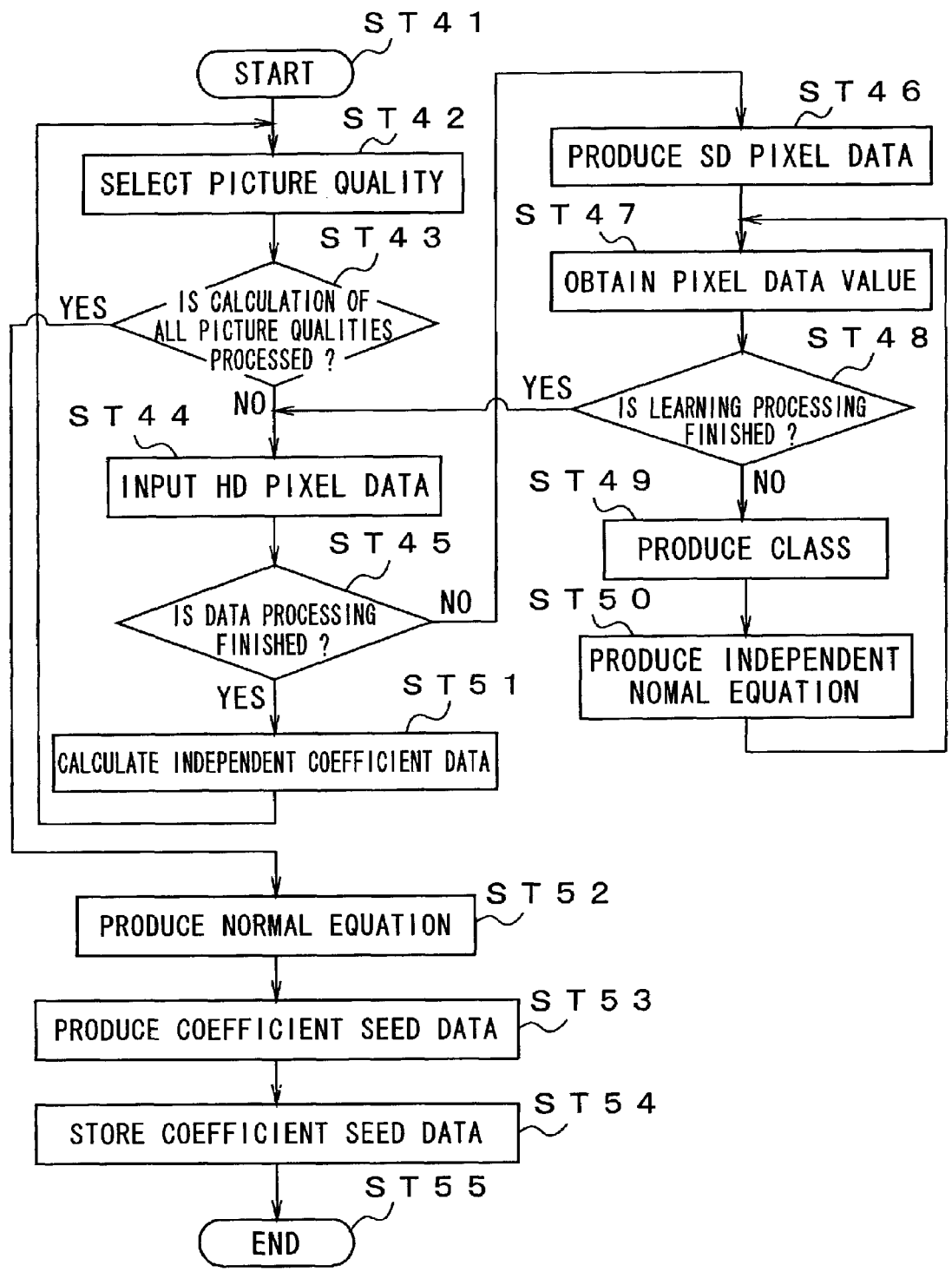
FIG. 30 is a flowchart for showing the coefficient seed data production processing (part 2)

The following will describe a processing procedure for producing coefficient seed data sets with reference to a flowchart of FIG. 30.

First, the procedure starts at step ST41 and, at step ST42, a picture quality pattern (which is identified by, for example, the parameters h and v) to be used in learning is selected. At step ST43 then, it is judged whether the processing for calculating all the picture quality patterns is finished. If it is not finished, the procedure goes to step ST44.

At step ST44, already known HD pixel data sets are input in units of a frame or field. At step ST45 then, it is judged whether the processing on all the HD pixel data sets is finished. If it is not finished, the procedure goes to step ST46 wherein the SD pixel data sets are produced from the HD pixel data sets input at step ST44 on the basis of the picture quality pattern selected at step ST42.

At step ST47, pixel data sets of the class taps and the prediction taps corresponding to each HD pixel data set input at step ST44 are obtained from the SD pixel data sets produced at step ST46. At step ST48 then, it is judged whether the learning processing on all the regions of the produced SD pixel data sets is finished. If it is finished, the procedure returns to step ST44 wherein the above-mentioned processing is repeated after the next HD pixel data sets are input, while it is not finished yet, the procedure goes to step ST49.

At step ST49, a class code CL is produced from the SD pixel data sets of the class tap obtained at step ST47. At step ST50 then, a normal equation (see the Equation (21)) for obtaining coefficient data sets is produced. Then, the procedure returns to step ST47.

Also, if it decides at step ST45 that the processing on all the pixel data sets is finished, then the procedure goes to step ST51 wherein the normal equation produced at step ST50 is solved using the sweeping method etc. in order to calculate the coefficient data sets for each class. Then, the procedure returns to step ST42 wherein the next picture quality pattern is selected, and then the above described processing is repeated to obtain the coefficient data sets for each class that correspond to this next picture quality pattern.

Also, if it decides at step ST43 that the coefficient data sets for all the picture quality patterns are calculated, the procedure goes to step ST52. At step ST52, a normal equation (see the Equation (26)) for obtaining the coefficient seed data sets is produced from the coefficient data sets on all the picture quality patterns.

Then, at step ST53, the normal equation produced at step ST52 is solved using the sweeping method etc., to calculate the coefficient seed data sets for each class and, at step ST54, the coefficient seed data sets are stored in the memory and then, at step ST55, the processing ends.

Thus, the processing is performed along the flowchart shown in FIG. 30, so that the coefficient seed data sets for each class can be obtained using the same method as that by the coefficient seed data production device 150' shown in FIG. 21.

The following will describe another embodiment of the invention. FIG. 31 shows a configuration of a TV receiver 100A according to another embodiment. This TV receiver 100A receives a 525i signal as an SD signal from a broadcast signal to then convert this 525i signal into a 525p or 1050i signal as an HD signal, thus displaying an image based on this 525p or 1050i signal. In FIGS. 31 and 1, the corresponding components are indicated by the same reference symbols.

The TV receiver 100A is the same as the TV receiver 100 shown in FIG. 1 except that the image signal processing section 110 is replaced by an image signal processing section 110A. The TV receiver 100A performs almost the same operations as the TV receiver 100 does.

The detailed image signal processing section 110A will be described as follows. In this image signal processing section 110A, the components corresponding to the ones of the image signal processing section 110 shown in FIG. 1 are indicated by the same reference symbols and their detailed explanation is omitted.

The image signal processing section 110A includes an information memory bank 135A. The information memory bank 135A accumulates therein beforehand operation specification information to be stored in the register 130 and tap position information to be stored in the registers 131–133 like the information memory bank 135 in the image signal processing section 110 shown in FIG. 1. Further, this information memory bank 135A accumulates therein beforehand coefficient seed data sets that correspond to the first conversion method (525p) and the second conversion method (1050i), respectively. The coefficient seed data sets are coefficient data sets in a production equation for producing coefficient data sets to be stored in the coefficient memory 134.

The estimation/prediction calculation circuit 127 calculates HD pixel data sets y to be produced, according to the estimation equation of the Equation (4) based on the data sets (SD pixel data sets) xi of the prediction tap and the coefficient data sets Wi read out of the coefficient memory 134. In this embodiment, the coefficient data sets $W_i$ (i=1 to n) to be used in this estimation equation are produced according to a production equation containing a parameter c, as following Equation (43).

$$W_i = w_{i0} + w_{i1}c + w_{i2}c^2 + w_{i3}c^3 \quad (43)$$

This parameter c corresponds to a class code CL transmitted from the class synthesis circuit 126. The information memory bank 135A stores therein for each conversion method the coefficient seed data sets wi0 through wi3, which are coefficient data sets in this production equation. How to produce the coefficient seed data sets will be described later.

Also, in the image signal processing section 110A, the system controller 101 supplies a parameter P to the space class detection circuit 124 and the class synthesis circuit 126. This parameter P indicates the number of re-quantization bits.

The class synthesis circuit 126 calculates a re-quantization code qi used as class information of the space class in the calculation of the above-mentioned Equation (1) and the class synthesis circuit 126 obtains the class code CL in the calculation of the Equation (3), wherein a value of the parameter P is used as the number of re-quantization bits in the Equations (1) and (3). The value of this parameter P can be changed by the user's operations; for example, the value of P can be 1, 2, or 3.

Thus, by changing the value of the parameter P, the degree of fineness of class grouping indicated by the class code CL can be changed. If, for example, P=1, the class grouping fineness degree is 26; if P=2, it is $(2^2)^6=2^{12}$; and if P=3, it is $(2^3)^6=2^{18}$. The value of the class code CL obtained by calculations is divided by $(2^{P-1})^6$ when the Equation (3) is calculated by the class synthesis circuit 126 so that the class code CL can be unchanged in range even if the value of the parameter P is changed.

Also, the image signal processing section 110A includes a coefficient production circuit 136A for producing the coefficient data sets Wi (i=1 to n) to be used in an estimation equation for each class according to the Equation (43) using coefficient seed data sets $w_{i0}$ through $w_{i3}$ and a value of the parameter P. To this coefficient production circuit 136A, the coefficient seed data sets $W_{i0}$ through $W_{i3}$ that correspond to the first or second conversion method are loaded, according to the above-mentioned conversion method selection information, from the information memory bank 135A. Also, this coefficient production circuit 136A receives a value of the parameter P from the system controller 101.

At this coefficient production circuit 136A, a value of a class (a value of the class code CL) from which coefficient data sets Wi are to be obtained can be known from the value of the parameter P. If, for example, P=1, the values of 64 classes from which the coefficient data sets Wi are to be obtained can be known, so that by substituting these values into c in the Equation (43), the coefficient data sets Wi for these 64 classes can be obtained. Similarly, the coefficient data sets Wi can be obtained for P=2 and P=3 respectively. Even if the coefficient seed data sets stored beforehand in the information memory bank 135A are learned by 64 classes for P=1, by inputting P=2 or P=3, the coefficient data sets Wi can be obtained when the 64-class grouping can be changed to $(2^2)^6$ and $(2^3)^6$ groupings respectively. Specifically, by inputting P=2 or P=3, coefficient data sets for the $(2^2)^6$ classes or the $(2^3)^6$ classes are produced from the 64-class coefficient data sets.

The coefficient data sets Wi (i=1 to n) for each class produced by this coefficient production circuit 136A are stored in the coefficient memory 134. The coefficient data sets Wi for each class are specifically produced by the coefficient production circuit 136A in, for example, each vertical blanking period. With this, even when the user changes a value of the parameter P under the control of the remote control transmitter 200, the class-specific coefficient data sets Wi stored in the coefficient memory 134 can be changed immediately in correspondence to thus changed value of the parameter P, thus permitting the user to adjust the resolution smoothly.

The image signal processing section 110A has the same configuration as the image signal processing section 110 of FIG. 1 except for the above.

The following will describe the operations of the image signal processing section 110A.

Based on the SD signal (525i signal) stored in the buffer memory 109, the second tap selection circuit 122 selectively extracts data sets (SD pixel data sets) of a space class tap. In this case, the second tap selection circuit 122 selects a tap based on tap position information, which is supplied from the register 132, corresponding to a user-selected conversion method and a motion class detected by the motion class detection circuit 125.

Data sets (SD pixel data sets) of the space class tap extracted selectively by the second tap selection circuit 122 are supplied to the space class detection circuit 124. This space class detection circuit 124, in turn, performs ADRC processing on each of the SD pixel data sets given as the data sets of the space class tap to obtain the re-quantization code qi as class information of the space class (class grouping mainly for indicating of a waveform in the space)(see the Equation (1)).

Also, based on the SD signal (525i signal) stored in the buffer memory 109, the third tap selection circuit 123 selectively extracts data sets (SD pixel data sets) of a motion class tap. In this case, the third tap selection circuit 123 selects a tap based on tap position information, which is supplied from the register 133, corresponding to a user-selected conversion method.

The data sets (SD pixel data sets) of the motion class tap extracted selectively by the third tap selection circuit 123 are supplied to the motion class detection circuit 125. This motion class detection circuit 125, in turn, obtains motion information MV of a motion class (class grouping mainly for indicating a degree of motion) from each of the SD pixel data sets given as data sets of the motion class tap.

This motion information MV and the above-mentioned re-quantization code qi are supplied to the class synthesis circuit 126. This class synthesis circuit 126 in turn obtains a class code CL that indicates a class including pixel data set (pixel data set of an objective position) of the HD signal (525p or 1050i signal) to be produced based on this motion information MV and the re-quantization code qi (see the Equation (3)). This class code CL is then supplied as read-out address information to the coefficient memory 134 and the normalization coefficient memory 138.

During each vertical blanking period, for example, the coefficient production circuit 136A produces the coefficient data sets Wi (i=1 to n) to be used in the estimation equation, for each class, that correspond to a value of the parameter P adjusted by the user, and the coefficient memory 134 stores them therein. Also, the normalization coefficient production circuit 137 produces the normalized coefficient S corresponding to class-specific coefficient data sets Wi (i=1 to n) produced by the coefficient production circuit 136A, and the normalization coefficient memory 138 stores the normalized coefficient S therein.

As mentioned above, the coefficient memory 134 receives the class code CL as read-out address information, so that the coefficient data sets Wi corresponding to the class code CL are read out of this coefficient memory 134 and the coefficient data sets Wi are supplied to the estimation/prediction calculation circuit 127. Also, based on the SD signal (525i signal) stored in the buffer memory 109, the first tap selection circuit 121 selectively extracts the data sets (SD pixel data sets) of the prediction tap. In this case, the first tap selection circuit 121 selects a tap based on tap position information, which is supplied from the register 131, corresponding to a user-selected conversion method. The data sets (SD pixel data sets) xi of the prediction tap extracted selectively by this first tap selection circuit 121 are supplied to the estimation/prediction calculation circuit 127.

The estimation/prediction calculation circuit 127 calculates the pixel data sets of the HD signal to be produced, that is, each of the pixel data sets (HD pixel data sets) y of the objective position based on the data sets (SD pixel data sets) xi of the prediction tap and the coefficient data sets Wi read out of the coefficient memory 134 (see the Equation (4)). In this case, the data sets of four pixels constituting the HD signal are produced simultaneously.

Thus, if the first conversion method for transmitting the 525p signal is selected, line data sets L1 at the same position as that of line of the 525i signal and line data sets L2 at the intermediate position between the upper and lower lines of the 525i signal are produced in the odd-number (o) and even-number (e) fields (see FIG. 4). On the other hand, if the second conversion method for transmitting the 1050i signal is selected, line data sets L1 and L1' near the line of the 525i signal and line data sets L2 and L2' remote from the line of the 525i signal are produced in the odd-number (o) and even-number (e) fields (see FIG. 5).

Thus, the line data sets L1 and L2 (L1' and L2') produced by the estimation/prediction calculation circuit 127 are supplied to the normalization calculation circuit 128. The normalization coefficient memory 138 receives the class code CL as read-out address information as mentioned above, so that the normalized coefficient S that corresponds to the class code CL, that is, the normalized coefficient S that corresponds to the coefficient data sets Wi (i=1 to n) used in production of each of the HD pixel data sets y constituting the line data sets L1 and L2 (L1' and L2') transmitted from the estimationlprediction calculation circuit 127, is read out of this normalization coefficient memory 138 and then the normalized coefficient S is supplied to the normalization calculation circuit 128. At the normalization calculation circuit 128, each of the HD pixel data sets y constituting the line data sets L1 and L2 (L1' and L2') received from the estimation/prediction calculation circuit 127 is divided by the respective normalized coefficient S corresponding thereto so that it is normalized. Level fluctuations are thus removed in the informational data set of an objective position, which are caused by a rounding error occurred when the coefficient data sets to be used in the estimation equation (see the Equation (4)) are obtained according to the production equation (see the Equation (43)) using the coefficient seed data sets.

The line data sets L1 and L2 (L1' and L2') thus normalized by the normalization calculation circuit 128 are supplied to the linear-sequential conversion circuit 129. This linear-sequential conversion circuit 129 in turn performs the linear-sequence on these line data sets L1 and L2 (L1' and L2') to produce HD signal. In this case, the linear-sequential conversion circuit 129 operates according to operation instruction information, which is supplied from the register 130, corresponding to a conversion method selected by the user. Therefore, if the user selects the first conversion method (525p), the linear-sequential conversion circuit 129 transmits the 525p signal. On the other hand, if the user selects the second conversion method (1050i), the linear-sequential conversion circuit 129 transmits the 1050i signal.

As mentioned above, the coefficient production circuit 136A produces the coefficient data sets Wi (i=1 to n) to be used in the estimation equation for each class using the coefficient seed data sets $w_{i0}$ through $w_{i3}$ loaded from the information memory bank 135A, and the coefficient data sets $W_i$ are stored in the coefficient memory 134. In this configuration, the coefficient data sets Wi (i=1 to n) thus read out in correspondence to the class code CL from this coefficient memory 134 are used to calculate the HD pixel data sets y at the estimation/prediction calculation circuit 127.

Thus, in the image signal processing section 110A, the coefficient production circuit 136A produces the coefficient data sets Wi for each class according to the production equation of the Equation (43) using the coefficient seed data sets $w_{i0}$ through $w_{i3}$ stored in the information memory bank 135A. Even if many classes are to be grouped, therefore, it is unnecessary to have a memory to store large number of coefficient data sets, thus saving on the storage capacity of the memory.

Also, typically, the finer the class grouping, the more the picture quality by the HD signal can be improved. Depending on the fineness degree of class grouping in learning, however, even if it is high, a certain SD signal such as a motion picture, a still picture, and an animation picture, in some cases, may deteriorate its output quality, rather than improving the picture quality by the HD signal. The above-mentioned image signal processing section 110A has such a configuration as to input a value of the parameter P deciding the fineness degree of class grouping, thereby permitting the user to adjust the value of the parameter P to optimally adjust the picture quality by the HD signal.

Although the TV receiver 100A shown in FIG. 31 permits the user to set the value of the parameter P, the invention is not limited thereto; for example, the value of the parameter P may be adapted to be automatically changed according to a predetermined characteristic amount (for discriminating among a motion picture, a still picture, an animation picture, etc.) detected from the SD signal. Also, for example, the value of the parameter P may be adapted to be automatically changed on the basis of information indicative of that value extracted from the SD signal to which this information is added.

Also, although in the TV receiver 100A shown in FIG. 31, coefficient data sets Wi for each class produced at the coefficient production circuit 136A are stored in the coefficient memory 134 so that such the coefficient data sets Wi each corresponding to the class code CL transmitted from the class synthesis circuit 126 may be read out of this coefficient memory 134 and used, the invention is not limited thereto; for example, such the coefficient data sets Wi corresponding to the class code CL transmitted from the class synthesis circuit 126 may be produced as required at the coefficient synthesis circuit 136A and they are used in the estimation/prediction calculation circuit 127. In this case, the coefficient memory 134 is unnecessary. Also, there is no need to supply the parameter P to the coefficient production circuit 136A.

The following will describe how to produce coefficient seed data sets $w_{i0}$ through $w_{i3}$ to be stored in the information memory bank 135A. FIG. 32 shows a configuration of the coefficient seed data production device 150A for producing coefficient seed data sets $w_{i0}$ through $w_{i3}$. In FIGS. 32 and 21, the corresponding components are indicated by the same reference numerals and their detailed explanation is omitted.

First, a concept of this example of production will be described with reference to FIG. 33. A plurality of SD signals is produced from an HD signal. Then, learning is performed between these SD signals and the HD signal so that the coefficient data sets Wi to be used in the estimation equation of the Equation (4) are produced for each class. Then, the coefficient seed data sets $w_{i0}$ through $w_{i3}$ are produced using thus produced class-specific coefficient data sets Wi.

As shown in FIG. 32 again, the coefficient seed data production device 150A includes a normal equation production section 171A for producing the normal equation (see the Equation (21)) for obtaining the coefficient data sets Wi (i=1 to n) for each class based on each of the HD pixel data sets y given as pixel data set of an objective position obtained from the HD signal received at the input terminal 151, the data sets (SD pixel data sets) xi of the prediction tap selectively extracted by the first tap selection circuit 153 in respective correspondence to each of the HD pixel data sets y thus obtained, and the class code CL received from the class synthesis circuit 159 in respective correspondence to each of the HD pixel data sets y thus obtained.

Also, the coefficient seed data production device 150A includes a coefficient data decision section 172A for receiving data sets of the normal equation produced by the normal equation production section 171A to then solve this normal equation, and obtaining the coefficient data sets Wi for each class, and a normal equation production section 173A for producing a normal equation for obtaining coefficient seed data sets $w_{i0}$ through $w_{i3}$ using the class-specific coefficient data sets Wi.

Also, the coefficient seed data production device 150A including a coefficient seed data decision section 174A for receiving data sets of the normal equation produced by the normal equation production section 173A to then solve the normal equation, and obtaining coefficient seed data sets $w_{i0}$ through $w_{i3}$, and a coefficient seed memory 162A for storing thus obtained coefficient seed data sets $w_{i0}$ through $w_{i3}$.

The other components of the coefficient seed data production device 150A shown in FIG. 32 are constituted like those of the coefficient seed data production device 150' shown in FIG. 21.

The following will describe the operations of the coefficient seed data production device 150A. At the input terminal 151 an HD signal (525p or 1050i signal) is supplied as a teacher signal. The HD signal is then subjected to the thinning-out processing horizontally and vertically at the SD signal production circuit 152, thus producing SD signal (525i signal) as an input signal.

In this case, if the first conversion method (for obtaining the 525p signal from the 525i signal by the image signal processing section 110 shown in FIG. 31) is selected, the SD signal production circuit 152 performs thinning-out processing on the 525p signal to produce the SD signal. On the other hand, if the second conversion method (for obtaining the 1050i signal from the 525i signal by the image signal processing section 110 shown in FIG. 31) is selected, the SD signal production circuit 152 performs thinning-out processing on the 1050i signal to produce the SD signal.

Based on the SD signal (525i signal), the second tap selection circuit 154 selectively extracts the data sets (SD pixel data sets) of the space class tap located on a periphery of an objective position in the HD signal (525p or 1050i signal). This second tap selection circuit 154 selects a tap based on tap position information, which is supplied from the tap selection control circuit 156, corresponding to the selected conversion method and the motion class detected by the motion class detection circuit 158.

The data sets (SD pixel data sets) of the space class tap selectively extracted by this second tap selection circuit 154 are supplied to the space class detection circuit 157. This space class detection circuit 157 performs ADRC processing on each of the SD pixel data sets given as the data sets of the space class tap to obtain a re-quantization code qi used as class information of a space class (class grouping mainly for indicating a waveform in a space) (see the Equation (1)).

Also, based on the SD signal produced by the SD signal production circuit 152, the third tap selection circuit 155 selectively extracts the data sets (SD pixel data sets) of the motion class tap located on a periphery of the objective position in the HD signal. In this case, the third tap selection circuit 155 selects a tap based on tap position information, which is supplied from the tap selection control circuit 156, corresponding to the selected conversion method.

The data sets (SD pixel data sets) of the motion class tap selectively extracted by this third tap selection circuit 155 are supplied to the motion class detection circuit 158. This motion class detection circuit 158 obtains motion information MV of a motion class (class grouping for mainly indicating a degree of motion) based on each of the SD pixel data sets given as data sets of a motion class tap.

This motion information MV and the above-mentioned re-quantization code qi are supplied to the class synthesis circuit 159. This class synthesis circuit 159 in turn obtains a class code CL that indicates a class including pixel data set of the objective position in the HD signal (525p or 1050i signal), based on this motion information MV and the re-quantization code qi (see the Equation (3)).

Also, based on the SD signal produced by the SD signal production circuit 152, the first tap selection circuit 153 selectively extracts the data sets (SD pixel data sets) of a prediction tap located on a periphery of the objective position in the HD signal. In this case, the first tap selection circuit 153 selects a tap based on tap position information, which is supplied from the tap selection control circuit 156, corresponding to the selected conversion method.

Then, the normal equation production section 171A produces the normal equation (see the Equation (21)) for obtaining the coefficient data sets Wi (i=1 to n) for each class based on each of the HD pixel data sets y given as pixel data set of the objective position obtained from the HD signal received at the input terminal 151, the data sets (SD pixel data sets) xi of the prediction tap selectively extracted by the first tap selection circuit 153 in respective correspondence to each of the HD pixel data sets y thus given, and the class code CL received from the class synthesis circuit 159 in respective correspondence to each of the HD pixel data sets y thus given.

Then, this normal equation is solved by the coefficient data decision section 172A so that the coefficient data sets Wi for each class are produced. In the normal equation production section 173A, a normal equation for obtaining the coefficient seed data sets $w_{i0}$ through $w_{i3}$ is produced from this coefficient data sets Wi for each class.

This normal equation is then solved by the coefficient seed data decision section 174A so that the coefficient seed data sets $w_{i0}$ through $w_{i3}$ can be obtained and the coefficient seed data sets $w_{i0}$ through $w_{i3}$ thus obtained are then stored in the coefficient seed memory 162A.

Thus, the coefficient seed data production device 150A shown in FIG. 32 can produce coefficient seed data sets $w_{i0}$ through $w_{i3}$ to be stored in the information memory bank 135A of the image signal processing section 110A shown in FIG. 31. In this case, the SD signal production circuit 152 produces SD signal (525i signal) according to a selected conversion method using the 525p or 1050i signal, thus producing coefficient seed data sets, which correspond to any one of the first conversion method (for obtaining the 525p signal from the 525i signal at the image signal processing section 110A) and the second conversion method (for obtaining the 1050i signal from the 525i signal at the image signal processing section 110A).

The concept of learning (production of coefficient data sets and coefficient seed data sets) has been described with reference to an example of producing a student image from a teacher image. The invention, however, is not limited thereto; for example, an imaging apparatus capable of acquiring both a teacher image and a student image may be utilized, to use independently obtained teacher and student images in learning.

Although not detailed, the coefficient seed data sets $w_{i0}$ through $w_{i3}$ can be produced not only by the above-mentioned coefficient seed data production device of FIG. 21 but also by that shown in FIG. 18.

Also, although not detailed, the processing by the image signal processing section 110A of FIG. 31 may be performed software-wise using the image signal processor 300 as shown in FIG. 27, like the processing at the image signal processing section 110 of FIG. 1 (see the flowchart of FIG. 28).

Although the above-mentioned embodiments have employed a first-degree linear equation as the estimation equation used to produce the HD signal, the invention is not limited thereto; for example, it may be of a higher degree.

Also, although the above-mentioned embodiments have exemplified conversion of the SD signal (525i signal) into the HD signal (525p or 1050i signal), the invention is not limited thereto; for example, the invention is, of course, applicable likewise also to a case where the first image signal may be converted into the second image signal using an estimation equation.

Also, although the above-mentioned embodiments have exemplified the information as being an image signal, the invention is not limited thereto. For example, the invention is applicable likewise also to a case where the information signal is an audio signal.

According to the invention, coefficient data sets to be used in an estimation equation for converting the first information signal into the second information signal are produced according to a production equation using an input value of the parameter and the coefficient seed data sets which are coefficient data sets in the production equation containing a predetermined parameter, so that the coefficient data sets to be used in the estimation equation corresponding to an arbitrary parameter value can be produced without requiring a memory capable of storing a large number of coefficient data sets, thus saving on the storage capacity of the memory.

PROBABILITY OF UTILIZED INDUSTRIALIZATION

As mentioned above, an information signal processor, a method for processing an information signal, an image signal processor and an image display apparatus using the same, a coefficient seed data production device used in the same, a method for producing coefficient seed data set, and an information-providing medium are well suitable for use in conversion of, for example, an NTSC-system video signal into a Hi-vision video signal.

The invention claimed is:

1. An image display apparatus comprising:
    image signal input means for inputting a first image signal containing plural pixel data sets;
    image signal processing means for converting said first image signal input by the image signal input means into a second image signal containing plural pixel data sets and then transmitting the second image signal;
    image display means for displaying an image obtained by said second image signal received from said image signal processing means on an image display element; and
    parameter adjustment means for adjusting a value of a parameter for deciding a picture quality of said image displayed on said image display device, wherein said image signal processing means includes:
    first data selection means for selecting first plural pixel data sets located on a periphery of an objective position in said second image signal based on said first image signal;

class detection means for detecting a class including pixel data set of said objective position based on said first plural pixel data sets selected by said first data selection means;

first storage means for storing coefficient seed data set obtained beforehand for each class detected by said class detection means, said coefficient seed data set being coefficient data set in a production equation for producing coefficient data set used in an estimation equation, and said production equation containing said parameter;

coefficient data generation means for generating said coefficient data set used in the estimation equation corresponding to the class detected by said class detection means and a value of said parameter adjusted by said parameter adjustment means, said coefficient data set used in the estimation equation being produced by said production equation using both said coefficient seed data set stored in said first storage means and the adjusted value of said parameter;

second data selection means for selecting second plural pixel data sets located on a periphery of the objective position in said second image signal based on said first image signal; and calculation means for calculating and obtaining pixel data set of said objective position according to said estimation equation using both said coefficient data set generated by said coefficient data generation means and said second plural pixel data sets selected by said second data selection means.

2. The image display apparatus according to claim 1, wherein said coefficient data generation means further includes:

coefficient data production means for producing said coefficient data set used in the estimation equation for each class detected by said class detection means according to said production equation using the coefficient seed data set stored in said first storage means and the value of said parameter;

second storage means for storing said coefficient data set used in the estimation equation for each class produced by said coefficient data production means; and coefficient data read-out means for reading out of said second storage means said coefficient data set used in the estimation equation corresponding to the class detected by said class detection means and then transmitting said coefficient data set.

3. The image display apparatus according to claim 1, wherein said image signal processing means further comprises:

addition means for obtaining a total sum of said coefficient data set used in the estimation equation generated by said coefficient data generation means; and normalization means for normalizing by dividing the pixel data set of said objective position obtained by said calculation means by said total sum.

4. The image display apparatus according to claim 1, wherein said parameter adjustment means includes:

display control means for displaying an adjustment position of said parameter on said image display element; and user operation means for permitting a user to adjust a value of said parameter with referencing the adjustment position of said parameter displayed on said image display element.

5. An image display apparatus comprising:

image signal input means for inputting a first image signal containing plural pixel data sets;

image signal processing means for converting said first image signal received from said image signal input means into a second image signal containing plural pixel data sets and then transmitting the second image signal; and image display means for displaying an image obtained by said second image signal received from said image signal processing means on an image display element, wherein said image signal processing means includes:

first data selection means for selecting first plural pixel data sets located on a periphery of an objective position in said second image signal based on said first image signal;

class detection means for detecting a class including pixel data set of said objective position based on said first plural pixel data sets selected by said first data selection means;

first storage means for storing coefficient seed data set, said coefficient seed data set being coefficient data set in a production equation for producing coefficient data set used in an estimation equation, and said production equation containing a parameter corresponding to the class detected by said class detection means;

coefficient data generation means for generating said coefficient data set used in the estimation equation corresponding to a value of the class detected by said class detection means, said coefficient data set used in the estimation equation being produced according to said production equation using both the coefficient seed data set stored in said first storage means and the value of the class detected by said class detection means;

second data selection means for selecting second plural pixel data sets located on a periphery of the objective position in said second image signal based on said first image signal; and calculation means for calculating and obtaining pixel data set of said objective position according to said estimation equation using both said coefficient data set generated by said coefficient data generation means and said second plural pixel data sets selected by said second data selection means.

6. The image display apparatus according to claim 5, further comprising parameter input means for inputting a value of the parameter into said class detection means, said value of the parameter deciding a fineness degree of said class grouping.

7. The image display apparatus according to claim 6, wherein said coefficient data generation means further includes:

coefficient data production means for producing said coefficient data set used in the estimation equation for each class detected by said class detection means according to said production equation using the coefficient seed data set stored in said storage means and said value of input parameter;

second storage means for storing said coefficient data set used in the estimation equation for each class produced by said coefficient data production means; and coefficient data read-out means for reading out of said second storage means said coefficient data set used in the estimation equation corresponding to the class detected by said class detection means and then transmitting the coefficient data set.

8. The image display apparatus according to claim 5, further comprising:
- addition means for obtaining a total sum of said coefficient data set used in the estimation equation generated by said coefficient data generation means; and
- normalization means for normalizing by dividing the informational data set of said objective position obtained by said calculation means by said total sum.

9. The image display apparatus according to claim 6, wherein said parameter input means includes:
- display control means for displaying the value of said parameter on said image display element; and
- user operation means for permitting a user to adjust the value of said parameter with referencing contents displayed on said image display element.

10. The image display apparatus according to claim 6, wherein said parameter input means includes characteristic amount detection means for detecting a predetermined characteristic amount from said first image signal, and wherein a value of said parameter corresponding to said predetermined characteristic amount detected by said characteristic amount detection means is input.

11. The image display apparatus according to claim 6, wherein said parameter input means includes information extraction means for extracting information on the value of said parameter contained in said first image signal, and wherein a value of said parameter indicated by the information extracted by said information extraction means is input.

* * * * *